United States Patent
Van de Rostyne et al.

(10) Patent No.: US 7,662,013 B2
(45) Date of Patent: Feb. 16, 2010

(54) HELICOPTER WITH HORIZONTAL CONTROL

(75) Inventors: Alexander Jozef Magdalena Van de Rostyne, Bornem (BE); Chi Pok Billy Wai, Quarry Bay (HK)

(73) Assignee: Silverlit Toys Manufactory Ltd., Causeway Bay (HK)

( * ) Notice: Subject to any disclaimer, the term of this patent is extended or adjusted under 35 U.S.C. 154(b) by 425 days.

(21) Appl. No.: 11/627,919

(22) Filed: Jan. 26, 2007

(65) Prior Publication Data

US 2007/0164150 A1    Jul. 19, 2007

Related U.S. Application Data

(63) Continuation-in-part of application No. 11/465,781, filed on Aug. 18, 2006, which is a continuation-in-part of application No. 11/462,177, filed on Aug. 3, 2006.

(30) Foreign Application Priority Data

Jan. 19, 2006    (BE) .................................. 2006/0043

(51) Int. Cl.
*A63H 27/127*    (2006.01)
*B64C 27/00*    (2006.01)
(52) U.S. Cl. ...................................... 446/36; 244/17.11
(58) Field of Classification Search ................... 446/34, 446/36–38; 244/17.11, 17.13, 17.19, 17.21, 244/17.23, 17.25
See application file for complete search history.

(56) References Cited

U.S. PATENT DOCUMENTS 934,771  A    9/1909   Turnbull (Continued)

FOREIGN PATENT DOCUMENTS

BE    338599    12/1926

(Continued)

OTHER PUBLICATIONS

International Search from PCT/US2008/051938.

(Continued)

*Primary Examiner*—Gene Kim
*Assistant Examiner*—Alyssa M Hylinski
(74) *Attorney, Agent, or Firm*—Greenberg Traurig LLP

(57) ABSTRACT

A helicopter includes a system to effect motion in a horizontal dimension thereby to direct the desired direction. The rotor blades are driven by a rotor shaft and which is hinge mounted on this rotor shaft, such that the angle between the plane of rotation of the main rotor and the rotor shaft may vary. A control for moving the angle of incidence of at least one blade of the rotor cyclically along at least part of a 360-degree rotation path around the rotor shaft. This causes a variation in a lift force of the blade along at least part of the rotations path. This causes the body to be urged in a relatively horizontal direction from a relative position of rest. The control includes an actuator for engaging with an assembly depending from the rotor, the inter-engagement of the actuator and assembly effecting a change in the angle of incidence of at least the one blade of the rotor. The system includes a rotor, preferably complemented with a stabilizer rotor. There is a control ring attached to the main rotor, and an actuator device connected with the helicopter body structure. The control ring is generally centered around the vertical rotor axis, and moves with the rotor when tilted around the feather axis.

35 Claims, 44 Drawing Sheets

U.S. PATENT DOCUMENTS

| | | | |
|---|---|---|---|
| 1,403,909 A | 1/1922 | Moir | |
| 1,446,522 A | 2/1923 | Smith | |
| 1,446,718 A | 2/1923 | Newbauer | |
| 1,470,017 A | 10/1923 | Lougheed | |
| 1,773,281 A | 8/1930 | Scott | |
| 1,800,470 A | 4/1931 | Oehmichen | |
| 1,828,783 A | 10/1931 | Oehmichen | |
| 1,925,156 A | 9/1933 | Vaughn | |
| 2,030,578 A | 2/1936 | Flettner | |
| 2,110,563 A | 3/1938 | Thaon | |
| 2,272,643 A | 2/1942 | Peters et al. | |
| 2,307,381 A | 1/1943 | Bess | |
| D140,480 S | 2/1945 | Maycen | |
| 2,368,698 A | 2/1945 | Young | |
| 2,384,516 A | 9/1945 | Young | |
| 2,411,596 A | 11/1946 | Shapiro | |
| 2,413,831 A | 1/1947 | Jordan | |
| 2,429,502 A | 10/1947 | Young | |
| D149,130 S | 3/1948 | Katenberter et al. | |
| 2,439,143 A | 4/1948 | Nemeth | |
| D153,314 S | 4/1949 | Piasecki | |
| D153,315 S | 4/1949 | Piasecki | |
| D153,316 S | 4/1949 | Piasecki | |
| D153,317 S | 4/1949 | Piasecki | |
| 2,466,821 A | 4/1949 | Owen | |
| 2,469,144 A | 5/1949 | Baggott | |
| 2,481,750 A | 9/1949 | Hiller, Jr. et al. | |
| 2,486,059 A | 10/1949 | Pentecost | |
| 2,487,020 A | 11/1949 | Gilcrease | |
| 2,514,822 A | 7/1950 | Wolfe Jr. | |
| 2,532,683 A | 12/1950 | Traver | |
| 2,554,938 A | 5/1951 | Catalano | |
| D163,938 S | 7/1951 | Douglas | |
| 2,563,731 A | 8/1951 | Masterson | |
| 2,614,637 A | 10/1952 | Landgraf | |
| 2,629,568 A | 2/1953 | Croshere, Jr. et al. | |
| 2,633,924 A | 4/1953 | Young | |
| 2,638,707 A * | 5/1953 | Baker | 446/37 |
| 2,639,874 A | 5/1953 | Stalker | |
| 2,646,848 A | 7/1953 | Young | |
| 2,629,570 A | 12/1953 | Carnahan | |
| D171,569 S | 3/1954 | Apostolescu | |
| 2,725,494 A | 11/1955 | Anderson | |
| D178,081 S | 6/1956 | Papadakos | |
| 2,750,131 A | 6/1956 | Thomson | |
| 2,801,494 A | 8/1957 | Ernst | |
| D181,643 S | 12/1957 | Graham | |
| 2,818,123 A | 12/1957 | Hiller, Jr. | |
| D184,501 S | 2/1959 | Wlashin et al. | |
| 2,923,494 A | 2/1960 | Strong | |
| D187,625 S | 4/1960 | Apostolescu | |
| D187,895 S | 5/1960 | Douglas | |
| 2,950,074 A | 8/1960 | Apostolescu | |
| 2,980,187 A * | 4/1961 | Smyth-Davila | 416/18 |
| 2,987,848 A * | 6/1961 | Gottfried et al. | 446/37 |
| 3,029,048 A | 4/1962 | Brooks et al. | |
| 3,035,643 A | 5/1962 | Kelley et al. | |
| 3,068,611 A | 12/1962 | Lauderdale | |
| 3,080,001 A * | 3/1963 | Culver et al. | 416/18 |
| 3,093,929 A | 6/1963 | Robbins et al. | |
| 3,106,964 A | 10/1963 | Culver et al. | |
| 3,116,896 A | 1/1964 | Sigler et al. | |
| 3,135,334 A | 6/1964 | Culver | |
| 3,180,424 A | 4/1965 | Serriades | |
| 3,213,944 A | 10/1965 | Nichols et al. | |
| 3,228,478 A | 1/1966 | Edenborough | |
| 3,231,222 A | 1/1966 | Scheutzow | |
| D205,326 S | 7/1966 | Postelson-Apostolescu | |
| 3,321,022 A | 5/1967 | Oguri | |
| 3,370,809 A | 2/1968 | Leoni | |
| 3,371,886 A | 3/1968 | Schertz | |
| 3,391,746 A | 7/1968 | Cardoso | |
| 3,409,249 A | 11/1968 | Bergquist et al. | |
| 3,448,810 A | 6/1969 | Vogt | |
| 3,450,374 A | 6/1969 | Moore | |
| 3,460,628 A | 8/1969 | Tankersley | |
| 3,481,559 A | 12/1969 | Apostolescu | |
| 3,554,467 A | 1/1971 | Yowell | |
| 3,558,081 A | 1/1971 | Williams | |
| 3,572,616 A | 3/1971 | Ulisnik | |
| 3,592,559 A | 7/1971 | Ward | |
| D221,453 S | 8/1971 | Swanberg | |
| 3,625,631 A | 12/1971 | Covington, Jr. et al. | |
| 3,662,487 A | 5/1972 | Seefluth | |
| 3,759,629 A | 9/1973 | Abramopaulos | |
| 3,771,924 A | 11/1973 | Buchstaller | |
| D232,168 S | 7/1974 | Leoni | |
| D232,170 S | 7/1974 | Diamond et al. | |
| D234,350 S | 2/1975 | Beckert et al. | |
| 3,905,565 A * | 9/1975 | Kolwey | 244/17.23 |
| 3,933,324 A | 1/1976 | Ostrowski | |
| D239,930 S | 5/1976 | Ulisnik | |
| 4,025,230 A | 5/1977 | Kastan | |
| 4,053,123 A | 10/1977 | Chadwick | |
| 4,073,086 A | 2/1978 | Ogawa | |
| 4,084,345 A | 4/1978 | Tanaka | |
| 4,118,143 A * | 10/1978 | Kavan | 416/18 |
| 4,142,697 A | 3/1979 | Fradenburgh | |
| D253,003 S | 9/1979 | Tanaka | |
| 4,173,321 A | 11/1979 | Eickmann | |
| 4,227,856 A | 10/1980 | Verrill et al. | |
| 4,307,533 A | 12/1981 | Sims et al. | |
| 4,519,746 A | 5/1985 | Wainauski et al. | |
| 4,522,563 A | 6/1985 | Reyes et al. | |
| 4,629,440 A | 12/1986 | Mckittrick et al. | |
| D294,605 S | 3/1988 | Matsumoto | |
| 4,759,514 A * | 7/1988 | Burkam | 244/17.21 |
| 4,880,355 A | 11/1989 | Viullet et al. | |
| 4,941,803 A | 7/1990 | Wainauski et al. | |
| 4,958,786 A * | 9/1990 | Ogawa et al. | 244/17.13 |
| 4,981,456 A | 1/1991 | Sato et al. | |
| 5,015,187 A | 5/1991 | Lord | |
| 5,108,043 A | 4/1992 | Canavaspe | |
| 5,151,014 A | 9/1992 | Greenwald et al. | |
| 5,190,242 A | 3/1993 | Nichols | |
| 5,203,520 A | 4/1993 | Przygodski et al. | |
| 5,209,429 A | 5/1993 | Doolin et al. | |
| 5,240,204 A | 8/1993 | Kunz | |
| 5,252,100 A | 10/1993 | Osawa et al. | |
| 5,255,871 A | 10/1993 | Ikeda | |
| 5,259,729 A * | 11/1993 | Fujihira et al. | 416/25 |
| 5,304,090 A | 4/1994 | Vanni | |
| 5,370,341 A | 12/1994 | Leon | |
| D357,894 S | 5/1995 | Arnold et al. | |
| 5,505,407 A | 4/1996 | Chiapetta | |
| 5,511,947 A | 4/1996 | Schmuck | |
| D372,741 S | 8/1996 | Tsai | |
| D378,606 S | 3/1997 | Tamagnini | |
| 5,609,312 A | 3/1997 | Arlton et al. | |
| 5,628,620 A * | 5/1997 | Arlton | 416/114 |
| D388,048 S | 12/1997 | Taylor et al. | |
| D390,942 S | 2/1998 | Mei | |
| 5,749,540 A | 5/1998 | Arlton | |
| 5,836,545 A | 11/1998 | Arlton | |
| 5,879,131 A | 3/1999 | Arlton et al. | |
| 5,906,476 A | 5/1999 | Arlton | |
| 5,915,649 A | 6/1999 | Head | |
| 5,971,320 A | 10/1999 | Jermyn et al. | |
| 6,000,911 A | 12/1999 | Toulmay et al. | |
| D421,279 S | 2/2000 | Tsai | |
| 6,032,899 A | 3/2000 | Mondet et al. | |
| 6,039,541 A | 3/2000 | Parker et al. | |
| D425,853 S | 5/2000 | Caporaletti | |
| 6,231,005 B1 * | 5/2001 | Costes | 244/17.25 |

| | | |
|---|---|---|
| 6,302,652 B1 | 10/2001 | Roberts |
| 6,398,618 B1 | 6/2002 | Wu |
| 6,435,453 B1 | 8/2002 | Carter, Jr. |
| 6,460,802 B1 | 10/2002 | Norris |
| 6,467,726 B1 | 10/2002 | Hosoda |
| D467,861 S | 12/2002 | Lee |
| 6,499,690 B1 | 12/2002 | Katayama et al. |
| 6,543,726 B2 | 4/2003 | Illingworth |
| 6,632,119 B2 | 10/2003 | Chernek et al. |
| 6,659,395 B2 | 12/2003 | Rehkemper et al. |
| 6,659,721 B1 | 12/2003 | Parker et al. |
| 6,702,552 B1 | 3/2004 | Harman |
| 6,719,244 B1 | 4/2004 | Gress |
| 6,732,973 B1 | 5/2004 | Rehkemper |
| 6,745,977 B1 | 6/2004 | Long et al. |
| 6,749,401 B2 | 6/2004 | Vanmoor |
| 6,758,436 B2 | 7/2004 | Rehkemper et al. |
| 6,789,764 B2 | 9/2004 | Bass et al. |
| 6,884,034 B1 | 4/2005 | Parker et al. |
| 6,886,777 B2 | 5/2005 | Rock |
| 6,899,586 B2 | 5/2005 | Davis |
| 6,929,215 B2 | 8/2005 | Arlton |
| 6,938,853 B2 | 9/2005 | Pines et al. |
| 6,960,112 B2 | 11/2005 | Helmlinger et al. |
| 6,978,969 B1 | 12/2005 | Neal |
| D524,227 S | 7/2006 | Stille et al. |
| D524,228 S | 7/2006 | Scott et al. |
| D524,229 S | 7/2006 | Stille et al. |
| D524,230 S | 7/2006 | Stille et al. |
| D524,718 S | 7/2006 | Scott et al. |
| 7,100,866 B2 | 9/2006 | Rehkemper et al. |
| 7,178,757 B1 | 2/2007 | Breese et al. |
| 7,178,758 B2 | 2/2007 | Rehkemper |
| 7,188,803 B2 | 3/2007 | Ishiba |
| 7,198,223 B2 | 4/2007 | Phelps, III et al. |
| 7,204,453 B2 | 4/2007 | Muren |
| D544,825 S | 6/2007 | Van De Rostyne et al. |
| D545,755 S | 7/2007 | Van De Rostyne et al. |
| D546,269 S | 7/2007 | Van De Rostyne et al. |
| 7,246,769 B2 | 7/2007 | Yoeli |
| D548,803 S | 8/2007 | Zimet |
| 7,264,199 B2 | 9/2007 | Zientek |
| 7,273,195 B1 | 9/2007 | Golliher |
| D552,531 S | 10/2007 | Van De Rostyne et al. |
| D554,040 S | 10/2007 | Van De Rostyne et al. |
| 7,306,186 B2 | 12/2007 | Kusic |
| D559,764 S | 1/2008 | Wai |
| D561,084 S | 2/2008 | Wai |
| D561,085 S | 2/2008 | Wai |
| D561,676 S | 2/2008 | Wai |
| D561,677 S | 2/2008 | Wai |
| D561,678 S | 2/2008 | Wai |
| D561,679 S | 2/2008 | Wai |
| D568,947 S | 5/2008 | Van de Rostyne et al. |
| D576,215 S | 9/2008 | Van de Rostyne et al. |
| D580,344 S | 11/2008 | Wai |
| D582,833 S | 12/2008 | Van de Rostyne et al. |
| D583,297 S | 12/2008 | Van de Rostyne et al. |
| 2002/0008759 A1 | 1/2002 | Hoyos |
| 2002/0049518 A1* | 4/2002 | Yamamoto ............... 701/2 |
| 2002/0109044 A1 | 8/2002 | Rock |
| 2002/0134883 A1 | 9/2002 | Stamps et al. |
| 2004/0087241 A1 | 5/2004 | Agostini et al. |
| 2004/0184915 A1 | 9/2004 | Kunii et al. |
| 2004/0222329 A1 | 11/2004 | Kuhns et al. |
| 2004/0245376 A1 | 12/2004 | Muren |
| 2005/0121552 A1 | 6/2005 | Rehkemper |
| 2005/0121553 A1* | 6/2005 | Isawa et al. .......... 244/17.19 |
| 2006/0102777 A1 | 5/2006 | Rock |
| 2006/0121819 A1 | 6/2006 | Isawa |
| 2006/0231677 A1 | 10/2006 | Zimet et al. |
| 2007/0012818 A1* | 1/2007 | Miyazawa et al. ....... 244/17.25 |
| 2007/0017724 A1 | 1/2007 | Rajasingham |
| 2007/0105475 A1 | 5/2007 | Gotou et al. |
| 2007/0158494 A1 | 7/2007 | Burrage |
| 2007/0164148 A1 | 7/2007 | Van De Rostyne |
| 2007/0164149 A1 | 7/2007 | Van De Rostyne |
| 2007/0178798 A1 | 8/2007 | Lai |
| 2007/0181742 A1 | 8/2007 | Van de Rostyne et al. |
| 2007/0187549 A1 | 8/2007 | Owen |
| 2007/0215750 A1 | 9/2007 | Shantz et al. |
| 2007/0221781 A1 | 9/2007 | Van de Rostyne |
| 2007/0262197 A1 | 11/2007 | Phelps et al. |
| 2007/0272794 A1 | 11/2007 | Van de Rostyne |
| 2008/0067284 A1 | 3/2008 | Bakker |
| 2008/0076319 A1 | 3/2008 | Van de Rostyne |
| 2008/0076320 A1 | 3/2008 | Van de Rostyne |
| 2008/0085653 A1 | 4/2008 | Van de Rostyne |
| 2008/0111399 A1 | 5/2008 | Zierten |
| 2008/0112808 A1 | 5/2008 | Schmaling et al. |
| 2008/0207079 A1 | 8/2008 | Corsiglia et al. |
| 2008/0299867 A1 | 12/2008 | Van de Rostyne et al. |
| 2009/0008497 A1 | 1/2009 | Corsiglia et al. |
| 2009/0047861 A1 | 2/2009 | Van De Rostyne et al. |
| 2009/0047862 A1 | 2/2009 | Van De Rostyne et al. |
| 2009/0104836 A1 | 4/2009 | Van De Rostyne et al. |
| 2009/0117812 A1 | 5/2009 | Van de Rostyne et al. |
| 2009/0163110 A1 | 6/2009 | Van de Rostyne et al. |

FOREIGN PATENT DOCUMENTS

| | | |
|---|---|---|
| BE | 1016960 | 11/2007 |
| CN | 1496923 A * | 5/2004 |
| DE | 1 270 408 | 6/1968 |
| DE | 24 09 227 A1 | 9/1975 |
| DE | 40 17 402 A1 | 12/1991 |
| DE | 94 14 652 U1 | 11/1994 |
| DE | 10256916 | 11/2002 |
| DE | 203 14 041 U1 | 4/2004 |
| EP | 0 250 135 | 12/1987 |
| EP | 0 727 350 | 8/1996 |
| EP | 1462362 A1 | 9/2004 |
| ES | P0233821 | 8/1957 |
| ES | P0234258 | 9/1957 |
| ES | P0245313 | 4/1959 |
| ES | P0283794 | 1/1963 |
| ES | 490715 | 4/1980 |
| ES | 275141 | 7/1982 |
| ES | 0298826 | 1/1989 |
| ES | 0464158 | 1/1992 |
| ES | 2 074 010 | 8/1995 |
| ES | 0727350 | 8/1996 |
| ES | 2 172 362 | 9/2002 |
| ES | 1238185 | 9/2002 |
| ES | 1462362 | 9/2004 |
| FR | 1 265 789 A | 5/1961 |
| GB | 255936 | 7/1926 |
| GB | 272871 | 5/1927 |
| GB | 281721 | 8/1928 |
| GB | 916894 A | 1/1963 |
| GB | 956536 | 4/1964 |
| GB | 958536 | 5/1964 |
| GB | 1081341 A | 8/1967 |
| GB | 1533251 | 11/1978 |
| GB | 2 436 258 A | 9/2007 |
| JP | S30-7668 | 10/1930 |
| JP | S32-003535 | 6/1932 |
| JP | 1269699 | 10/1989 |
| JP | 5192452 | 8/1993 |
| JP | 8150818 | 6/1996 |
| JP | 9048398 | 2/1997 |
| JP | 9512515 | 12/1997 |
| JP | 10076996 | 3/1998 |
| JP | 2000-272594 | 10/2000 |
| JP | 2003-103066 | 4/2003 |
| JP | 2003-220999 | 8/2003 |

| | | |
|---|---|---|
| JP | 2004-121798 | 4/2004 |
| JP | 2005-193905 | 7/2005 |
| JP | 2006-051217 | 2/2006 |
| WO | WO03/080433 A1 | 10/2003 |
| WO | WO2006/075096 | 7/2006 |

OTHER PUBLICATIONS

Photographic prior art reference #1, helicopter.
Photographic prior art reference #2, helicopter displaying writing in French on the tail.
Photographic prior art reference #3, explanation of the function of the flybar.
Photographic prior art reference #4, toy helicopter, www.raidentech.com.
Photographic prior art reference #5, toy helicopter.
Photographic prior art reference #6, helicopter.
Photographic prior art reference #7, helicopter with M40297 or MA0297 displayed on the tail.
Photographic prior art reference #8, toy helicopter #AHS-23900, hstoy.en.alibaba.com.
Photographic prior art reference #9, toy helicopter, toys999.en.alibaba.com.
Mill, Colin. "Practical Theories, Part 9", W3MH—World Wide Web *Model Helicopter Magazine*, Jul. 1996, http://www.w3mh.co.uk/articles/html/csm9-11.htm.
Day, David. "Moving swashplates & CCPM", 2001-2006. See http://www.iroquois.free-online.co.uk.
Selberg, B.P.; Cronin, D.L.; Rokhsaz, K.; Dykman, J.R., Yager, C. J. "Aerodynamic-Structural Analysis of Dual Bladed Helicopter Systems (Field Technical Report", Report No. NASA-CR-162754, Feb. 80 46p (Abstract).
Ham, Normand. Helicopter individual-blade-control research at MIT 1977-1985; DGLR, European Rotorcraft Forum, 12th, Garmisch-Partenkirchen, West Germany; Germany, Federal Republic of; Sep. 22-25, 1986 10 pp. 1986 (Abstract).
Proctor, Paul. "Aviation Week & Space Technology", v146, n13, p47(1), Mar. 31, 1997 (Abstract).
Zein-Sabatto, S.; Zheng, Y. "Intelligent Flight Controllers for Helicopter Control"; 1997 IEEE International Conference on Neural Networks, Proceedings (Cat. No. 97CH36109) Part vol. 2 p. 617-21 vol. 2 (Abstract).
Mirick, Paul H. "A Comparison of Theory and Experiment for Coupled Rotor Body Stability of a Bearingless Rotor Model in Hover and Forward Flight", Jun. 1, 1988, IP Document Id 19880017770 pp. 87-101 (Abstract).
US District Court, Eastern District of Virginia, Norfolk Division, *Silverlit Toys Manufactory, Ltd.*, et al. v. *Westminster, Inc.*, et al., Case No. 2:07-cv-472-JBF/JEB.
US District Court, Northern District of Georgia, Atlanta Division, *Westminster, Inc.* v. *Silverlit Toys Manufactory, Ltd.*, et al., Case No. 1:07-cv-2450-JOF.
US District Court, Central District of California, Southern Division, *Innovage LLC* v. *Silverlit Toys Manufactory, Ltd.*, et al., Case No. SAC07-1334 DOC (ANx).
Robert Dingemanse, Press Release "Flying Car Company Takes Off", Mar. 2007, http://www.pal-v.com.
"Esky Dauphin 4-channels Mini Electric Coaxial Helicopter", http://www.esky-heli.com/esky-24g-4ch-dauphin-bluegrey-rtf-kit-for-beginner-flightsim-p-2994.html, May 8, 2008.
Website reference, http://www.youtube.com/watch?v=DsXgmOurwts, "Golden Age Pioneers—Nicolas Florine", Mar. 28, 2008 (4 pages).
Website reference, en.wikipedia.org/wiki/Kamov_Ka-50, Kamov Ka-50, Jun. 19, 2004 (6 pages).
Photographic reference, en.wikipedia.org/wiki/Image:Kamov_Ka-50_MAKS-2005.jpg, Aug. 28, 1995.
Photographic reference, www.fas.org/man/dod-101/sys/ac/row/ka-50-hokum.jpg, Aug. 28, 1995.
Photographic reference, www.aviastar.org/foto/ka-50_1.jpg, Aug. 28, 1995.
Website reference, web.archive.org/web/20050225044931/http://www.silverlit.com (2 pages), Jun. 5, 2007.
Website reference, web.archive.org/web/20060616140712/boeing.com/rotorcraft/military/ah64d/index.htm, Nov. 23, 2001 (2 pages).
Website reference, en.wikipedia.org/wiki/AH-64_Apache, Jul. 16, 2004 (11 pages).
Website reference, http://www.globalsecurity.org/military/systems/aircraft/ah-64d.htm, Nov. 7, 2001 (6 pages).
Photographic reference, www.fas.org/man/dod-101/sys/ac/ah-64.gif, Aug. 19, 2000.
Photographic reference, en.wikipedia.org/wiki/Imaqe:P320007.jpg, 1981 (3 pages).
Photographic reference, www.fas.org./man/dod-101/sys/ac/ah-64d_001.jpg, Mar. 21, 1997.
Photographic reference, www.fas.org./man/dod-101/sys/ac/ah-64d-image83.jpg, Aug. 19, 2000.
Photographic reference, www.fas.org./man/dod-101/sys/ac/ah-64d-longbow1.jpg, Aug. 19, 2000.
Photographic reference, www.fas.org/man/dod-101/sys/ac/ah-64-dvic294.jpg, Feb. 2, 2003.
Photographic reference, www.voodoo.cz/ah64/pics/ah115.jpg, Jun. 14, 2001.
Photographic reference, www.voodoo.cz/ah64/pics/ah122.jpg, Jan. 10, 2002.
Photographic reference, www.voodoo.cz/ah64/pics/ah106.jpg, Jan. 9, 2002.
Photographic reference, www.voodoo.cz/ah64/pics/ah112.jpg, Aug. 22, 2002.
Photographic reference, www.voodoo.cz/ah64/pics/ah092.jpg, Jan. 8, 2002.
Photographic reference, www.voodoo.cz/ah64/pics/ah153.jpg, Apr. 4, 2002.
Photographic reference, www.voodoo.cz/ah64/pics/ah149.jpg, Jul. 8, 2000.
Photographic reference, www.voodoo.cz/ah64/pics/ah051.jpg, Jan. 8, 2002.
Photographic reference, www.voodoo.cz/ah64/pics/ah049.jpg, Mar. 15, 2002.
Photographic reference, www.voodoo.cz/ah64/pics/ah027.jpg, May 8, 1999.
Photographic reference, www.voodoo.cz/ah64/pics/ah010.jpg, Jul. 8, 2000.
Photographic reference, www.voodoo.cz/ah64/pics/ah003.jpg, Sep. 1, 2001.
Photographic reference, www.airforceworld.com/heli/gfx/ah64/wah64_1.jpg, 1991.
Photographic reference, www.fas.org/man/dod-101/sys/ac/ah-64a-990421-F-2095R-004.jpg, Aug. 19, 2000.
Photographic reference, www.fas.org/man/dod-101/sys/ac/ah-64-dvic292.jpg, Aug. 19, 2000.
Website reference, www.runryder.com/helicopter/t285494p1/, Jun. 12, 2007 (10 pages).
Website reference, web.archive.org/web/20031218200732/http://www.scarlet.be/pixel/pixeli111.htm, Dec. 18, 2003 (7 pages).
Website reference, web.archive.org/web/20031017234927/http://www.scarlet.be/pixel/pixelfp.htm, Oct. 17, 2003 (2 pages).
Website reference, web.archive.org/web/20031218061901/http://pixelito.reference.be/, Dec. 18, 2003 (4 pages).
Website reference, www.aviastar.org/helicopters_eng/breguet-dorand.php, 1935 (4 pages).
Website reference, www.lionheartcreations.com/Lionheartsflightsimsite_page7.html, May 6, 2004 (4 pages).
Website reference, www.lionheartcreations.com/FalconE.html, Jun. 22, 2004 (2 pages).
Photographic reference, www.rotaryaction.com/images/airwolf4.jpg, 1984.
Website reference, www.rotaryaction.com/pages/airwolf.html, 1984 (3 pages).
Pryun, Richard R. "In-flight measurement of rotor blade airloads, bending moments, and motions, together with rotor shaft loads and fuselage vibration, on a tandem rotor helicopter", *Boeing*, Nov. 1967 (Abstract, 1 pg).
Brahmananda, et al. "Application of passive dampers to modern helicopters", Smart Mater, 1996 http://www.iop.org/EJ/abstract/0964-1726/5/5/001 (Abstract, 1 pg).

http://www.microhelicopters.net (3 pgs).
Castillo, et al. "Real-time stabilization and tracking of a four-rotor mini rotocraft", IEEE, Jul. 2004 http://www.ieeexplore.org/xpl/freeabs_all.jsp?arnumber=1308180 (1 pg).
"Structural Components, Design of Tilt-Rotor JVX Near Completion", Aviation Week & Space Technology, vol. 122, No. 2, p. 84, Jan. 14, 1985 (10 pgs).
European Search Opinion dated Jun. 10, 2008, in EP 06 845 583.1.
Photographic prior art reference, Dragonfly helicopter (4 pages).
Piccolino: 1.69 gram RC helicopter—RCGroups.com, http://www.rcgroups.com/forums/showthread.php?t=509295 (6 pages).
U.S. Appl. No. 11/953,823, filed Dec. 10, 2007, Van de Rostyne.
U.S. Appl. No. 11/953,826, filed Dec. 10, 2007, Van de Rostyne.
U.S. Appl. No. 11/953,830, filed Dec. 10, 2007, Van de Rostyne.
U.S. Appl. No. 29/282,581, filed Jul. 24, 2007, Van de Rostyne, et al.
U.S. Appl. No. 29/283,934, filed Aug. 27, 2007, Van de Rostyne, et al.
U.S. Appl. No. 29/297,478, filed Nov. 12, 2007, Van de Rostyne, et al.
U.S. Appl. No. 29/297,479, filed Nov. 12, 2007, Van de Rostyne, et al.
U.S. Appl. No. 29/297,765, filed Nov. 16, 2007, Van de Rostyne, et al.
U.S. Appl. No. 29/302,018, filed Jan. 8, 2008, Van de Rostyne, et al.
U.S. Appl. No. 29/302,020, filed Jan. 8, 2008, Van de Rostyne, et al.
"Declaration of Alexander Van De Rostyne in Support of Defendants and Counterclaimants Silverlit Toys Manufactory Ltd.'s and Spin Master Ltd.'s Motion for Preliminary Injunction", with relevant Exhibits A, C and E-Q, filed on Dec. 3, 2007, in USDC Case No. SACV07-1334 DOC (ANx).
"Declaration of Kei Fung ("Kevin") Choi in Support of Defendants and Counterclaimants' Motion for Preliminary Injunction", with relevant Exhibits A, C, and E, filed on Dec. 3, 2007, in USDC Case No. SACV07-1334 DOC (ANx).
"Declaration of L. Kenneth Rosenthal in Support of Counterclaimants Silverlit Toys Manufactory Ltd.'s and Spin Master Ltd.'s Motion for Preliminary Injunction", with relevant Exhibits O, P, S, V, Y, BB, MM and NN, filed on Dec. 3, 2007, in USDC Case No. SACV07-1334 DOC (ANx).
"Memorandum of Points and Authorities in Support of Motion for Preliminary Injunction of Silverlit Manufactory Ltd. and Spin Master Ltd.", filed on Dec. 3, 2007, in USDC Case No. SACV07-1334 DOC (ANx).
"Declaration of Valerie W. Ho in Support of Defendants and Counterclaimants' Motion for Preliminary Injunction", with relevant Exhibits A, B and M, filed on Dec. 3, 2007, in USDC Case No. SACV07-1334 DOC (ANx).
"Declaration of Conor Forkan in Support of Counterclaimants Silverlit Toys Manufactory Ltd.'s and Spin Master Ltd.'s Reply to Innovage's Opposition to Motion for Preliminary Injunction", with relevant Exhibits A-D, filed on Dec. 26, 2007, in USDC Case No. SACV07-1334 DOC (ANx).
"Declaration of L. Kenneth Rosenthal in Support of Counterclaimants Silverlit Toys Manufactory Ltd.' and Spin Master Ltd.'s Reply to Innovage's Opposition to Motion for Preliminary Injunction", with relevant Exhibits A-D, filed on Dec. 26, 2007, in USDC Case No. SACV07-1334 DOC (ANx).
"Counterclaimants Silverlit Toys Manufactory Ltd.'s and Spin Master Ltd.'s Reply in Support of Motion for Preliminary Injunction", filed on Dec. 26, 2007, in USDC Case No. SACV07-1334 DOC (ANx).
"Innovage's Memorandum of Points and Authorities in Opposition to Silverlit and Spin Master's Motion for Preliminary Injunction", filed on Dec. 19, 2007, in USDC Case No. SACV07-1334 DOC (ANx).
"Declaration of Francisco Rubio-Campos in Support of Plaintiff Innovage LLC's Opposition to Silverlit and Spin Master's Motion for Preliminary Injunction", filed on Dec. 19, 2007, in USDC Case No. SACV07-1334 DOC (ANx).
"Declaration of Jennifer Hamilton in Support of Plaintiff Innovage LLC's Opposition to Silverlit and Spin Master's Motion for Preliminary Injunction", filed on Dec. 19, 2007, in USDC Case No. SACV07-1334 DOC ANx).
"Counterclaim Defendant Merchsource's Opposition to Preliminary Injunction", filed on Dec. 19, 2007, in USDC Case No. SACV07-1334 DOC (ANx).

"Declaration of Lowell Anderson in Opposition to Preliminary Injunction", filed on Dec. 19, 2007, in USDC Case No. SACV07-1334 DOC (ANx).
"Supplemental Declaration of Francisco Rubio-Campos in Support of Plaintiff Innovage LLC's Opposition to Silverlit and Spin Master's Motion for Preliminary Injunction", filed on Jan. 4, 2008, in USDC Case No. SACV07-1334 DOC (ANx).
"Declaration of Nicholas Ringold in Support of Defendants and Counterclaimants' Reply to Merchsource LLC's Opposition to Ex Parte Application to Shorten Time for Hearing on Preliminary Injunction", with relevant Exhibits B-I, filed on Dec. 5, 2007, in USDC Case No. SACV07-1334 DOC (ANx).
"Declaration of Kei Fung ("Kevin") Choi in Support of Defendants and Counterclaimants' Reply to Merchsource LLC's Opposition to Ex Parte Application to Shorten Time for Hearing on Preliminary Injunction", with Exhibit A, filed on Dec. 6, 2007, in USDC Case No. SACV07-1334 DOC (ANx).
"Counterclaimants Silverlit Toys Manufactory Ltd.'s and Spin Master's Reply to Merchsource LLC's Opposition to Ex Parte Application to Shorten Time on Hearing on Motion for Preliminary Injunction", filed on Dec. 6, 2007, in USDC Case No. SACV07-1334 DOC (ANx).
"Counterclaimants Silverlit Toys Manufactory Ltd.'s and Spin Master's 1) Reply to Innovage LLC's Opposition to Ex Parte Application to Shorten Time on Hearing on Motion for Preliminary Injunction, and 2) Opposition to Innovage LLC's Ex Parte Application for Order to Extend Time to Oppose Motion for Preliminary Injunction", filed on Dec. 5, 2007, in USDC Case No. SACV07-1334 DOC (ANx).
"Declaration of Lowell Anderson in Opposition to Ex Parte Application to Shorten Time for Hearing on Preliminary Injunction", filed on Dec. 4, 2007, in USDC Case No. SACV07-1334 DOC (ANx).
"Counterclaim Defendant Merchsource's Opposition to Ex Parte Application to Shorten Time for Hearing on Motion for Preliminary Injunction", filed on Dec. 4, 2007, in USDC Case No. SACV07-1334 DOC (ANx).
"Plaintiff Innovage LLC's Opposition to Defendant Silverlit and Spin Master's Ex Parte Application for Order to Shorten Time for Hearing on Defendants' Motion for Preliminary Injunction; Declaration of Barry Messner in Support", filed on Dec. 4, 2007, in USDC Case No. SACV07-1334 DOC (ANx).
"Plaintiff Innovage LLC's Ex Parte Application for Order to Extend Time to Oppose Defendants' Motion for Preliminary Injunction; Memorandum of Points and Authorities; Declaration of Barry Messner", filed on Dec. 4, 2007, in USDC Case No. SACV07-1334 DOC (ANx).
"Amended Answer, Affirmative Defenses and Counterclaims for: (1) Patent Infringement; (2) Trade Dress Infringement; (3) Unfair Competition and False Designation of Origin; (4) Unfair Competition Under California Business & Professions Code § 17200; and (5) Copyright Infringement", filed on Dec. 11, 2007, in USDC Case No. SACV07-1334 DOC (ANx).
"Innovage's Reply in Opposition of Silverlit and Spin Master to Plaintiff Innovage LLC's Ex Parte Application for Order to Extend Time to Oppose Defendants' Motion for Preliminary Injunction", filed on Dec. 7, 2007, in USDC Case No. SACV07-1334 DOC (ANx).
"Counterclaim Defendant Innovage LLC's Amended Reply and Affirmative Defenses to Counterclaims of Silverlit Toys Manufactory Ltd. and Spin Master Ltd.", filed on Jan. 9, 2008, in USDC Case No. SACV07-1334 DOC (ANx).
"Order Denying Defendants' Motion for Preliminary Injunction", filed on Jan. 8, 2008, in USDC Case No. SACV07-1334 DOC (ANx).
"Counterclaimants Silverlit Toys Manufactory Ltd.'s and Spin Master's Ltd.'s Objection and Motion to Strike Plaintiff Innovage LLC's Belated Supplemental Declaration of Francisco Rubio-Campos", filed on Jan. 4, 2008, in USDC Case No. SACV07-1334 DOC (ANx).
"Supplemental Declaration of Francisco Rubio-Campos in Support of Plaintiff Innovage LLC's Opposition to Silverlit ad Spin Master's Motion for Preliminary Injunction", filed on Jan. 4, 2008, in USDC Case No. SACV07-1334 DOC (ANx).

"Counterclaim Defendant Innovage LLC's Reply and Affirmative Defenses to Counterclaims of Silverlit Toys Manufactory Ltd. and Spin Master Ltd.", filed on Dec. 26, 2007, in USDC Case No. SACV07-1334 DOC (ANx).

"Counterclaim Defendant Merchsource LLC's Answer and Defenses to Counterclaims of Silverlit Toys Manufactory Ltd. and Spin Master Ltd.", filed on Dec. 26, 2007, in USDC Case No. SACV07-1334 DOC (ANx).

"Answer, Affirmative Defenses and Counterclaims for: (1) Patent Infringement; (2) Trade Dress Infringement; (3) Unfair Competition and False Designation of Origin; and (4) Unfair Competition Under California Business & Professions Code § 17200", with Exhibits E & F, filed on Dec. 3, 2007, in USDC Case No. SACV07-1334 DOC (ANx).

"Complaint for: 1) Declaratory Judgment of Invalidity and Non-Infringement of Certain Design Patents; 2) Declaratory Judgment of Invalidity and Non-Infringement of Trade Dress", filed on Nov. 13, 2007, in USDC Case No. SACV07-1334 DOC (ANx).

Photo of portion of PicooZ product package; Silverlit 2006 Product Catalog (5 pages total).

Partial International Search from PCT/US2006/047982.

Chinook Helicopter, first flight 1961, as referenced in Wikipedia http://en.wikipedia.org/wiki/CH-47_Chinook, Dec. 15, 2008 (11 pages).

Office Action dated Feb. 10, 2009, from U.S. Appl. No. 11/462,177 (pending) (9 pages).

Office Action dated Feb. 10, 2009, from U.S. Appl. No. 11/465,781 (pending) (9 pages).

Office Action dated May 8, 2008, from U.S. Appl. No. 11/754,752, now 7,494,397 (9 pages).

Office Action dated May 7, 2008, from U.S. Appl. No. 11/842,719, now 7,467,984 (9 pages).

Office Action dated May 8, 2008, from U.S. Appl. No. 11/953,826, now 7,425,167 (10 pages).

Office Action dated May 8, 2008, from U.S. Appl. No. 11/953,830, now 7,425,168 (10 pages).

Office Action dated May 8, 2008, from U.S. Appl. No. 11/953,823, now 7,422,505 (11 pages).

Office Action dated Mar. 31, 2009, from U.S. Appl. No. 12/264,890 (pending) (8 pages).

Office Action dated May 29, 2009, from U.S. Appl. No. 12/264,890 (pending) (10 pages).

Office Action dated Jun. 2, 2009, from U.S. Appl. No. 11/736,506 (pending) (9 pages).

Office Action dated Jun. 16, 2009, from U.S. Appl. No. 12/402,446 (pending) (10 pages).

* cited by examiner

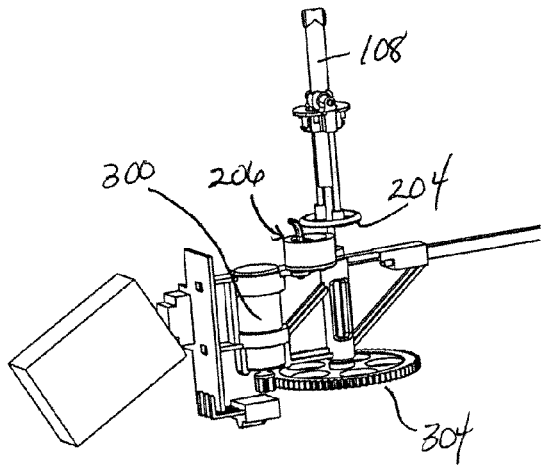
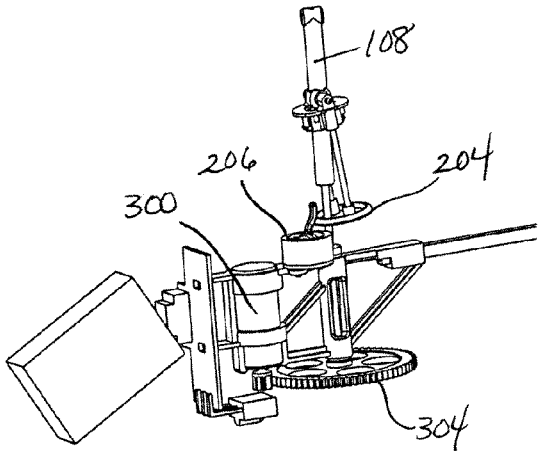
Fig. 22a          Fig. 22b
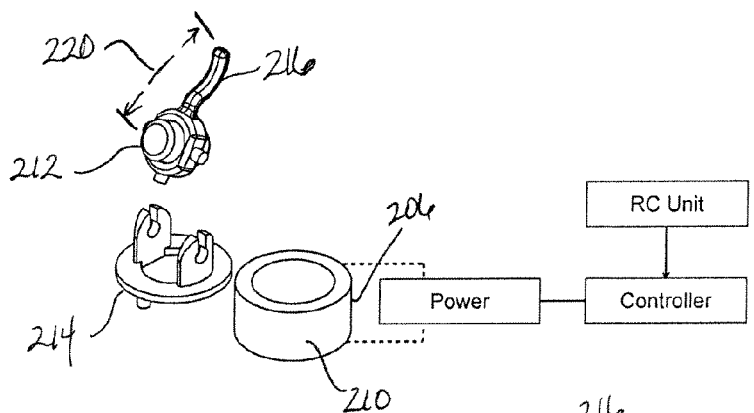
Fig. 23
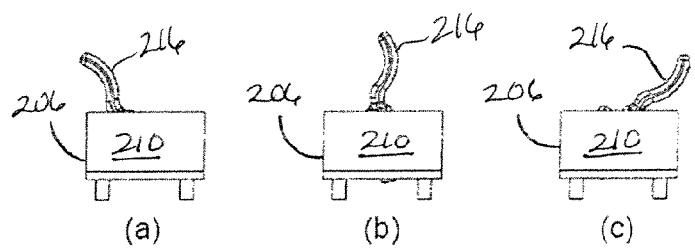
(a)     (b)     (c)
Fig. 24

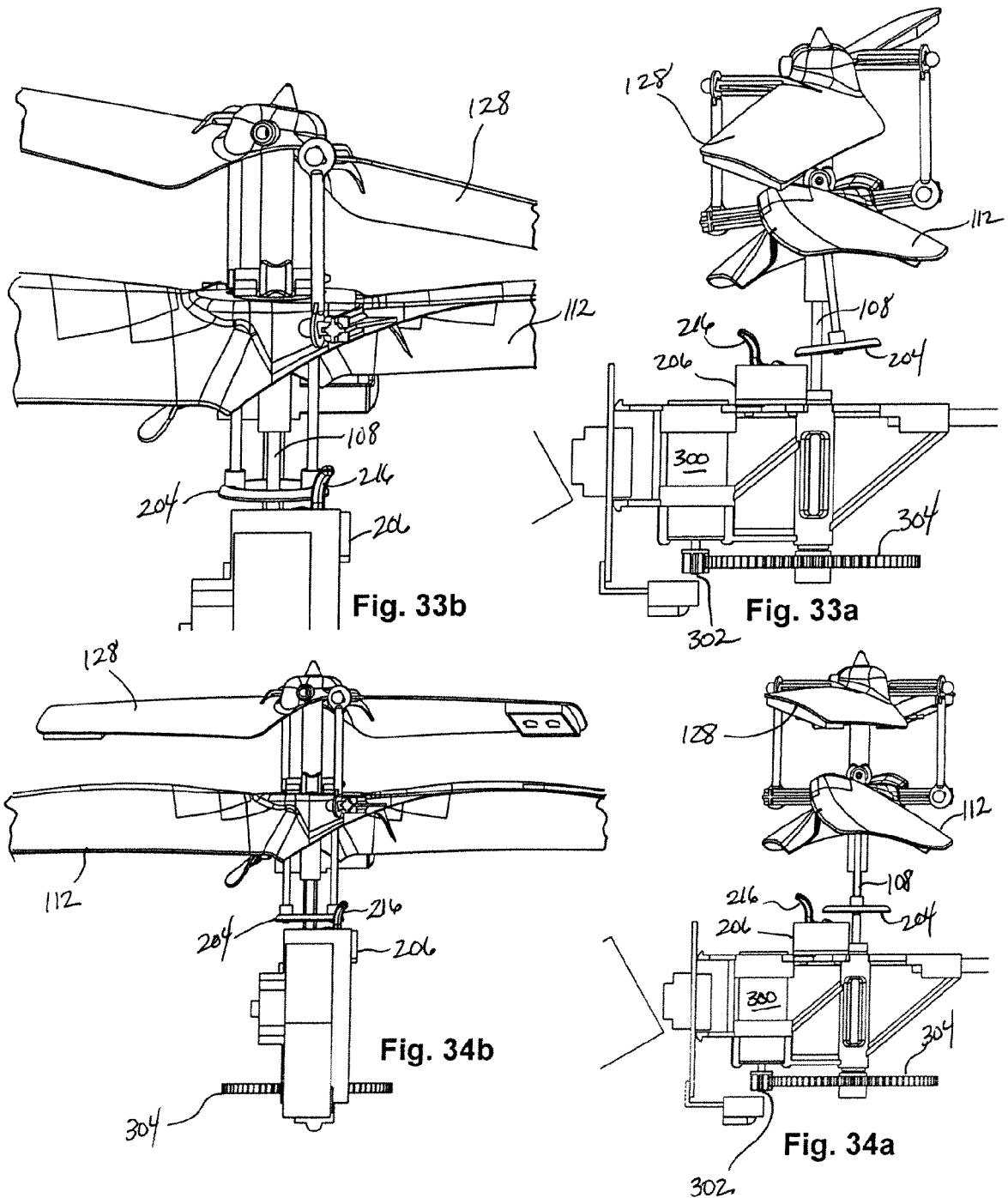

HELICOPTER WITH HORIZONTAL CONTROL

RELATED APPLICATION

This application is a continuation-in-part of U.S. patent application Ser. No. 11/465,781, Aug. 18, 2006, which is a continuation-in-part of U.S. patent application Ser. No. 11/462,177, filed Aug. 3, 2006, which claims priority to Belgian Patent Application No. 2006/0043 entitled Autostabiele helicopter by Alexander VAN DE ROSTYNE, which was filed on Jan. 19, 2006. The contents of these applications are incorporated by reference herein.

BACKGROUND

The present disclosure concerns an improved flying object such as a helicopter.

The disclosure concerns a helicopter generally. In particular, but not exclusively, it is related to a toy helicopter and in particular to a remote-controlled model helicopter or a toy helicopter.

SUMMARY

It is known that a helicopter is a complex machine which is unstable and as a result difficult to control, so that much experience is required to safely operate such helicopters without mishaps.

Typically, a helicopter includes a body, a main rotor and a tail rotor.

The main rotor provides an upward force to keep the helicopter in the air, as well as a lateral or forward or backward force to steer the helicopter in required directions. This can be by making the angle of incidence of the rotor blades of the main rotor vary cyclically at every revolution of the main rotor.

The main rotor has a natural tendency to deviate from its position, which may lead to uncontrolled movements and to a crash of the helicopter if the pilot loses control over the steering of the helicopter.

Solutions to slow down the effect have already been provided up to now, including the application of stabilizing rods and weights at the tips of the rotor blades.

All these solutions make use of the known phenomenon of gyroscopic precession caused by the Coreolis force and the centrifugal forces to obtain the desired effect.

The tail rotor is not at all insensitive to this phenomenon, since it has to prevent the body to turn round the drive shaft of the rotor as a result of the resistance torque of the rotor on the body.

To this end, the tail rotor is erected such that it develops a lateral thrust which has to counteract the above-mentioned resistance torque of the rotor and the helicopter is provided with means which have to enable the pilot to control the lateral thrust so as to determine the flight position round the vertical axis.

Since the tail of the helicopter tends to turn round the drive shaft of the main rotor, even in case of small variations in the drive torque of the main rotor, most helicopters are provided with a separate and autonomous mechanical or electromechanical system such as a gyroscope or the like which automatically compensates the thrust of the tail rotor for the unwanted rotations.

In general, the stability of a helicopter includes the result of the interaction between:

the rotation of the rotor blades; the movements of any possible stabilizing rods; compensation of the resistance torque of the main rotor by means of the tail rotor;

the system such as a gyroscope or the like to compensate for small undesired variations in the resistance torque of the main rotor; and control of the helicopter which controls the rotational speed of the main rotor and of the tail rotor.

When these elements are essentially in balance, the pilot should be able to steer the helicopter as desired.

This does not mean, however, that the helicopter can fly by itself and can thus maintain a certain flight position or maneuver, for example, hovering or making slow movements without the intervention of a pilot.

Moreover, flying a helicopter usually requires intensive training and much experience of the pilot, for both a full size operational real helicopter as well as a toy helicopter or a remote-controlled model helicopter.

The present disclosure aims to minimize one or several of the above-mentioned and other disadvantages by providing a simple and cheap solution to auto stabilize the helicopter, such that operating the helicopter becomes simpler and possibly reduces the need for long-standing experience of the pilot.

The helicopter should be able to move up or down by changing rotor rpm, or change heading by altering tail rotor rpm. The known helicopter cannot as effectively be controlled to accelerate foreword or backwards, nor sideways left or right, namely the horizontal dimensions.

In order to control a helicopter in flight, permanent commands are needed in those horizontal dimensions to direct it towards the desired direction. Therefore, a system is needed to influence the lift force of the rotor in a cyclical way.

A helicopter includes a system to effect motion in a horizontal dimension thereby to direct the desired direction, selectively a desired horizontal direction. The rotor blades are driven by a rotor shaft and which is hinge mounted on this rotor shaft, such that the angle between the plane of rotation of the main rotor and the rotor shaft may vary.

A control for moving the angle of incidence of at least one blade of the rotor cyclically along a 360 degree rotation path around the vertical rotor shaft, causing a variation in lift force of the blade along the rotation path thereby cause the body to be urged in a relatively horizontal direction from a relative position of horizontal rest. The relative position of horizontal rest is a relatively hovering position above a ground level. By the term, angle of incidence, there is meant the relative angle of attack of the blade in the plane of rotation.

The control includes an actuator for engaging with an assembly depending from the rotor the inter-engagement of the actuator and assembly effecting a change in the angle of incidence of at least the one blade of the rotor.

In different formats, the system is a multi-control or a multi-channel system for controlling the helicopter in different essentially horizontal directions.

The system includes a rotor, preferably complemented with a stabilizer rotor. There is a control ring attached to the main rotor, and an actuator device connected with the helicopter body structure. The control ring is generally centered around the vertical rotor shaft, and moves with the rotor when tilted around the feather axis.

In other situations the disclosure is concerned with a rotor without a stabilizer.

The control includes an actuator for engaging with an assembly depending from the rotor. The inter-engagement of the actuator and assembly effects a change in the angle of incidence of at least one blade of the rotor.

The interaction occurs when the assembly is aligned with the actuator. There can be multiple actuators, the multiple actuators being spaced circumferentially around the rotor shaft thereby to interact with the assembly at different circumferential positions relative to the rotor shaft. The interaction occurs when selected actuators are aligned with selected locations of the assembly, for instance where the actuator engages the ring.

The actuator includes an arm movable between a position of repose and a position of inter-engagement with the assembly and wherein the degree of movement of the arm effects the degree of interaction with the assembly and the degree of change of angle of inclination of the at least one blade. The length of the arm relative to the length of the assembly from the location of anchoring the rotor to the shaft can effect the degree of interaction with the assembly and the degree of change of angle of inclination of the at least one blade. Furthermore, the size of the force exercised by the arm on the assembly can effect the degree of interaction with the assembly and the degree of change of angle of inclination of the at least one blade.

The stability of the helicopter system preferably continues to operate together with the applied control when the control is applied. The degree to which the control system is dominant over the stability system data determines the rate of change in position in the horizontal.

The actuator includes an arm movable between a position of repose and a position of inter-engagement with the assembly, the assembly including a ring transversally located about and movable with the rotor shaft, and the actuator is located at a fixed location on the body.

The control is applied thereby to cause the blade to turn on the feather axis of the rotor blade, the control being effectively applied to the blade when an actuator is cyclically aligned relative to the blade thereby to effect the turning, preferably, only about the feather axis. This causes the incidence of at least one blade to vary cyclically.

The control is applied thereby to cause the blade to turn on the feather axis of the blade, the control being effectively applied selectively to the blade through a system to operate the control thereby to effect the angle of incidence of the blade periodically or at selected times, or at selected angles in the 360 degree rotation determined essentially by the position of the actuator on the body. There is selective interactive force or movement thereby to selectively change the blade angle of incidence in requisite response to the control.

The control selectively changes the blade angle of incidence in requisite response to the control, and periodically or at selected times, or at selected angles in the 360 degree rotation determined essentially by the position of the actuator on the body. This permit the blade angle to be responsive to forces unrelated to the control.

The helicopter is preferably provided with an auxiliary stabilizer rotor which is driven by the shaft of the main rotor and which is provided with two vanes extending essentially in line with their longitudinal axis. The 'longitudinal' axis is seen in the sense of rotation of the main rotor, and is essentially parallel to the longitudinal axis of at least one of the rotor blades of the main rotor or is located within a relatively small acute angle with the latter blade axis. This auxiliary stabilizer rotor is provided in a swinging manner on an oscillatory shaft which is provided essentially transversal to the rotor shaft of the main rotor. This is directed essentially transverse to the longitudinal axis of the vanes. The main rotor and the auxiliary rotor are connected to each other through a mechanical link, such that the swinging motions of the auxiliary rotor control the angle of incidence of at least one of the rotor blades of the main rotor.

The helicopter should meet the following requirements to a greater or lesser degree:

(a) it can return to a stable hovering position, in case of an unwanted disturbance of the flight conditions. Such disturbance may occur in the form of a gust of wind, turbulences, a mechanical load change of the body or the rotors, a change of position of the body as a result of an adjustment to the cyclic variation of the pitch or angle of incidence of the rotor blades of the main rotor or a steering of the tail rotor or the like with a similar effect; and (b) the time required to return to the stable position should be relatively short and the movement of the helicopter should be relatively small.

To this end, the disclosure concerns an improved helicopter including a body with a tail; a main rotor with blades which are driven by a rotor shaft and which are hinge-mounted to the rotor shaft by means of a joint. The angle between the surface of rotation of the main rotor and the rotor shaft may vary. A tail rotor is driven by a second rotor shaft which is directed transversal to the rotor shaft of the main rotor.

In practice, it appears that such an improved helicopter is more stable and stabilizes itself relatively quickly with or without a restricted intervention of the user.

According to different aspect of the disclosure, the helicopter is made more stable by suspending the tail rotor with its rotor shaft in a swing which can rotate round a swing shaft. The swing shaft essentially extends in the longitudinal direction relative to the body of the helicopter.

In case of malfunction or the like, whereby the helicopter starts to turn round the rotor shaft of the main rotor in an unwanted manner, the tail rotor, as a result of the gyroscopic precession acting on the rotating tail rotor as a result of the rotation round the rotor shaft of the main rotor, should tilt round the swing shaft of the tail rotor at a certain angle.

By measuring the relative angular displacement of the swing and by using the measured signal as an input signal for a microprocessor which controls the drive of the main rotor and the drive of the tail rotor as a function of a stabilizer algorithm, the thrust of the tail rotor can be adjusted so as to counteract the unwanted effect of the disturbance and to thus automatically restore the stable flight conditions for the helicopter, with minimal or any intervention of the pilot.

The main rotor with blades is driven by a rotor shaft on which the blades are mounted. The auxiliary rotor is driven by the rotor shaft of the main rotor and is provided with vanes from the rotor shaft in the sense of rotation of the main rotor.

The auxiliary rotor is mounted in a swinging relationship on an oscillatory shaft and the swinging motion is relatively upwardly and downwardly about the auxiliary shaft. The auxiliary shaft is provided essentially transverse to the rotor shaft of the main rotor. The main rotor and the auxiliary stabilizer rotor are connected to each other by a mechanical link, such that the swinging motion of the auxiliary rotor controls the angle of incidence of at least one of the rotor blades of the main rotor.

The angle of incidence of the rotor in the plane of rotation of the rotor and the rotor shaft may vary; and an auxiliary rotor rotatable with the rotor shaft is for relative oscillating movement about the auxiliary rotor hinge. Different relative positions are such that the auxiliary rotor causes the angle of incidence of the main rotor to be different. A linkage between the main and auxiliary rotor causes changes in the position of the auxiliary rotor to translate to changes in the angle of incidence.

The rotor blades of the main rotor and the vanes of the auxiliary stabilizer rotor respectively are connected to each other with a mechanical linkage that permits the relative movement between the blades of the rotor and the vanes of the auxiliary rotor.

The rotor and stabilizer are interconnected. The rotor and stabilizer are also independent to move around the hinging lines as typically found in helicopter rotors. This can for example be feather or teether hinges.

DRAWINGS

The above-mentioned features and objects of the present disclosure will become more apparent with reference to the following description taken in conjunction with the accompanying drawings wherein like reference numerals denote like elements and in which:

FIG. 1 schematically represents a helicopter according to the disclosure in perspective;

FIG. 5 represents a view of the rear rotor part indicated in FIG. 1 by F5 to a larger scale;

Figure 11:
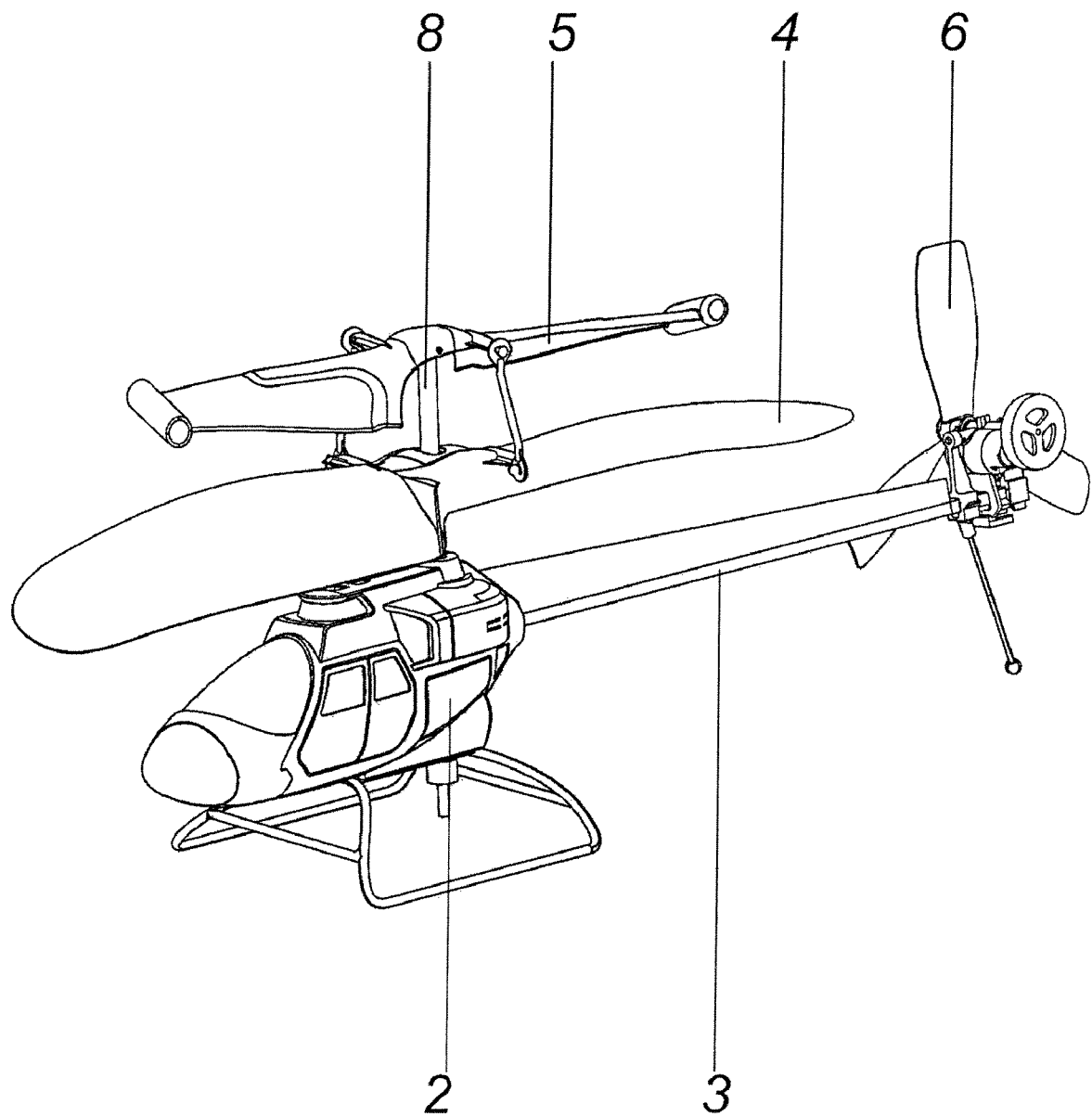
Figure 12:
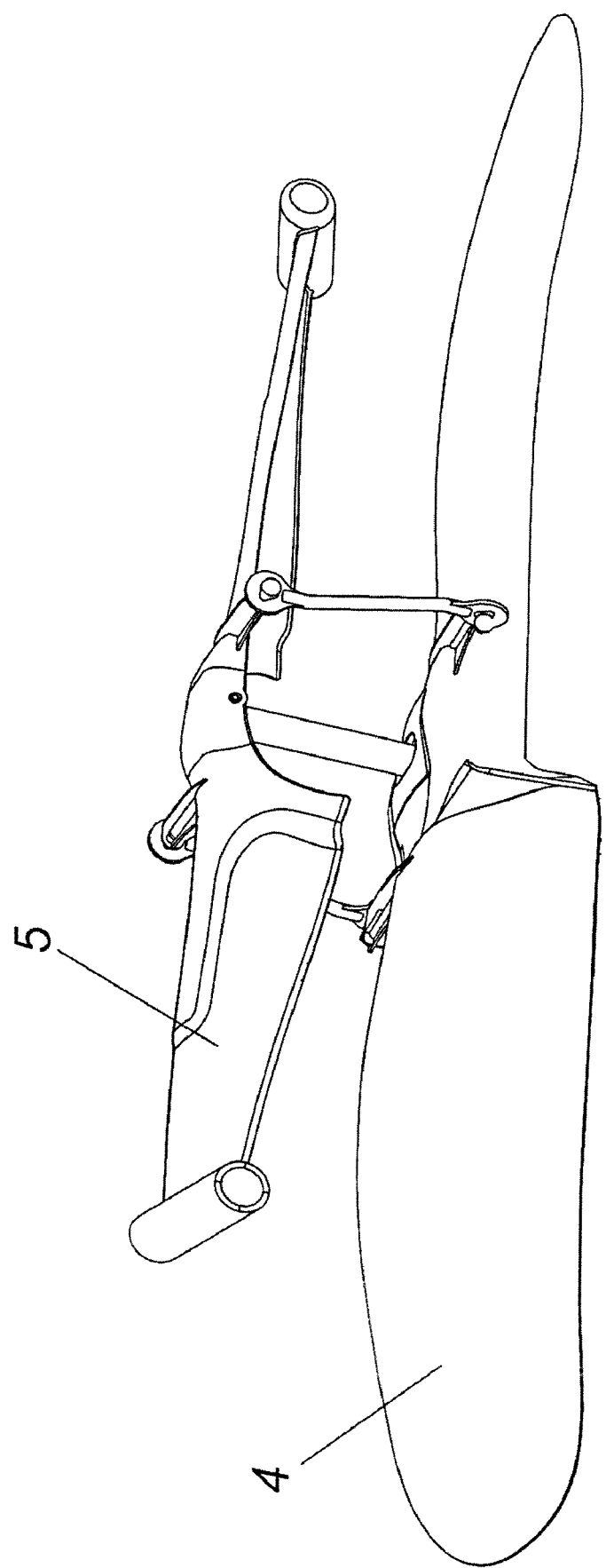
Figure 13:
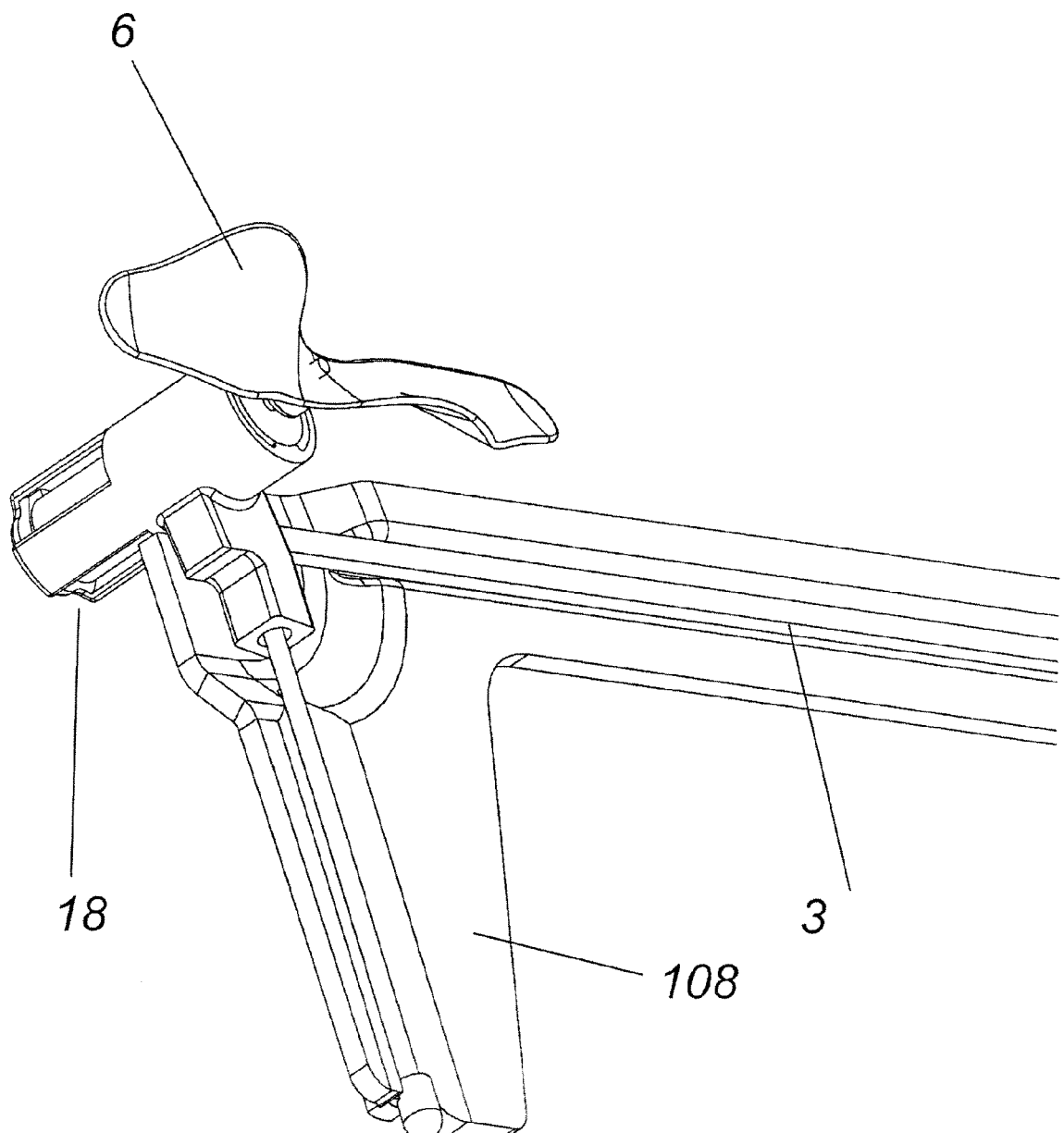
Figure 14:
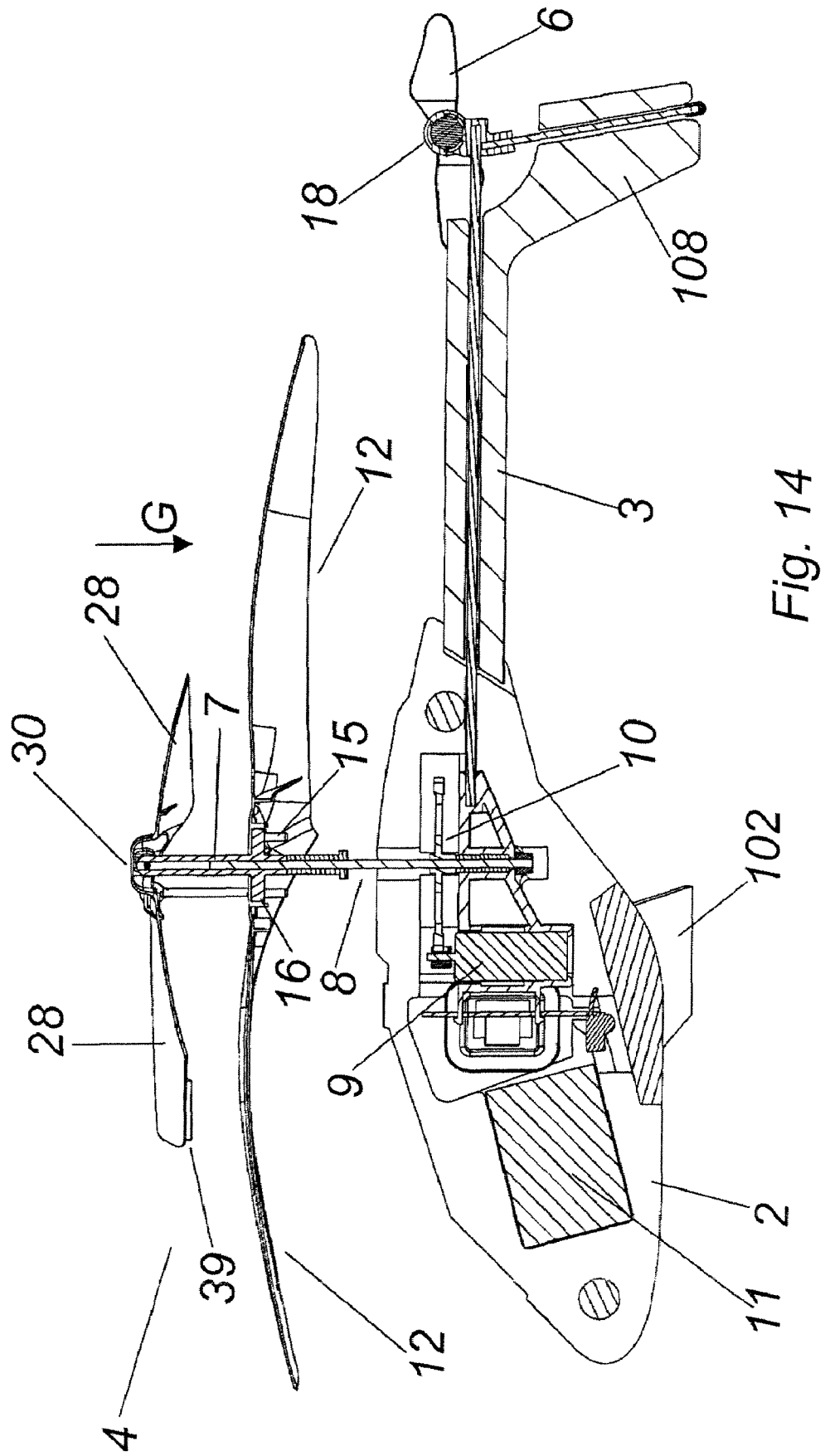
Figure 15:
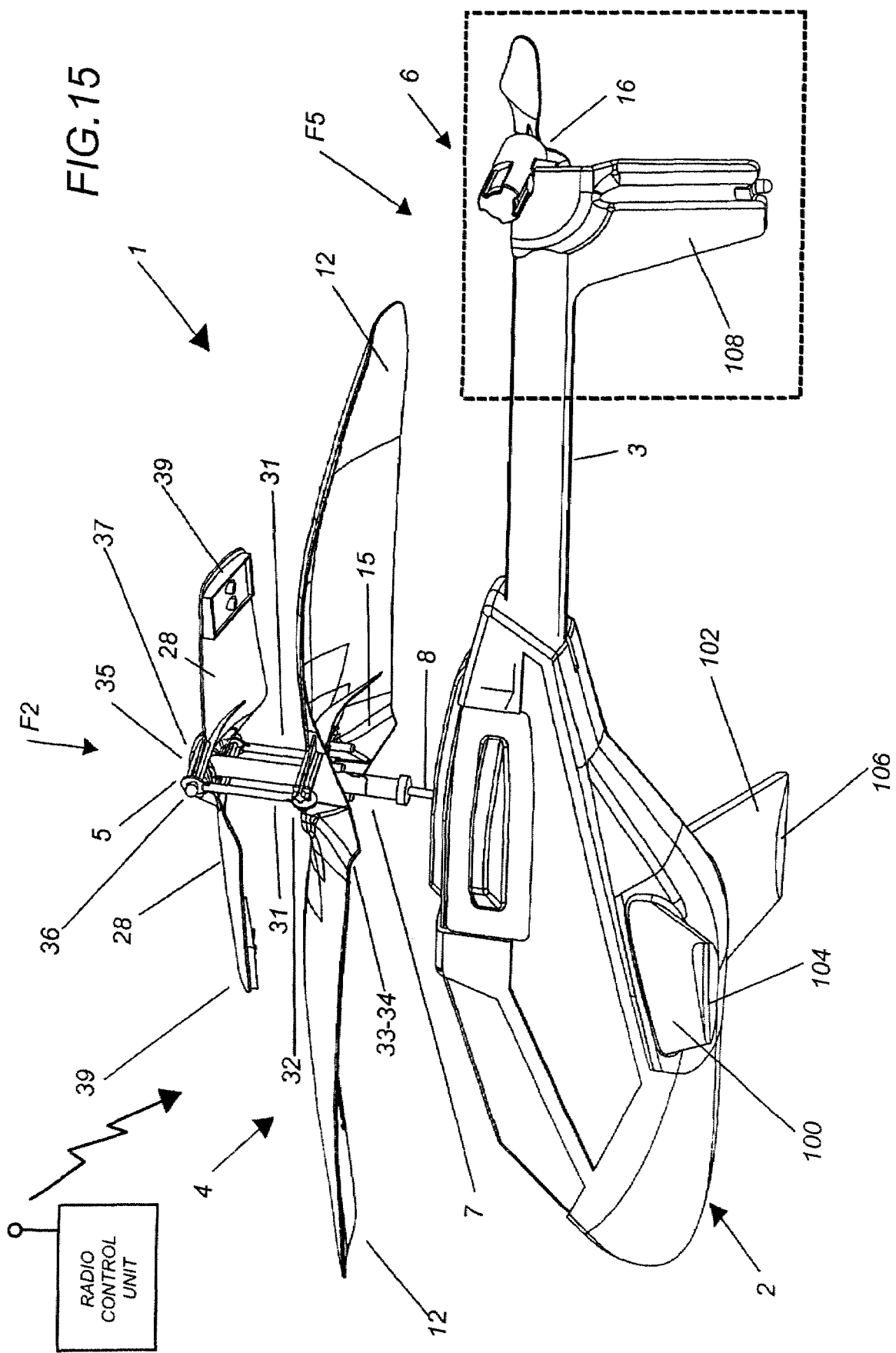
Figure 16:
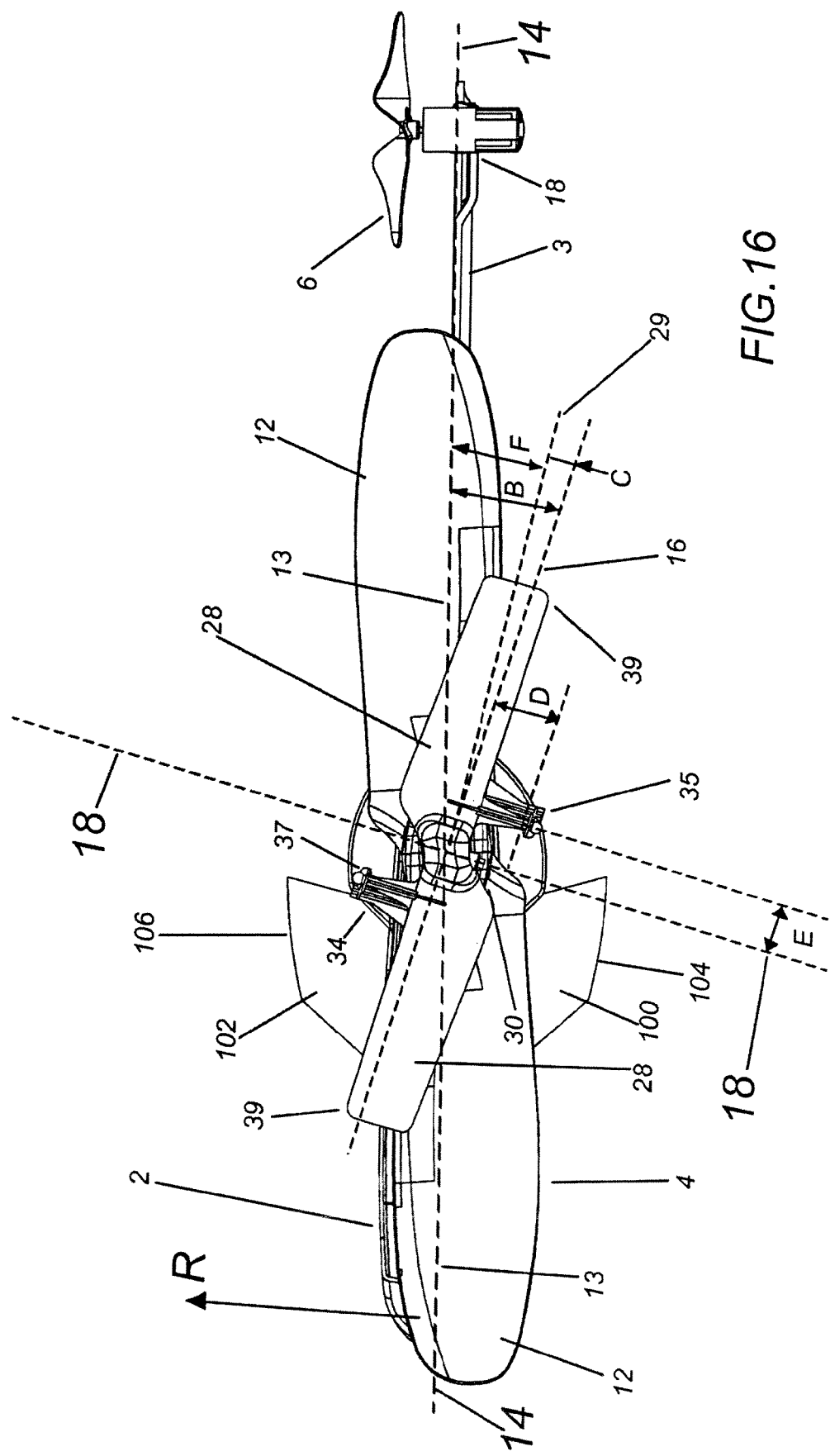
Figure 17:
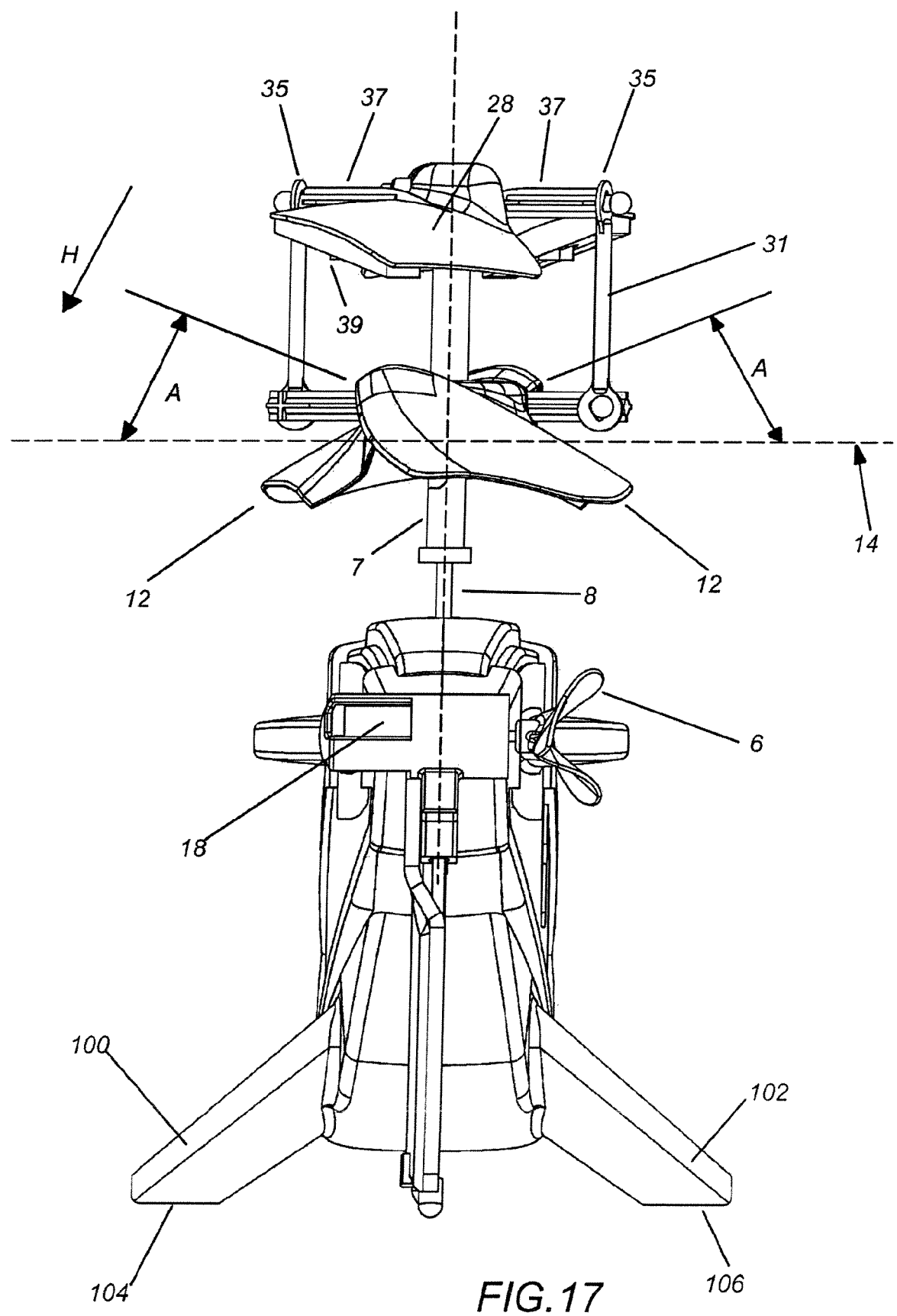
Figure 18:
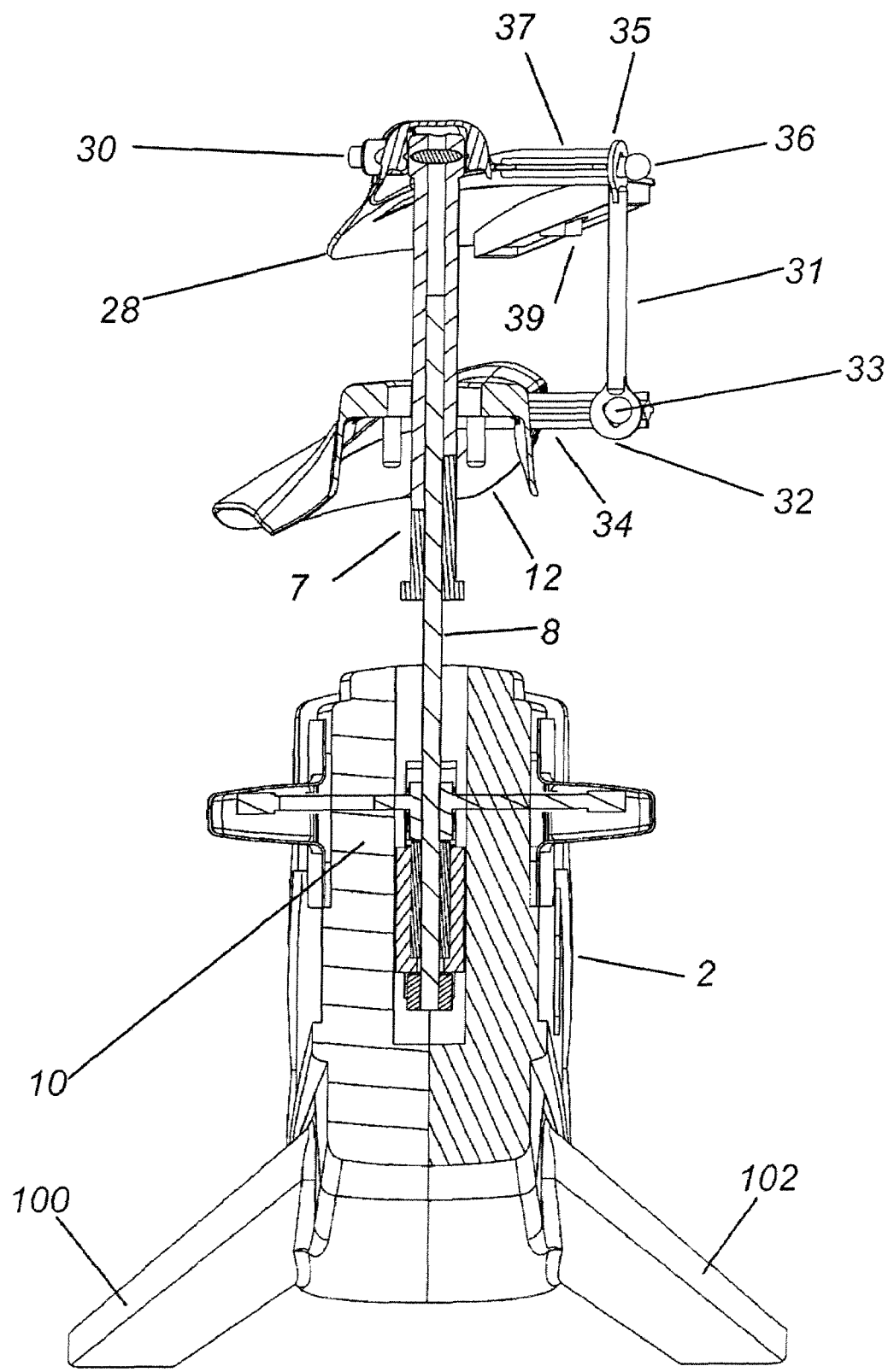
Figure 19:
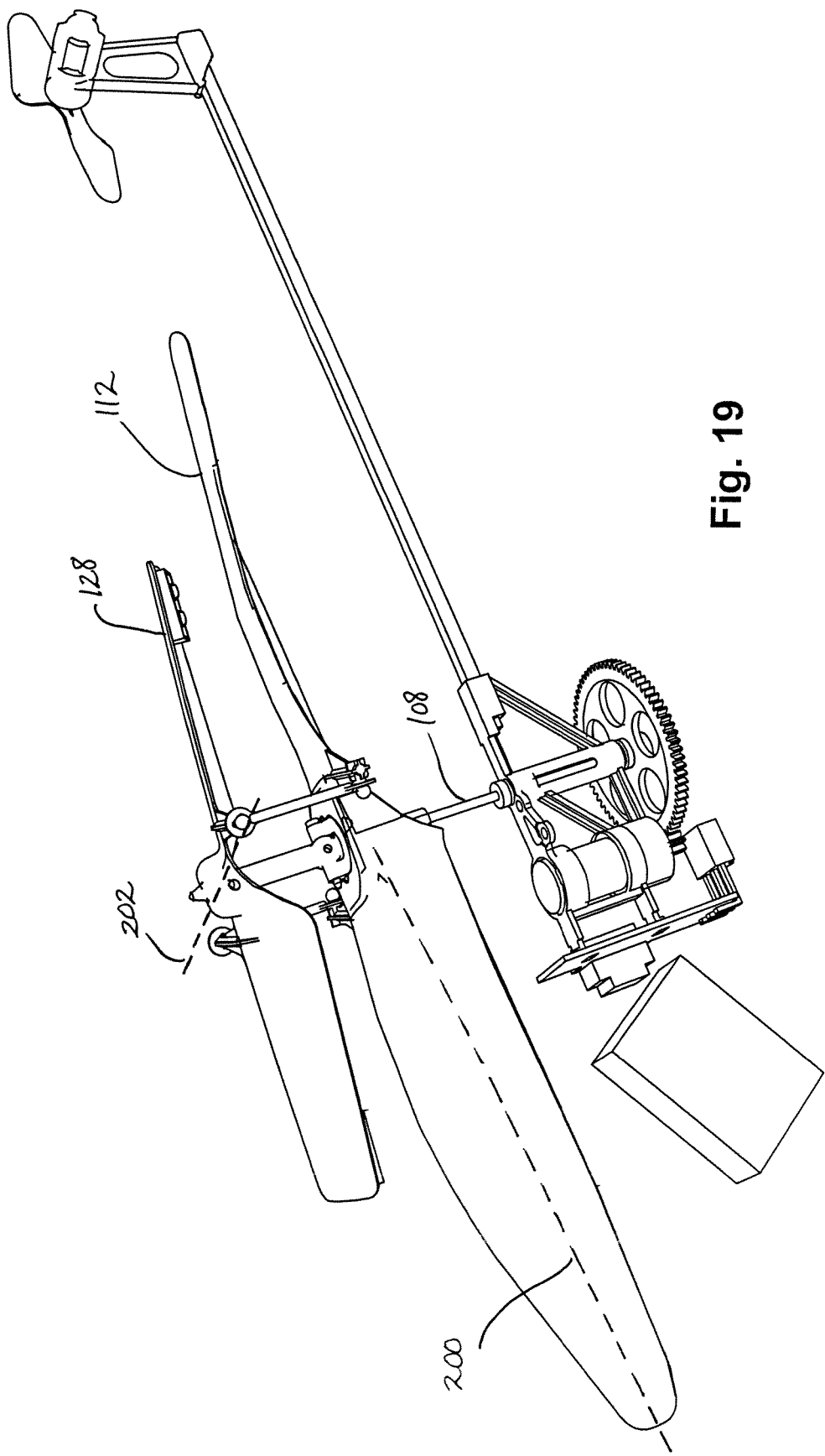

FIG. 11 schematically represents an alternative view of the helicopter according to the disclosure in perspective;

FIG. 12 is a perspective view of the main rotor and auxiliary rotor;

FIG. 13 is a perspective view of the tail rotor and tail stabilizer in a second embodiment of the helicopter;

FIG. 14 represents a side sectional view in the second embodiment of the helicopter;

FIG. 15 represent a perspective view of the second embodiment of the helicopter;

FIG. 16 represents a top view of the second embodiment of the helicopter;

FIG. 17 is a rear view of the second embodiment of the helicopter;

FIG. 18 represents a sectional view of the second embodiment of the helicopter along line !8-!8 of FIG. 16;

FIG. 19 illustrates a helicopter with a rotor that is spinning around to sustain the helicopter in flight and two axes are indicated.

Figure 20:
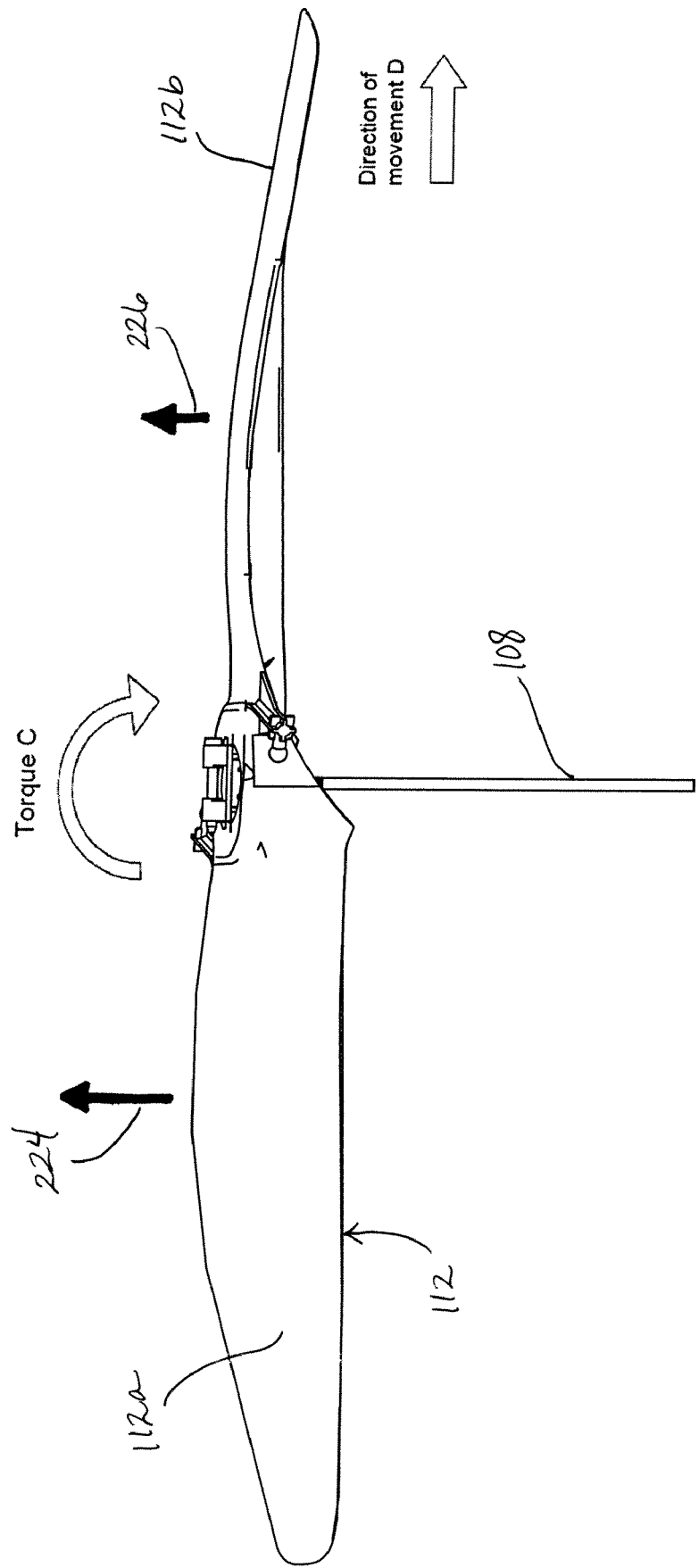
Figure 21:
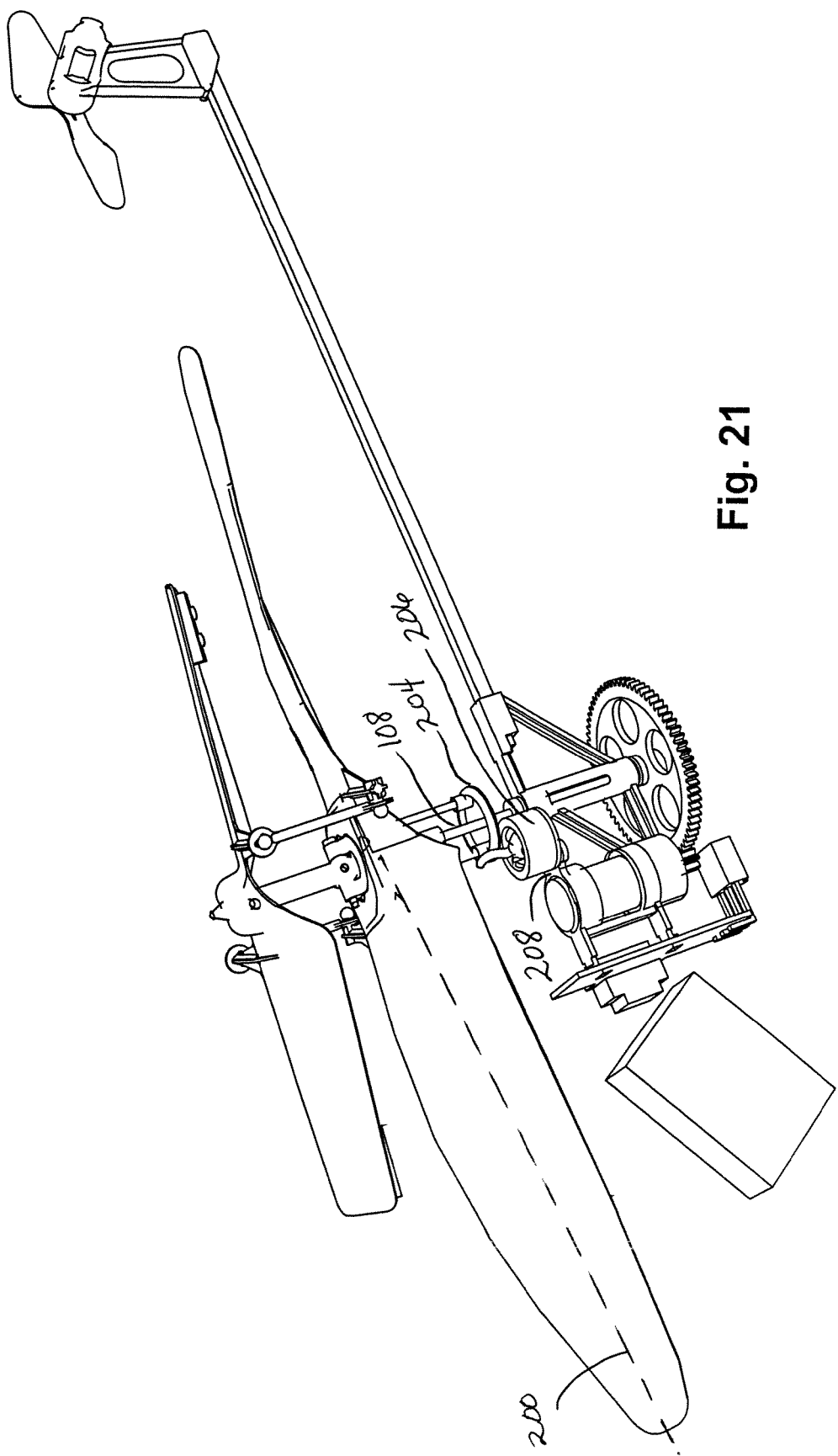
Figure 25:
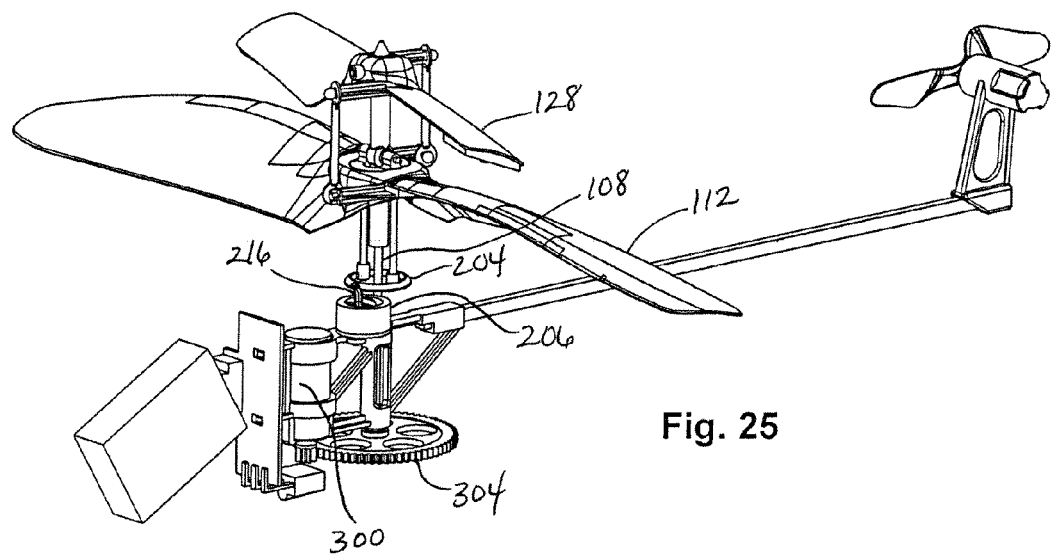
Figures 27A, 27B:
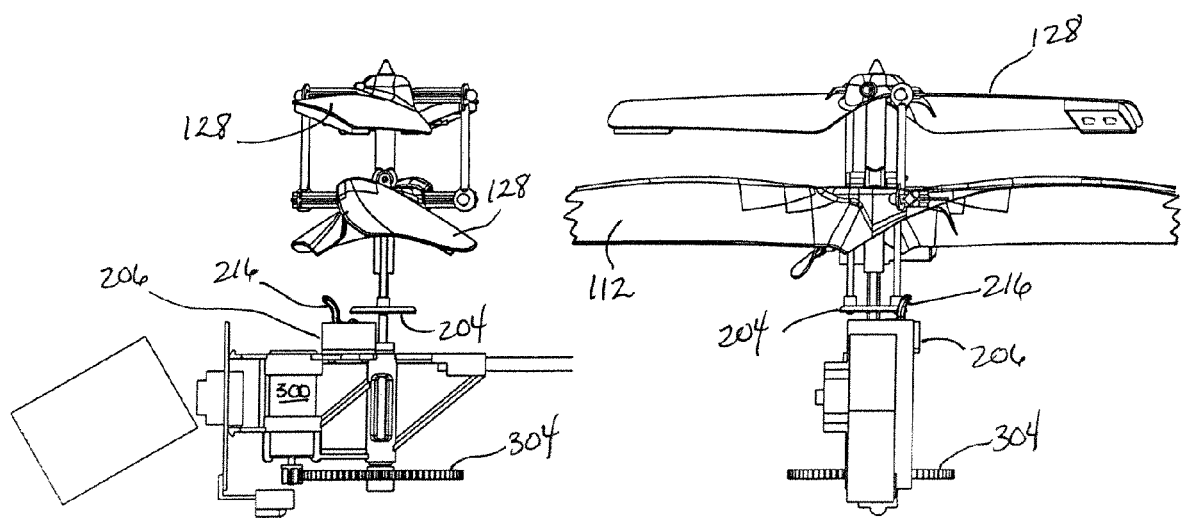
Figure 26:
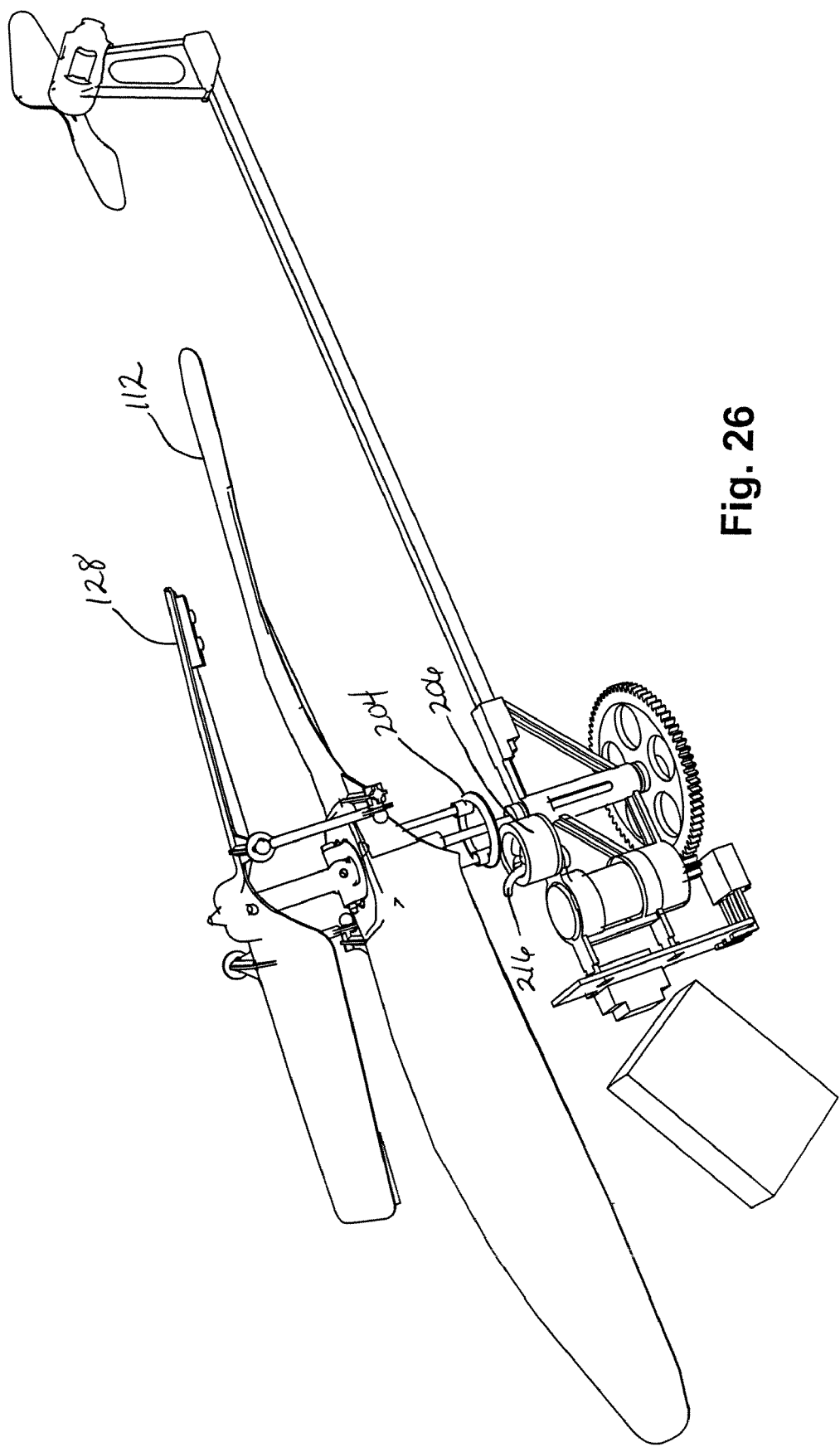
Figure 28A:
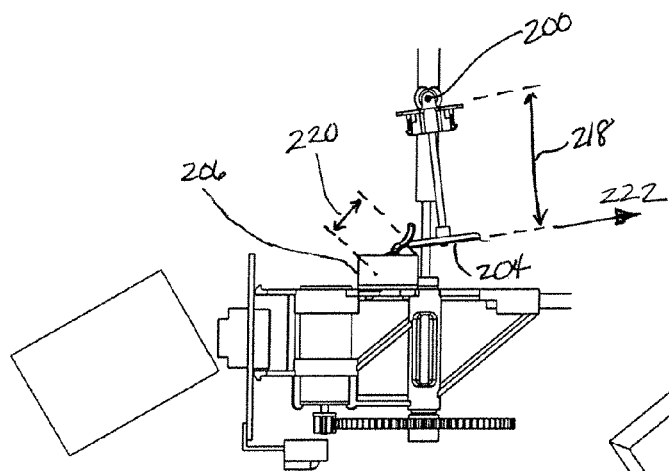
Figure 28B:
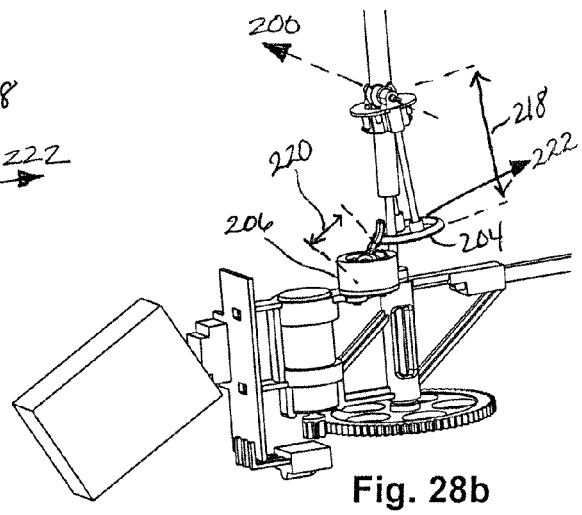
Figure 29A:
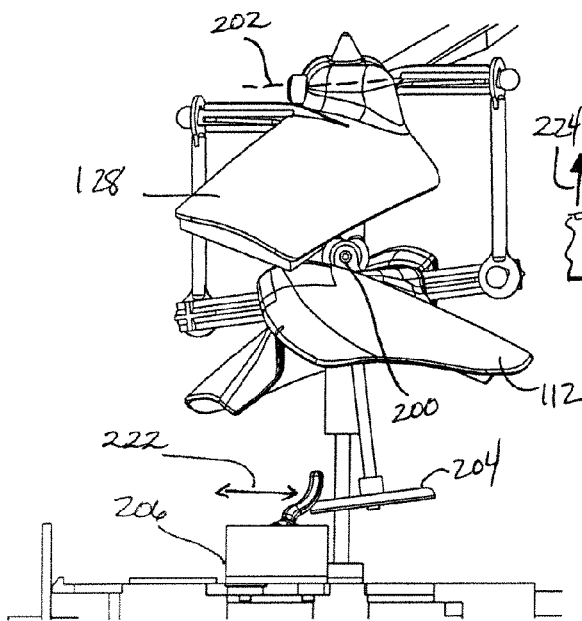
Figure 29B:
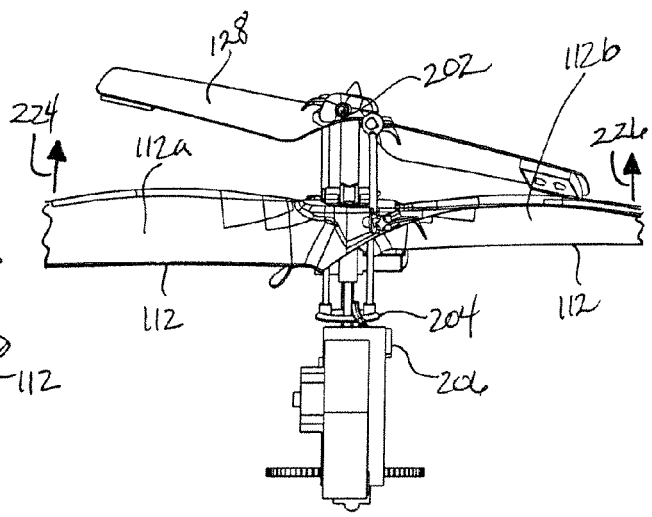
Figures 30A, 30B:
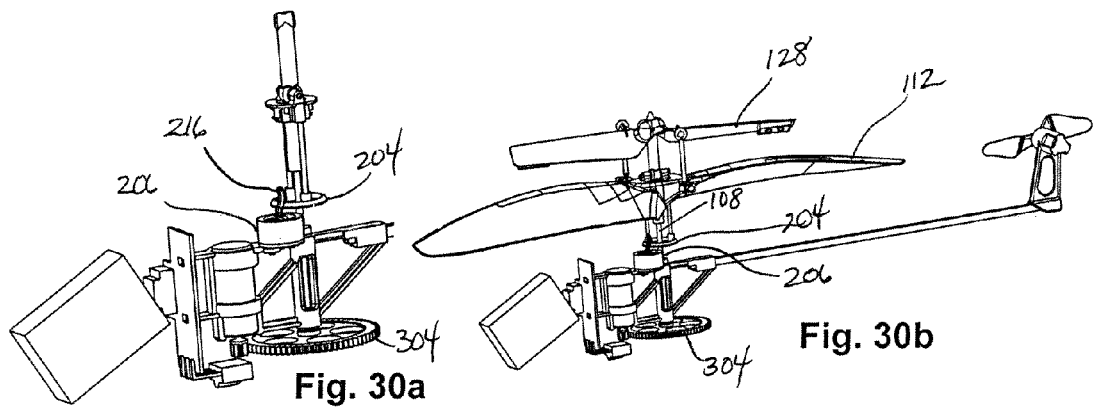
Figures 31A, 31B, 31C:
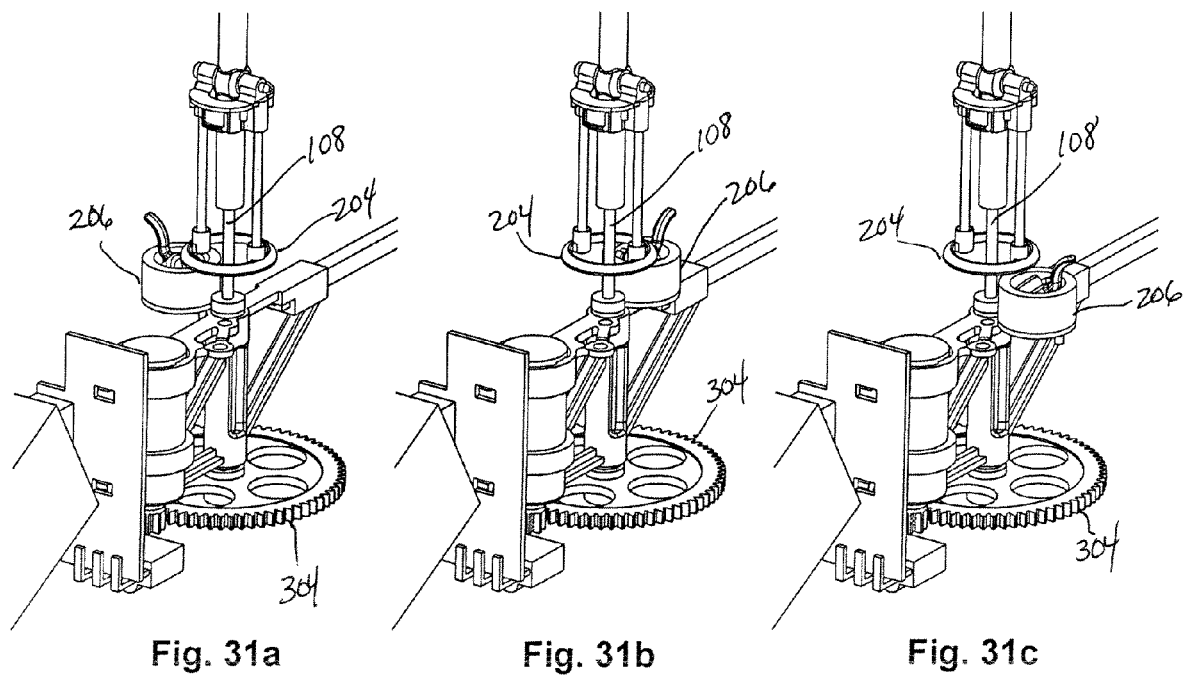
Figure 32:
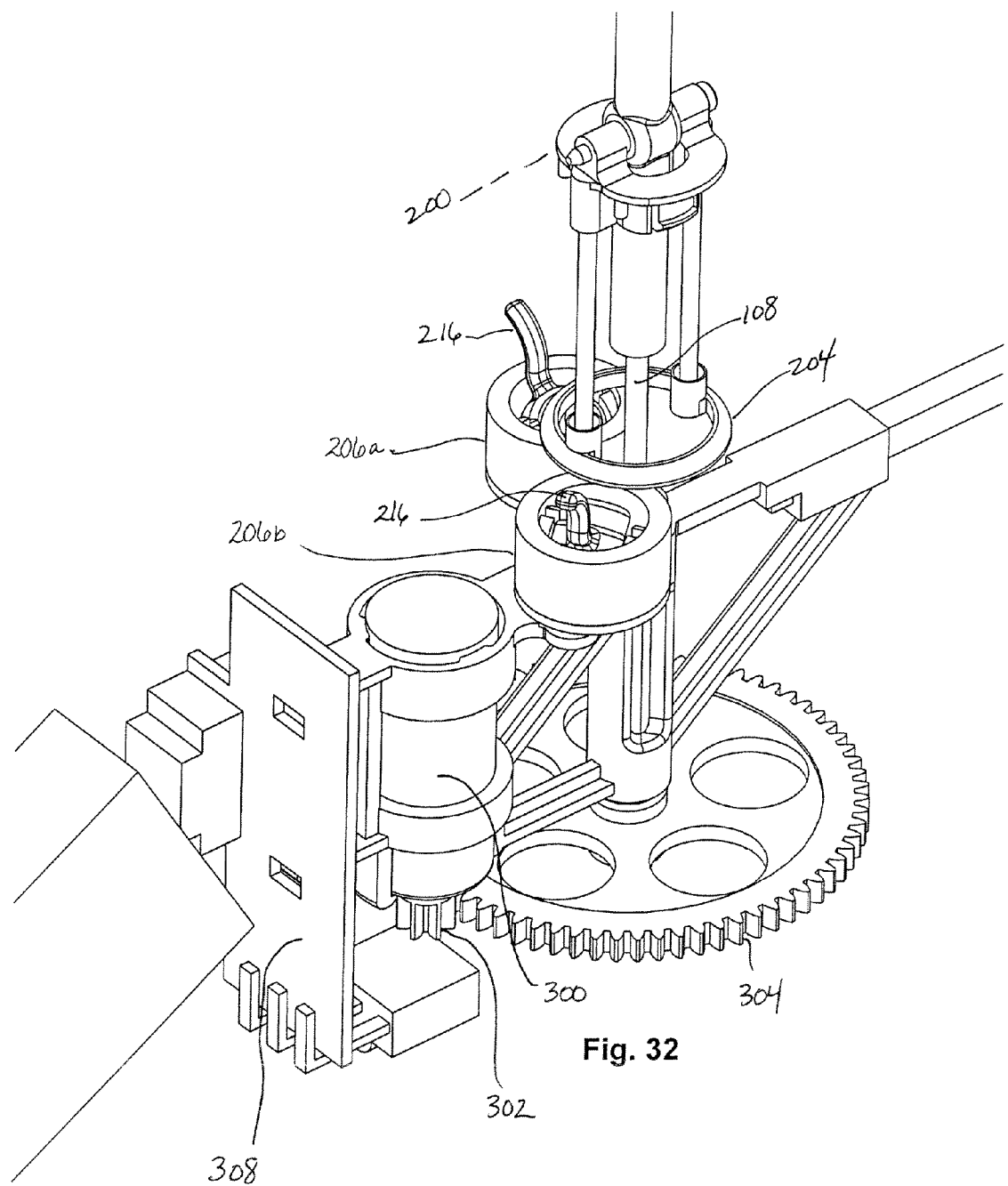
Figure 35:
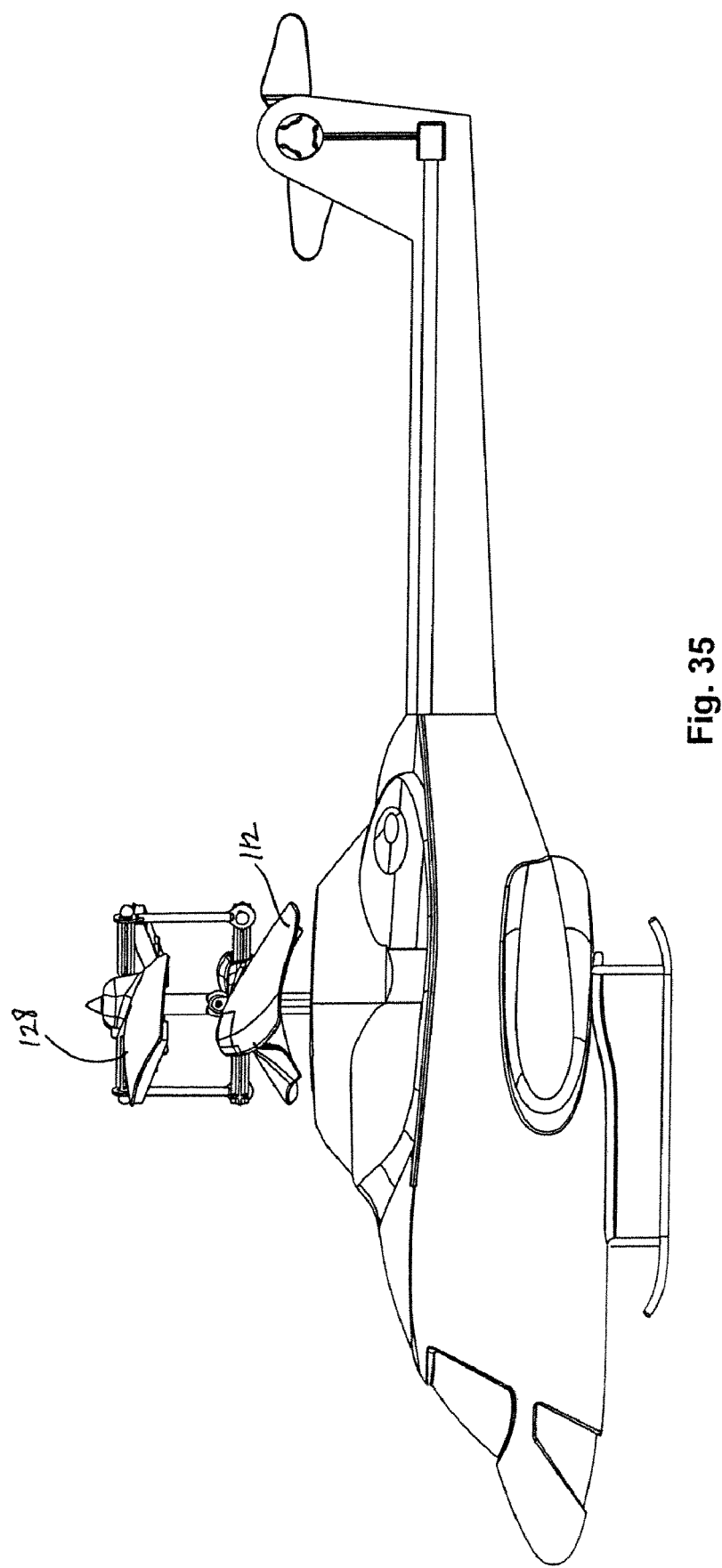
Figure 36:
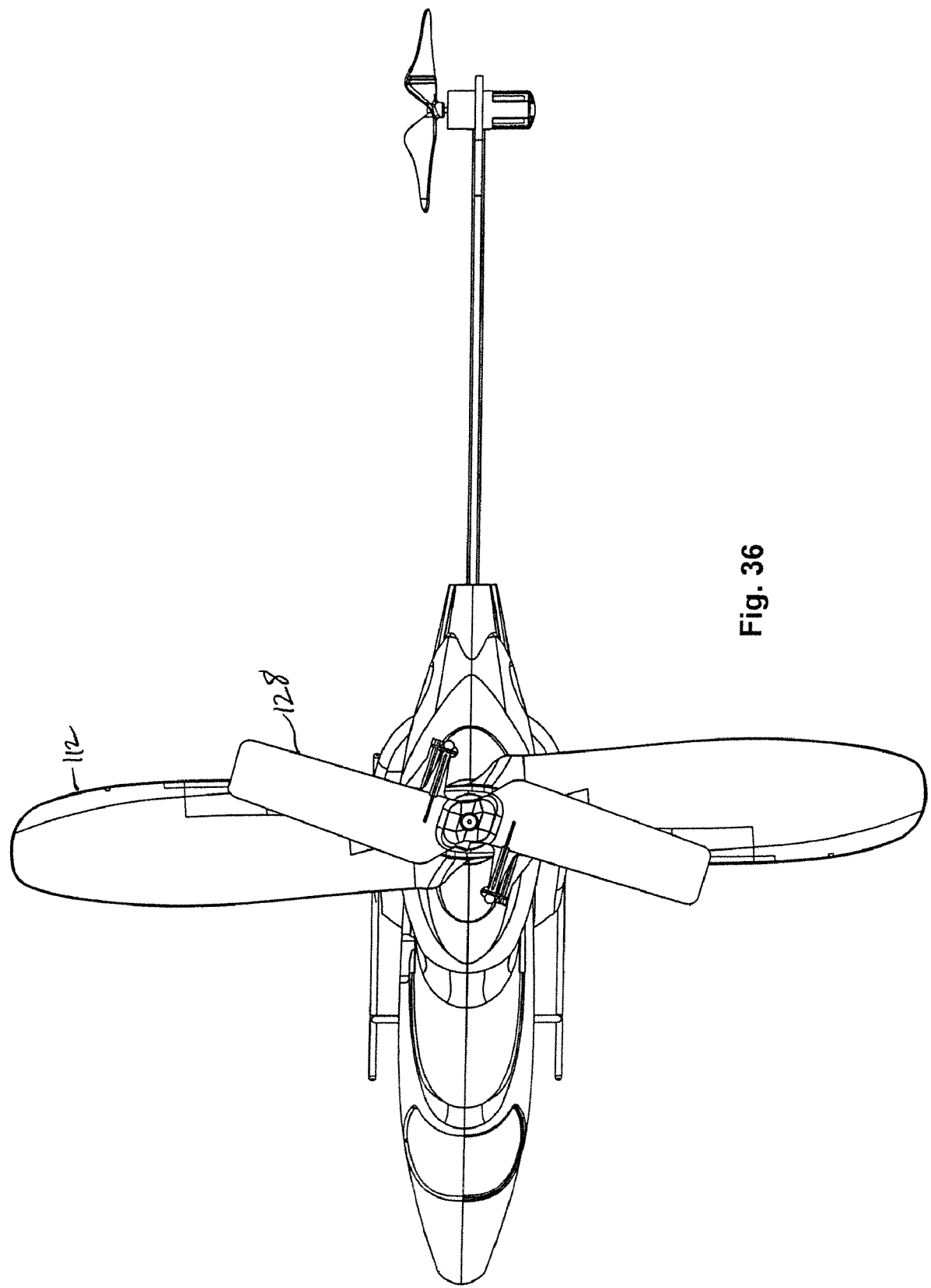
Figure 37:
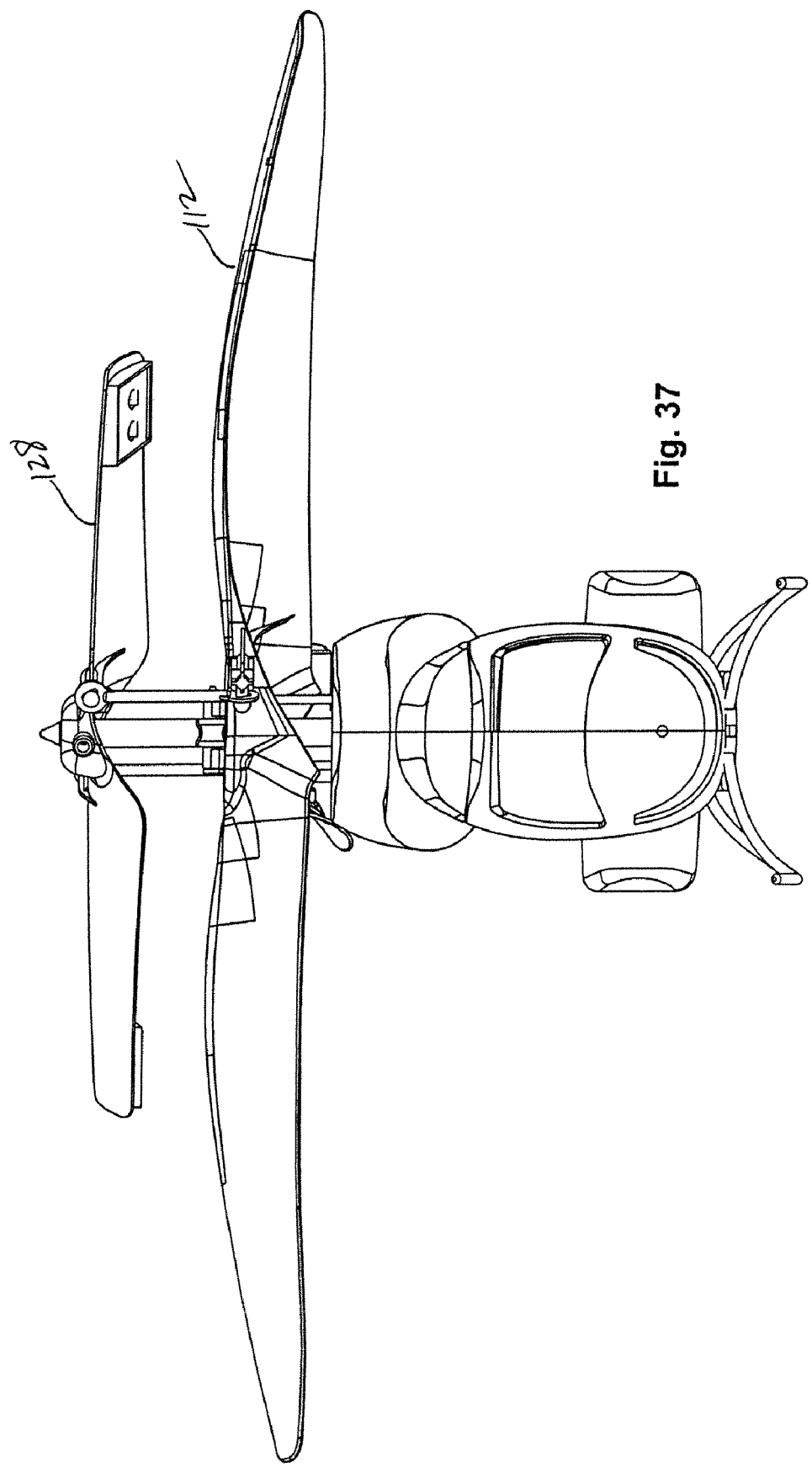
Figure 38:
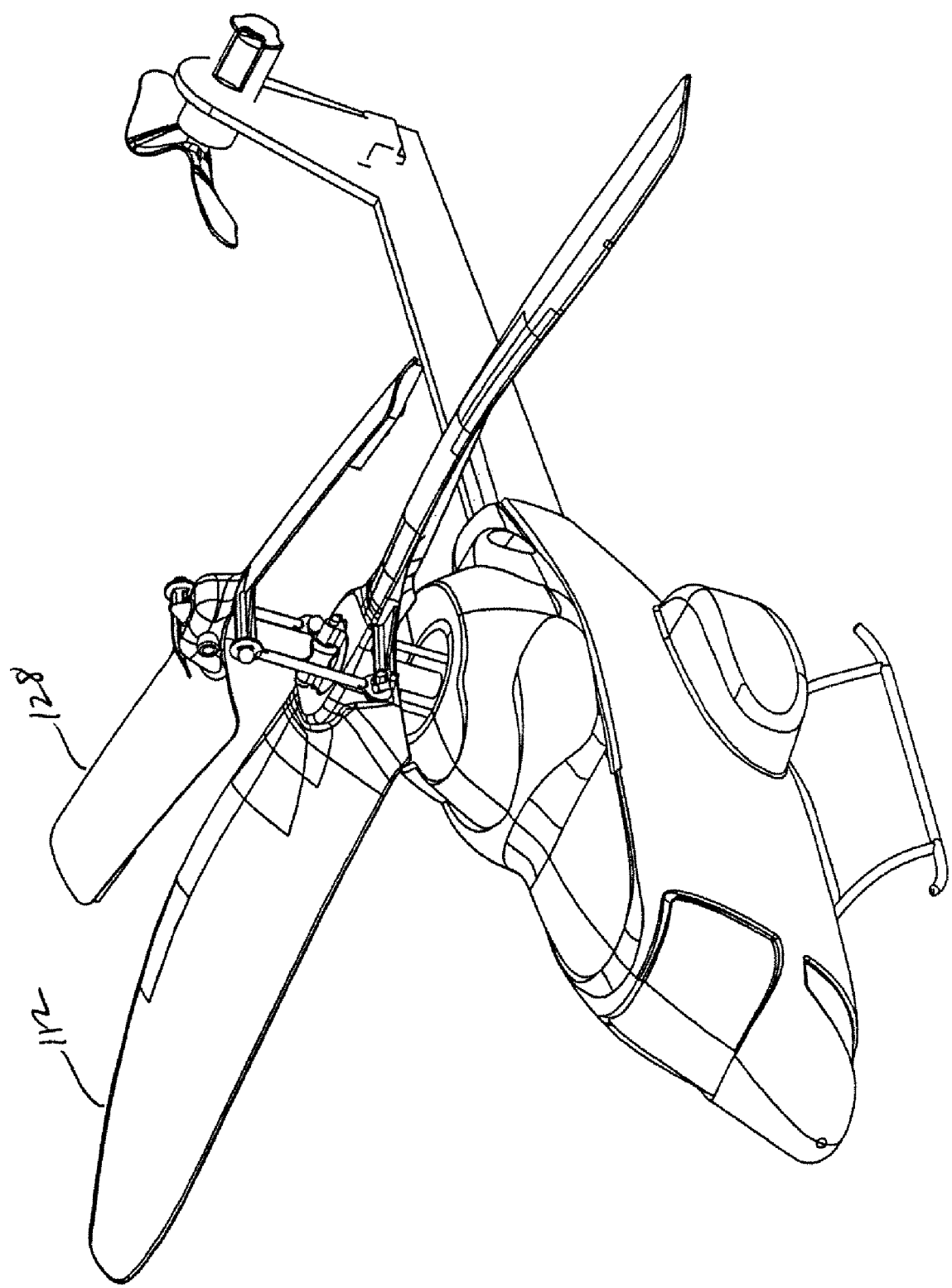
Figure 39:
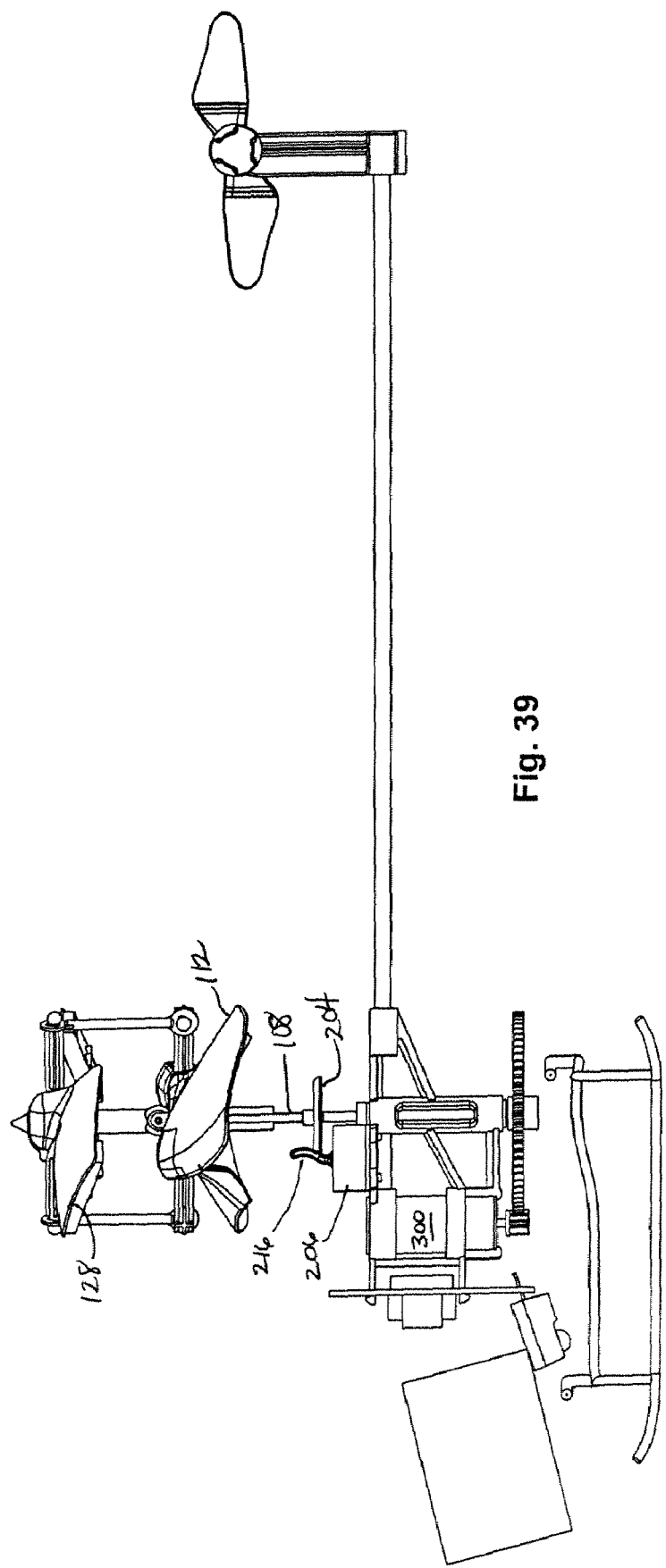
Figure 40:
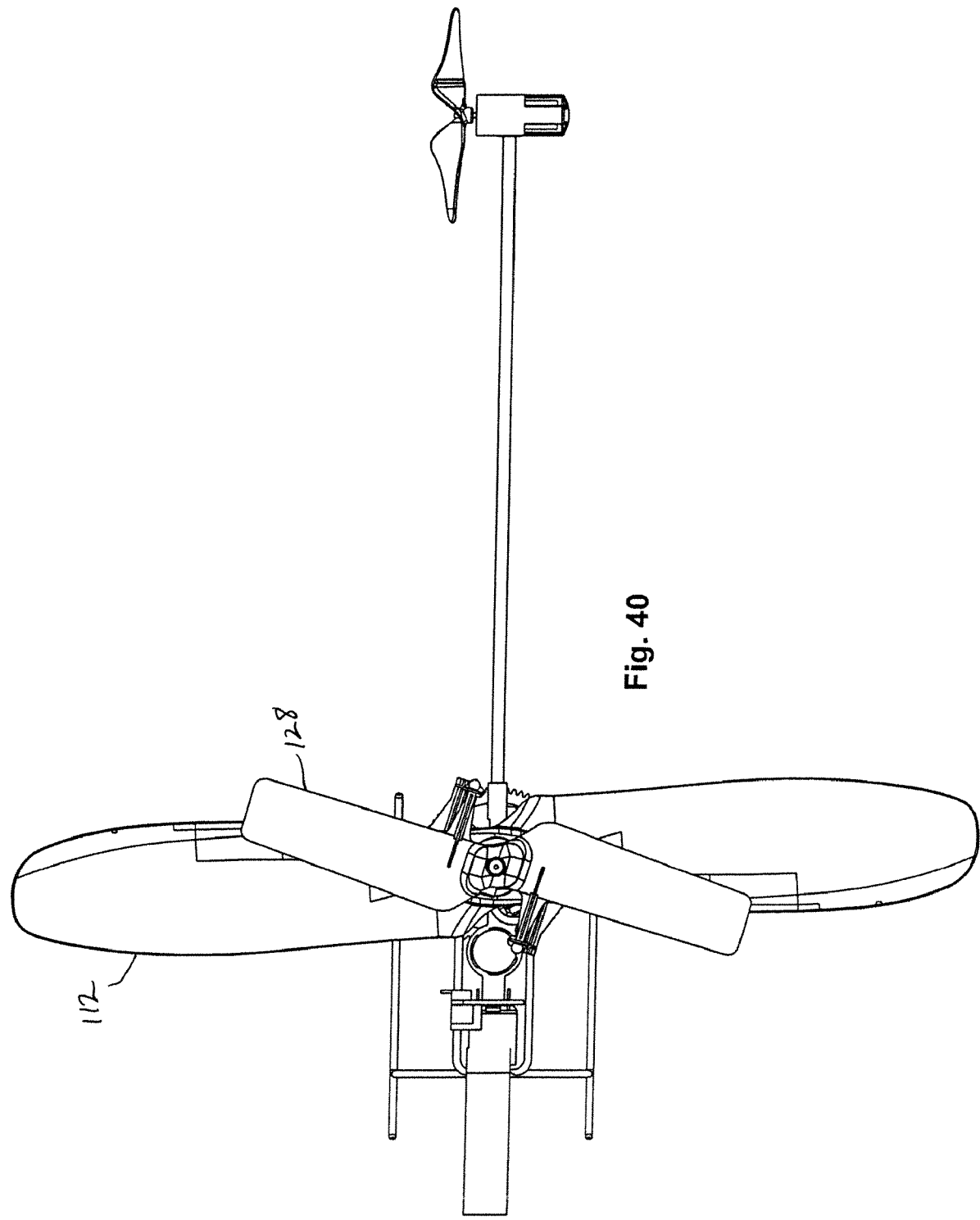
Figure 41:
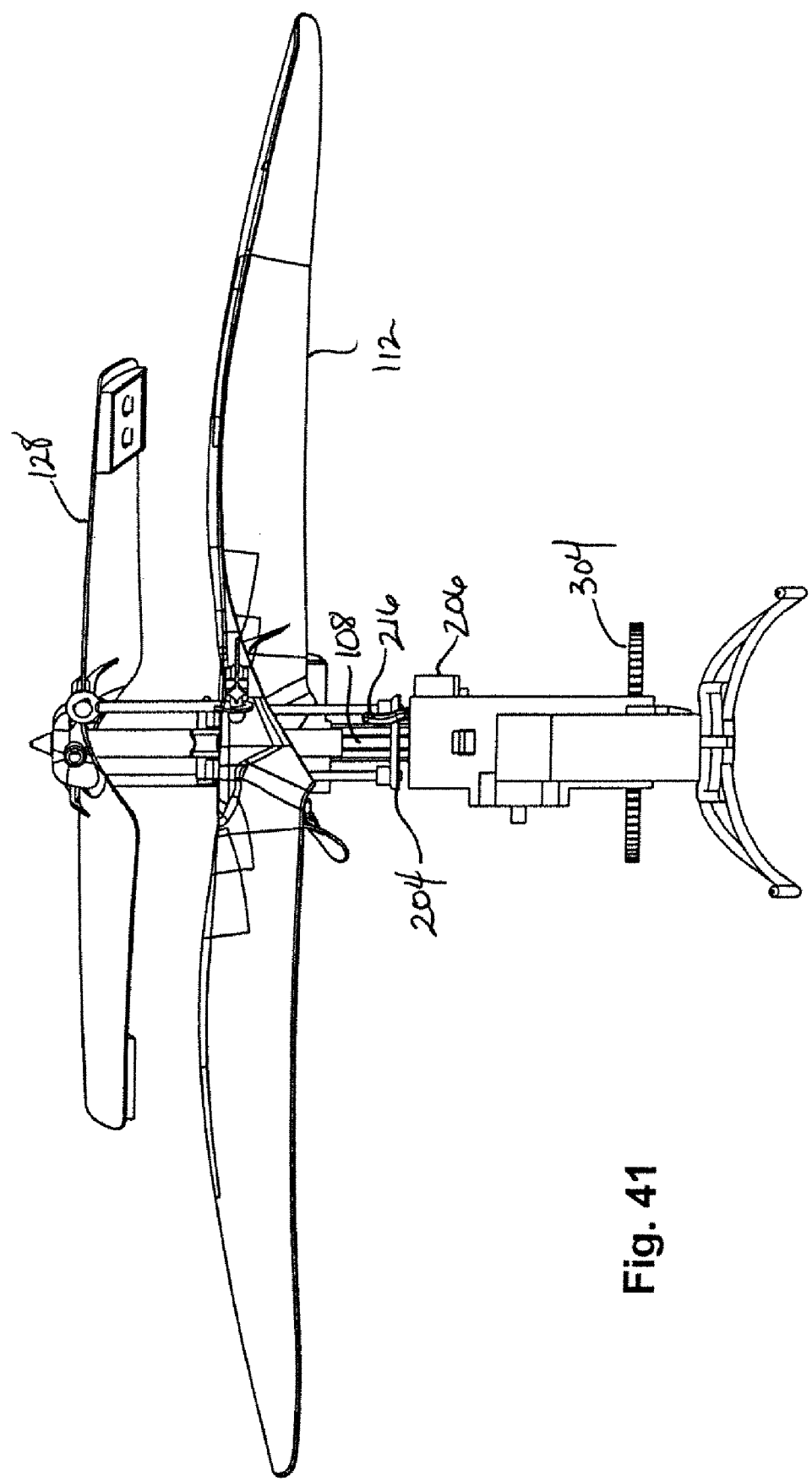
Figure 42:
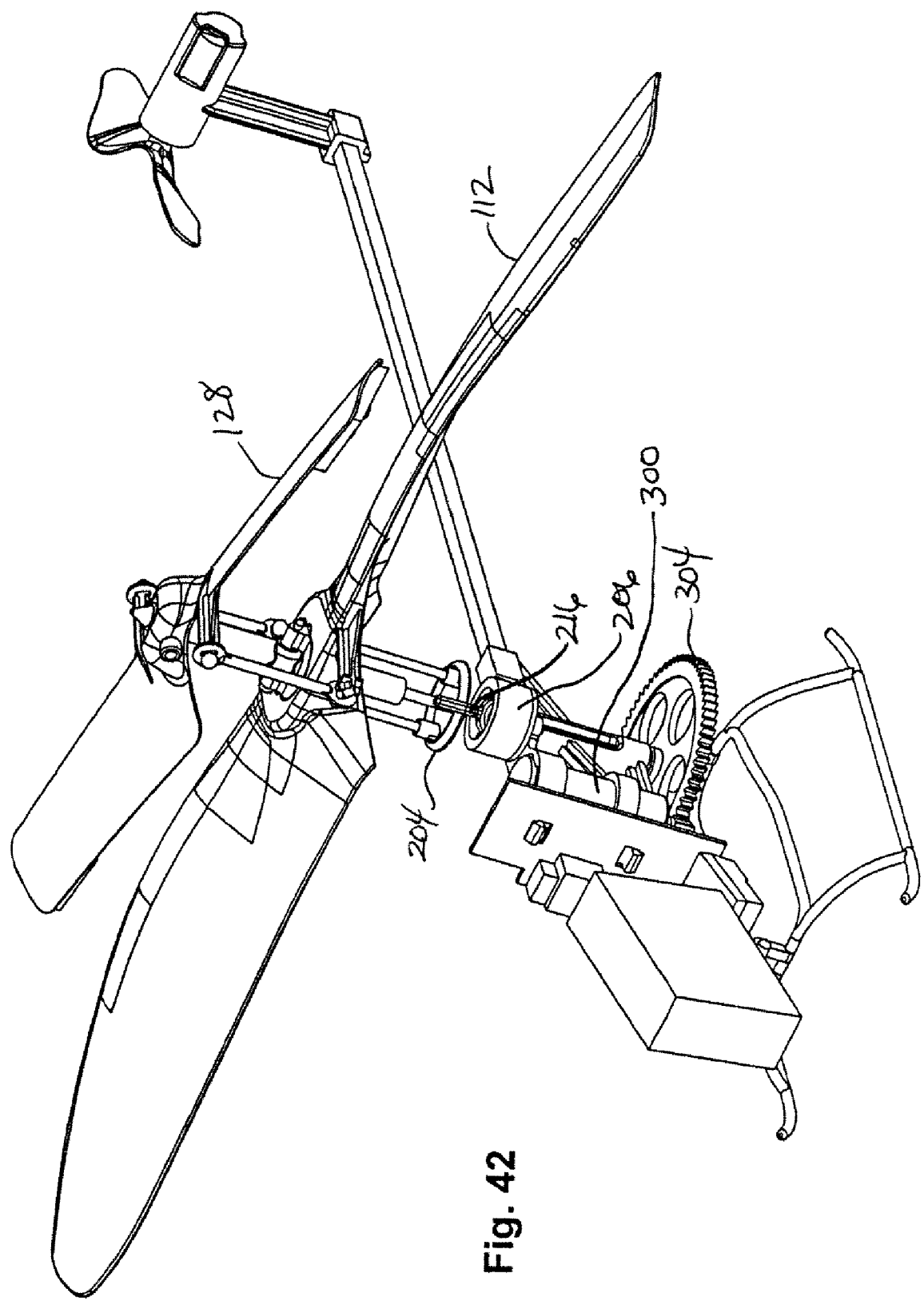
Figure 43:
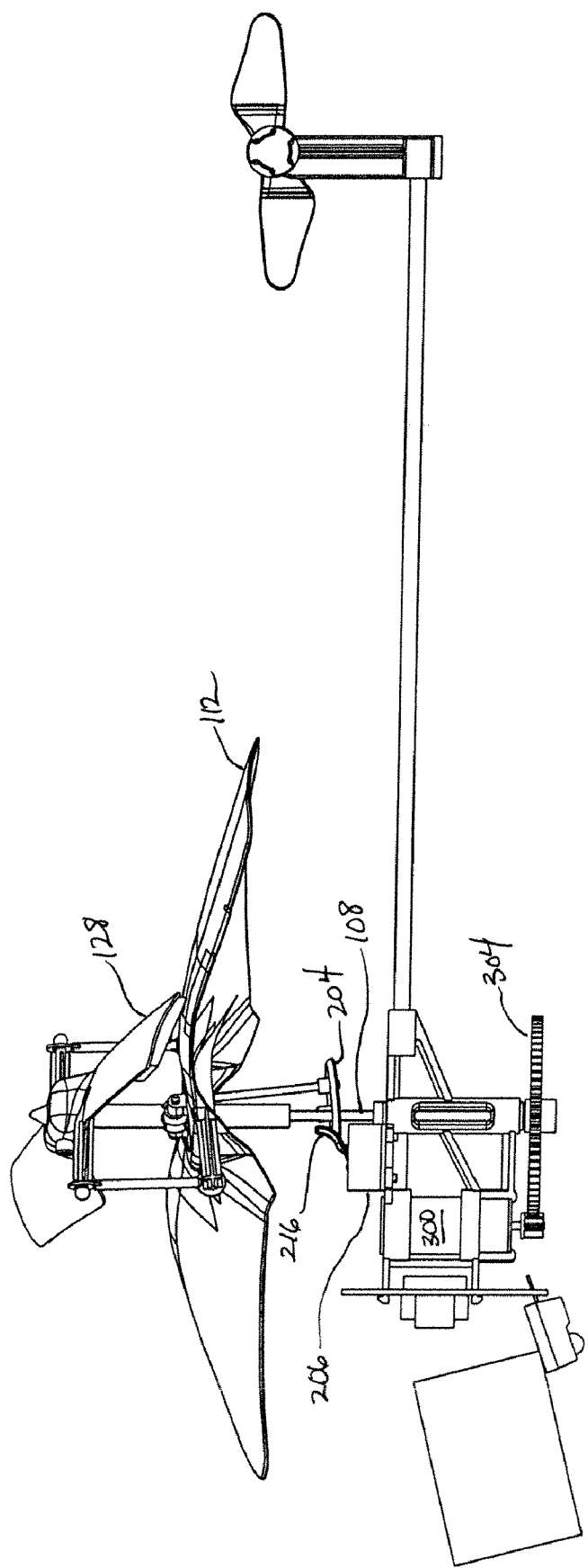
Figure 44:
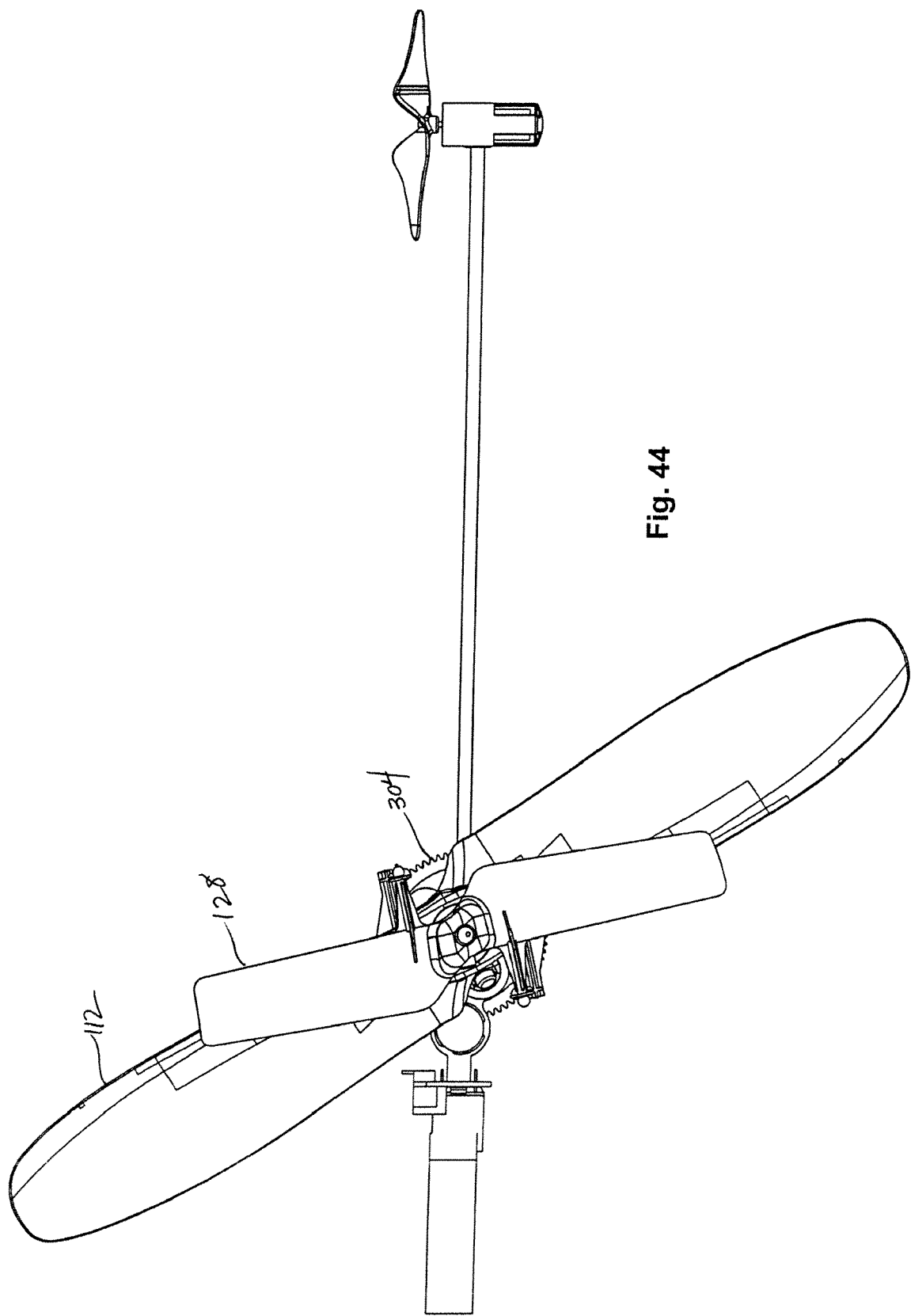
Figure 45:
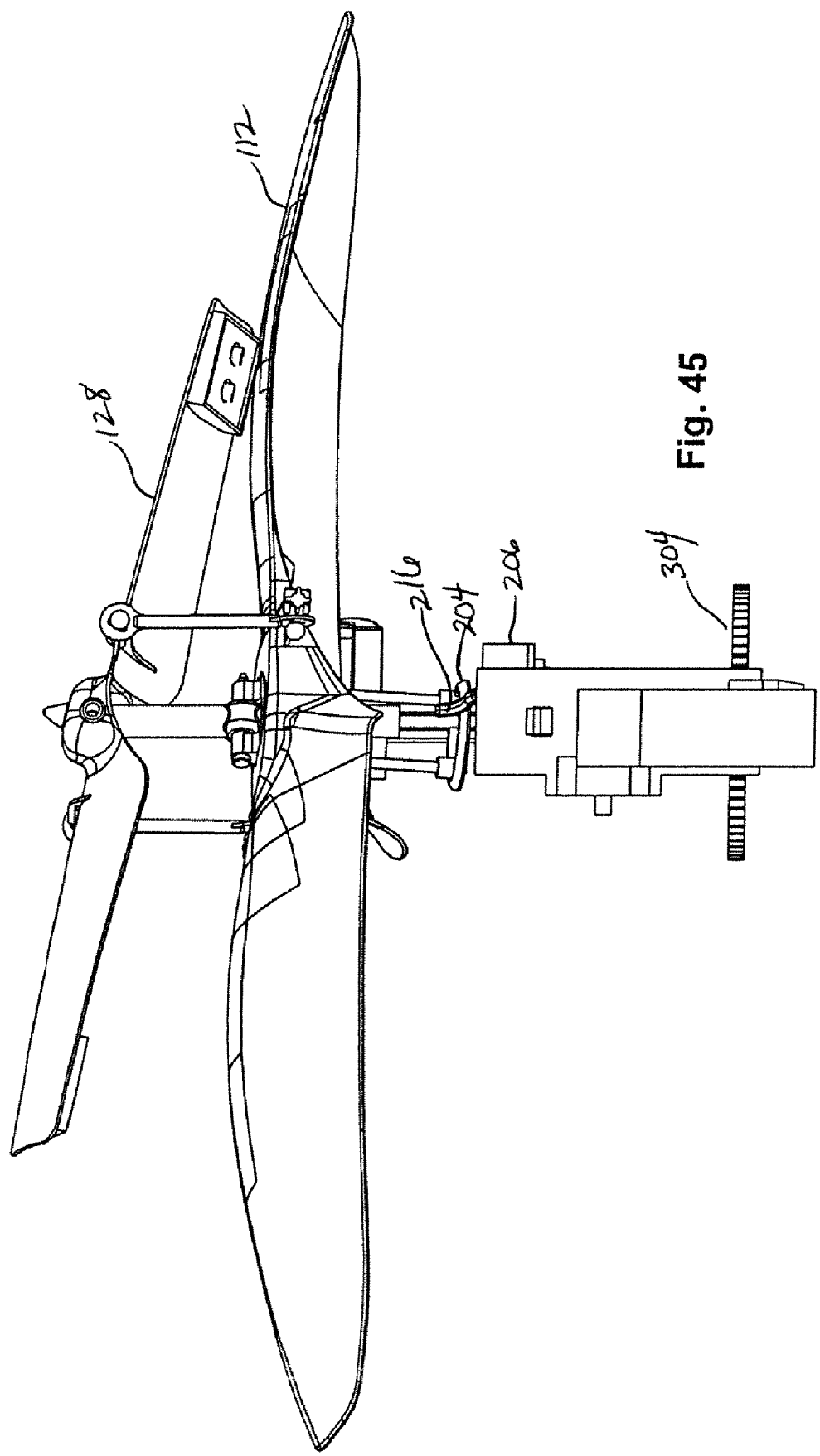
Figure 46:
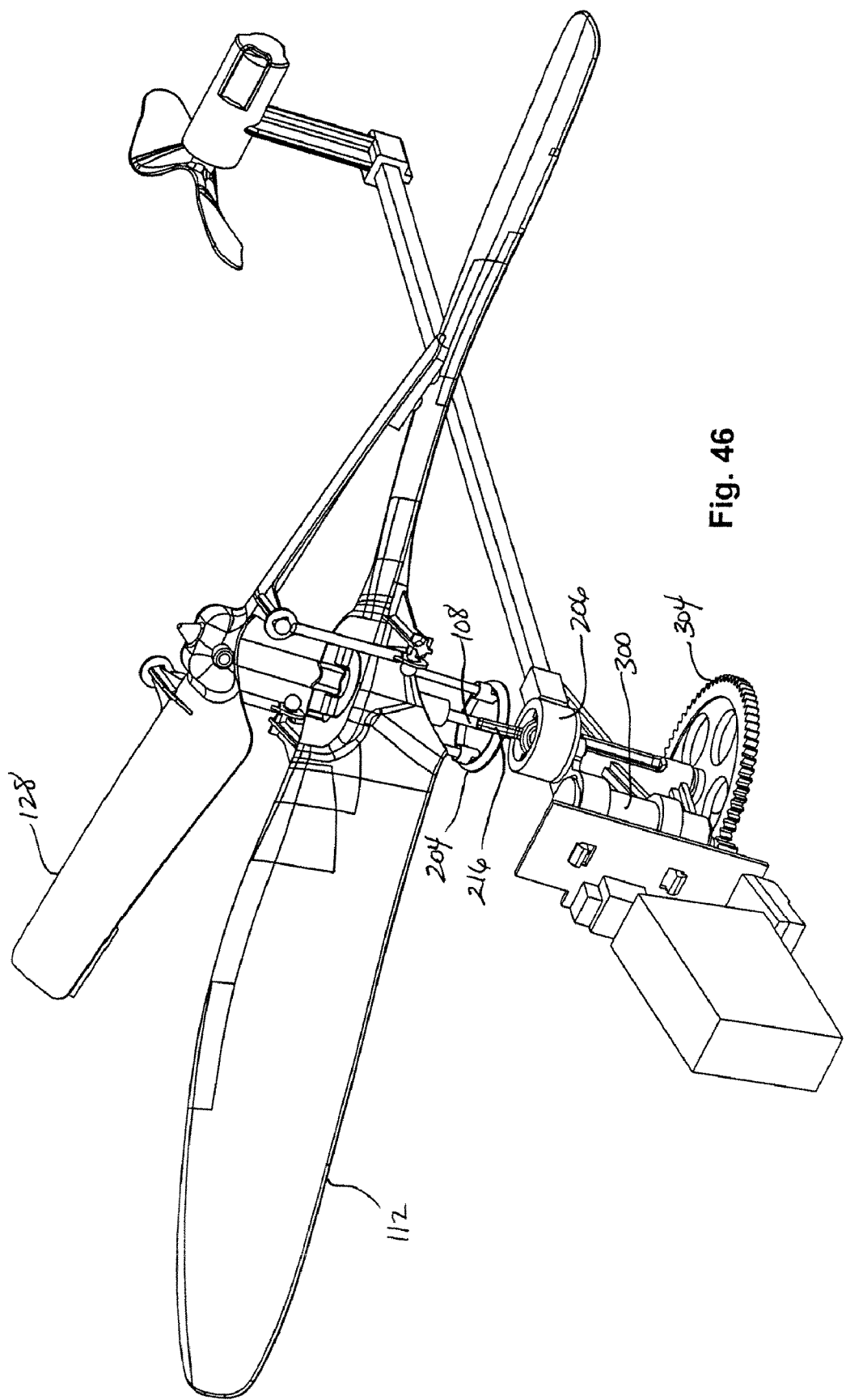
Figure 47:
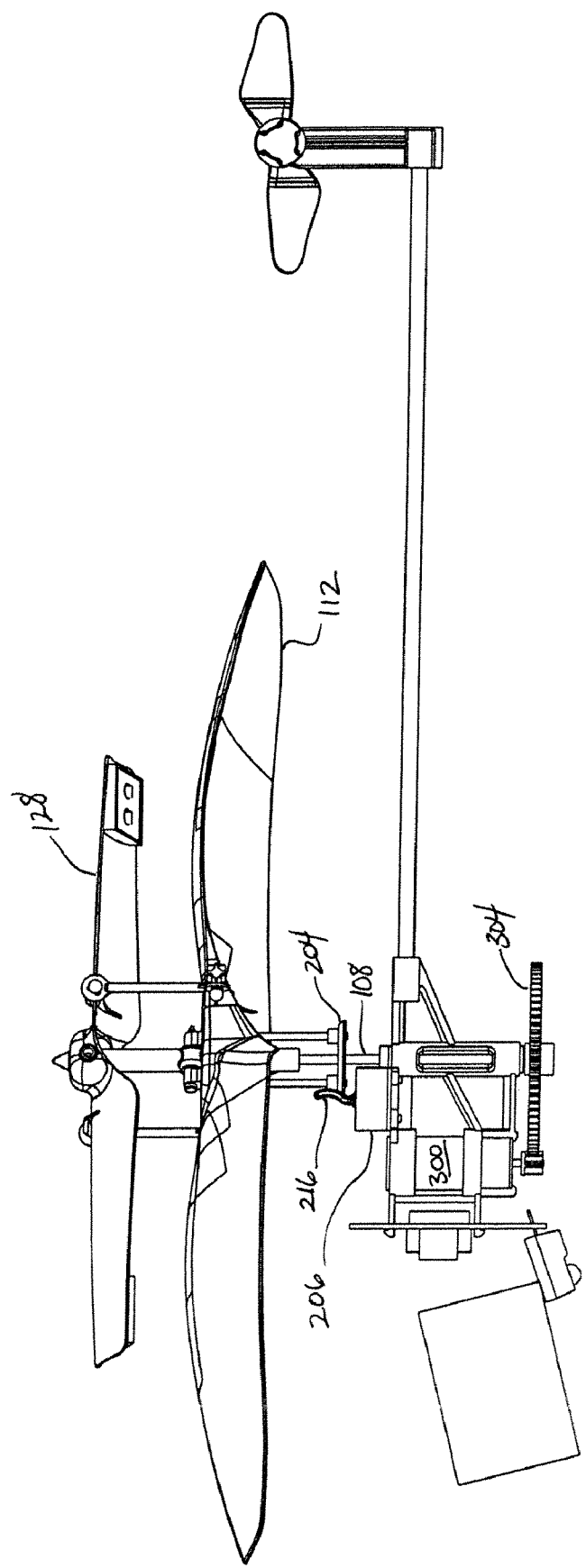
Figure 48:
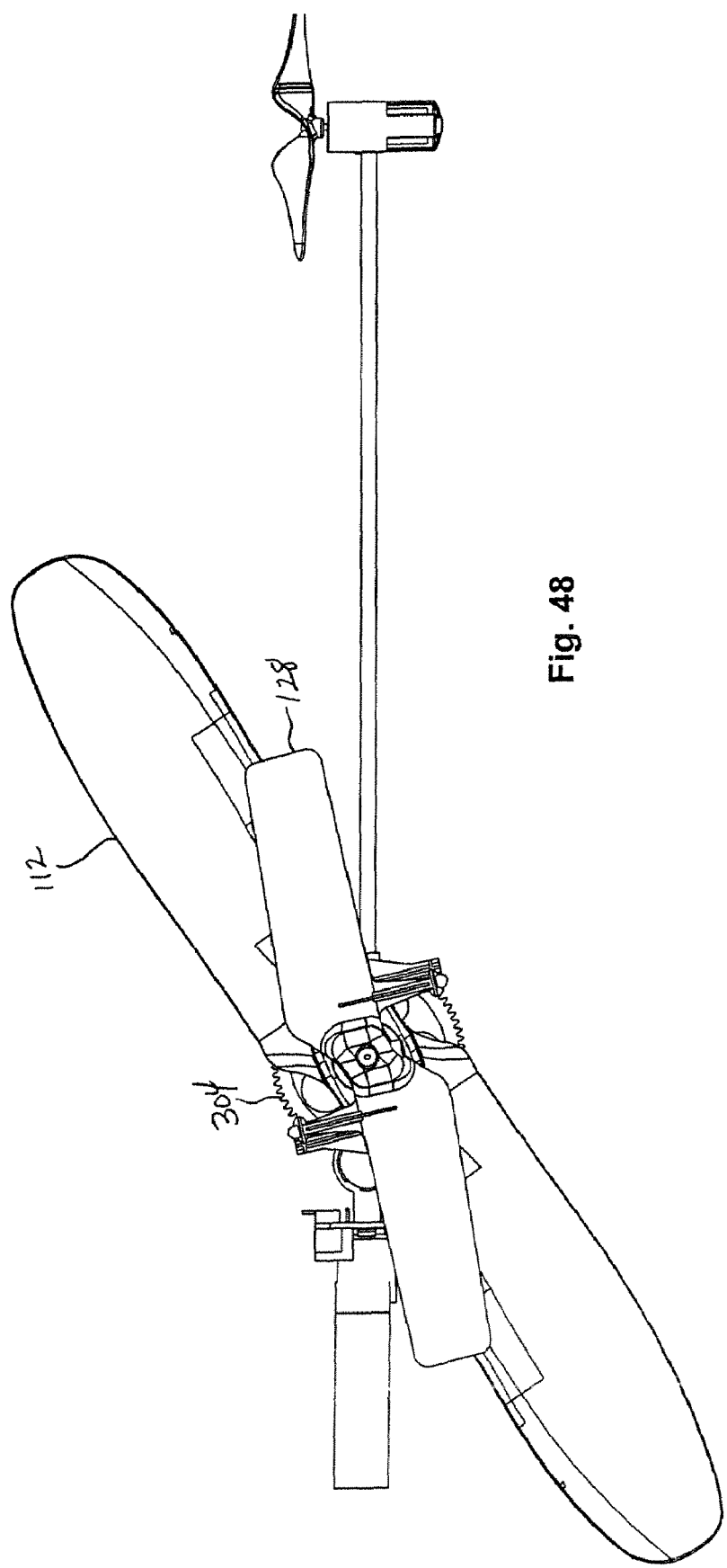
Figure 49:
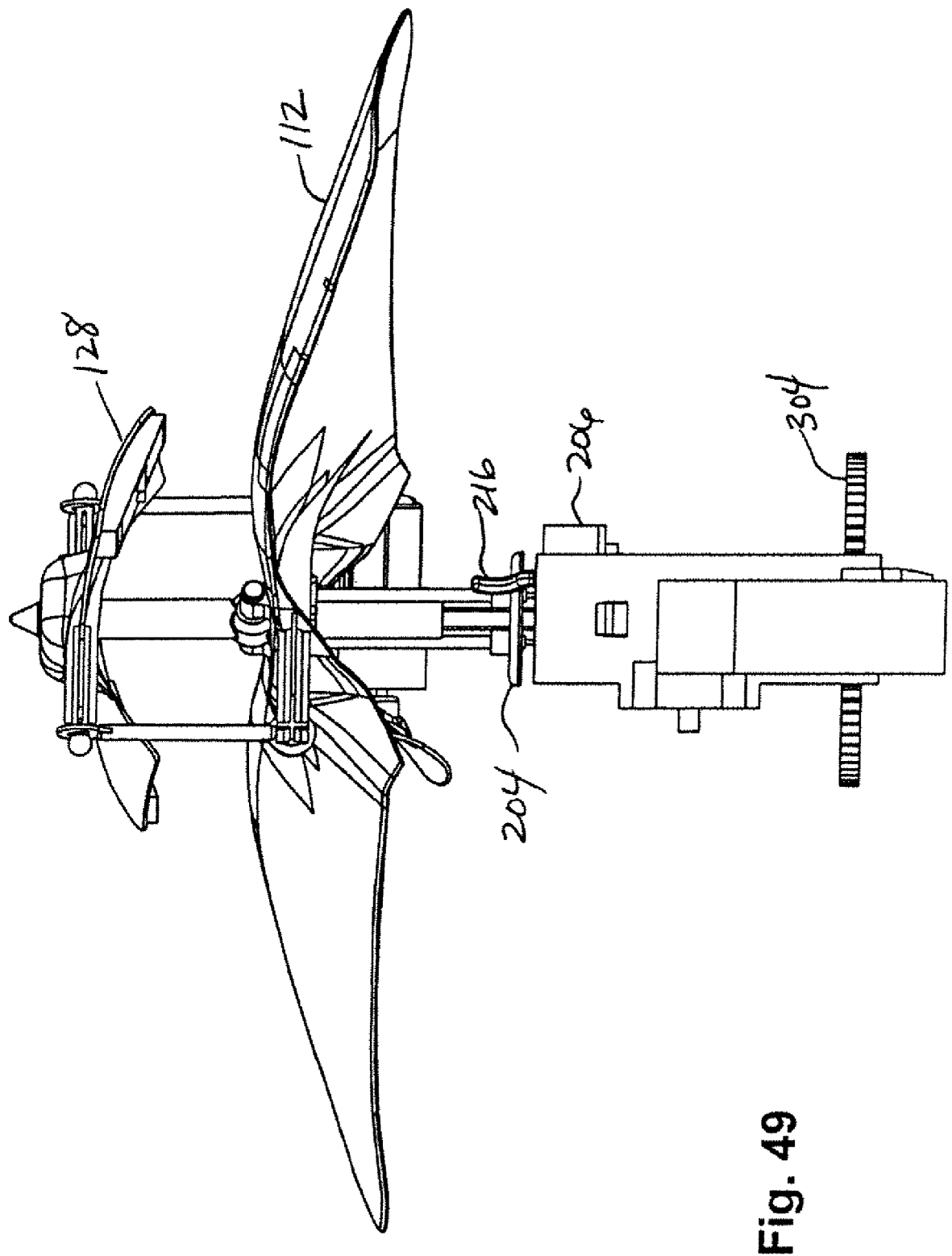

FIG. 20 illustrates a helicopter rotor in flight where the rotor halves produce different lift, the one (A) versus the other (B). A torque C originates and moves the rotor in the direction (C) of that torque. the effect of this torque is not necessarily in line with the span of the rotor, and can occur later due to gyroscopic forces;

FIG. 21 shows a helicopter with a rotor and a stabilizer, a control ring, attached to the rotor, and an actuator device connected with the helicopter body structure;

FIGS. 22a and 22b are two respective views showing the control ring is generally centered around the vertical rotor axis. The ring moves around the rotor axis and with the rotor when the rotor is tilted around the feather axis as shown in FIG. 22b. The rotor system omitted for clarity;

FIG. 23 shows an exploded view of the actuator device with a coil, a hinged magnet, a base and a lever;

FIG. 24 shows the lever in different positions (a), (b) and (c);

FIGS. 25, 26 and 27a and 27b are exemplary and show the control ring and the rotor in different relative positions. FIG. 27a is a side view of a portion of the structure and FIG. 27b is a front view of the structure;

FIGS. 28a and 28b, with the rotor omitted for clarity, illustrates the working operation of the control in more detail;

FIGS. 29a and 29b illustrate the stabilizer movement of the attached rotor depending on its mechanical relationship with the rotor;

FIG. 30a, with the rotor omitted for clarity, and FIG. 30b show further details of the operation;

FIGS. 31a, 31b and 31c show respectively a control with different possible positions of the actuator. Each position is for a rotor system and determines different unique flight patterns;

FIG. 32 shows a control with two actuators used to exercise force independently and selectively on the control ring;

FIGS. 33a and 33b show the actuator lever withdrawn and the actuator signal at zero interaction, and the rotor assembly being in a position prior to zero interaction and being free to take control of the rotor;

FIGS. 34a and 34b show the actuator lever withdrawn and the actuator signal at zero interaction, and the rotor assembly having acted freely under its own control;

FIG. 35 is an exemplary side view of a helicopter;

FIG. 36 is a top view of a helicopter;

FIG. 37 is a front view of a helicopter;

FIG. 38 is a perspective view of a helicopter;

FIG. 39 is a side view of the structure of a helicopter;

FIG. 40 is a top view of the structure of a helicopter;

FIG. 41 is a front view of the structure of a helicopter;

FIG. 42 is a perspective view of the structure of a helicopter;

FIG. 43 is a side view of the structure of a helicopter;

FIG. 44 is a top view of the structure of a helicopter;

FIG. 45 is a front view of the structure of a helicopter;

FIG. 46 is a perspective view of the structure of a helicopter;

FIG. 47 is a side view of the structure of a helicopter;

FIG. 48 is a top view of the structure of a helicopter;

FIG. 49 is a front view of the structure of a helicopter; and

Figure 50:
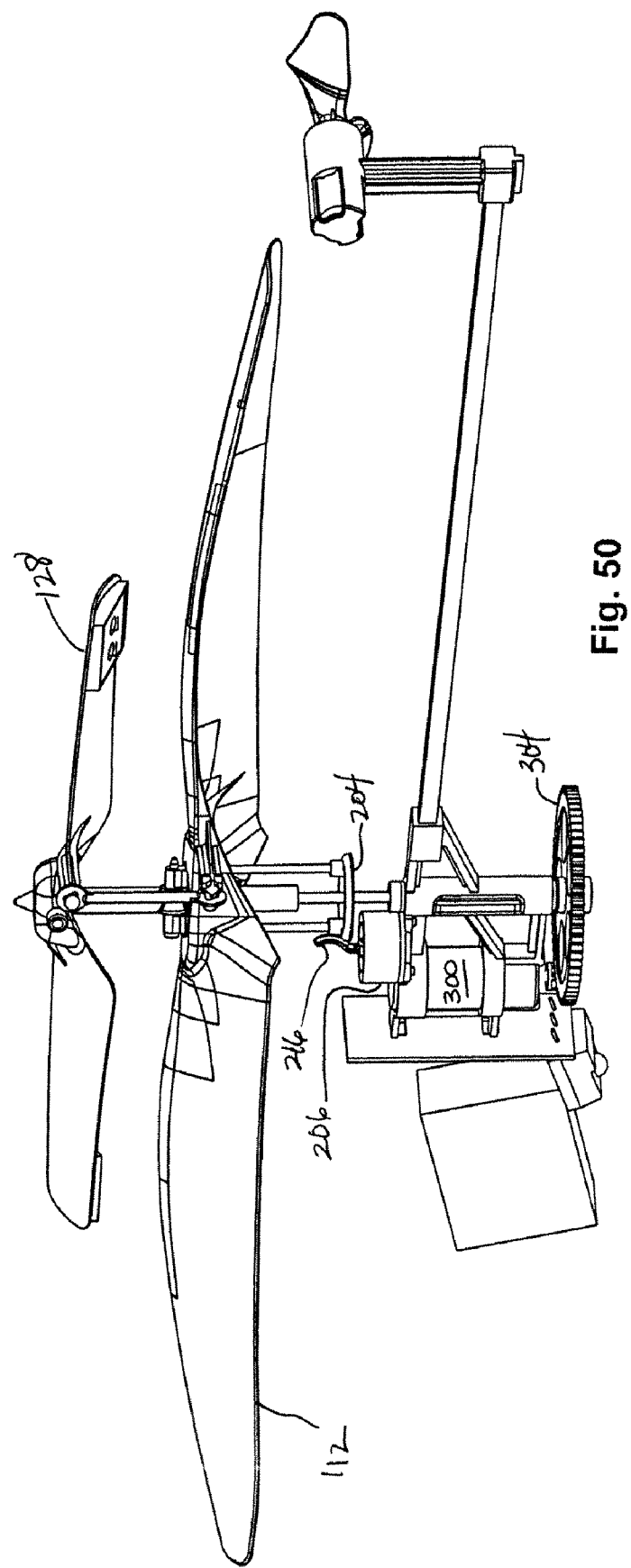

FIG. 50 is a perspective view of the structure of a helicopter.

DETAILED DESCRIPTION

The following embodiments of an improved helicopter according to the disclosure are given as an example only, without being limitative in any way, with reference to the accompanying drawings.

The helicopter 1 represented in the figures by way of example is a remote-controlled helicopter which essentially consists of a body 2 with a landing gear and a tail 3; a main rotor 4; an auxiliary rotor 5 driven synchronously with the latter and a tail rotor 6.

The main rotor 4 is provided by means of what is called a rotor head 7 on a first upward directed rotor shaft 8 which is bearing-mounted in the body 2 of the helicopter 1 in a rotating manner and which is driven by means of a motor 9 and a transmission 10, whereby the motor 9 is for example an electric motor which is powered by a battery 11.

The main rotor 4 in this case has two blades 12 which are in line or practically in line, but which may just as well be composed of a larger number of blades 12.

Figure 6:
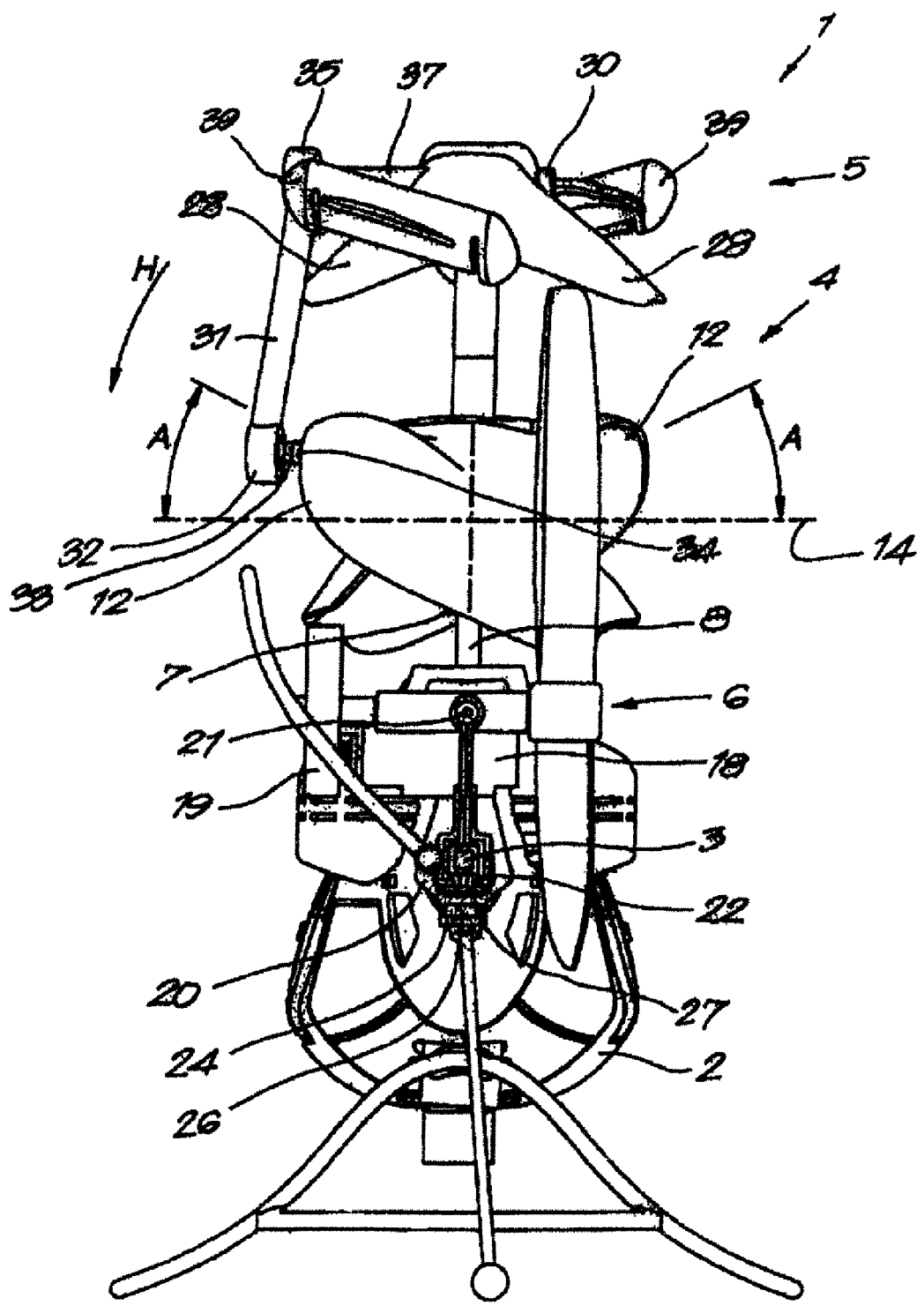
FIG. 6 is a rear view according to arrow F6 in FIG. 5.

The tilt or angle of incidence A of the rotor blades 12, in other words the angle A which forms the rotor blades 12 as represented in FIG. 6 with the plane of rotation 14 of the main rotor 4, can be adjusted as, the main rotor 4 is hinge-mounted on this rotor shaft 8 by means of a joint, such that the angle between the plane of rotation of the main rotor and the rotor shaft may freely vary.

In the case of the example of a main rotor 4 with two blades 12, the joint is formed by a spindle 15 of the rotor head 7.

Figure 1:
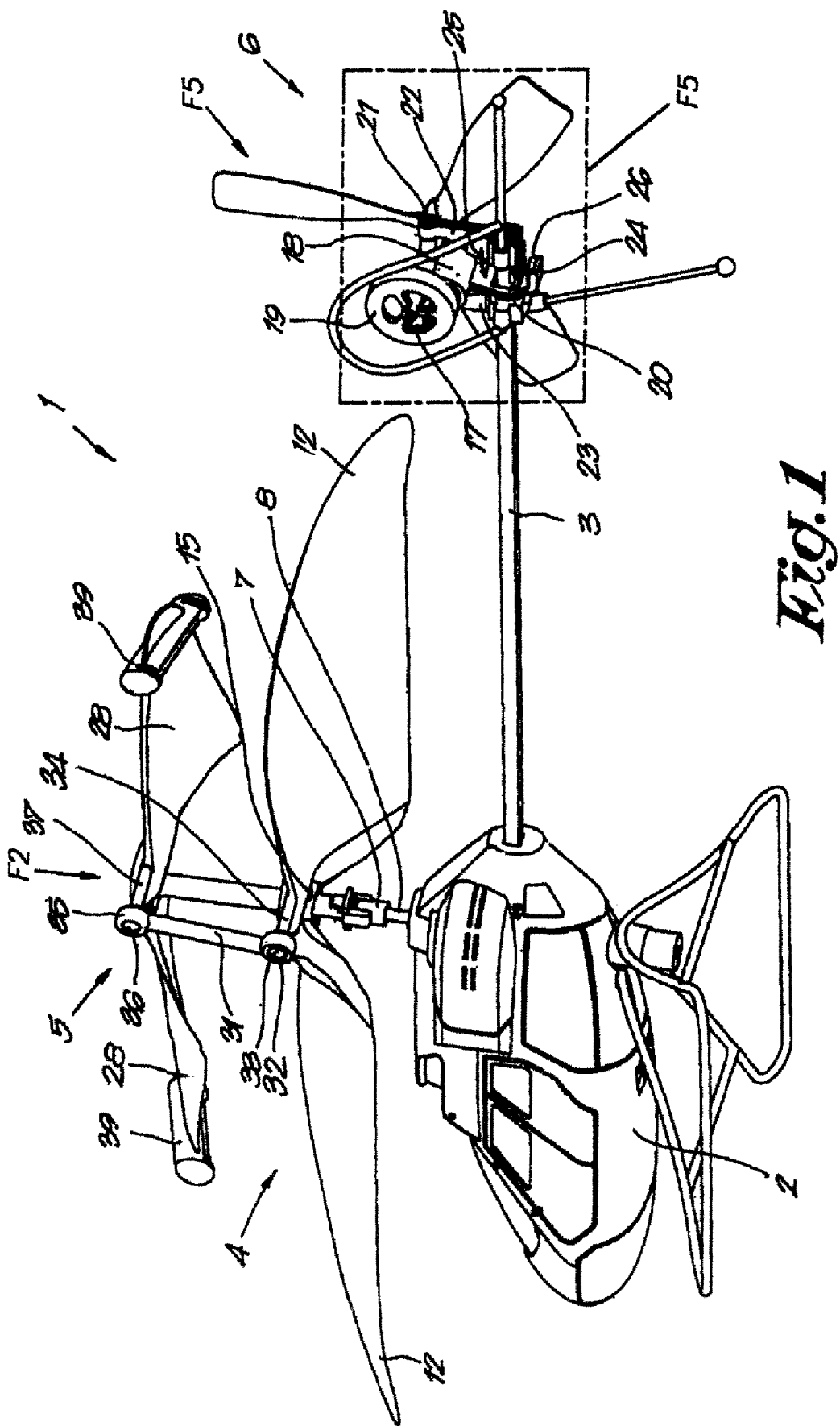
Figure 2:
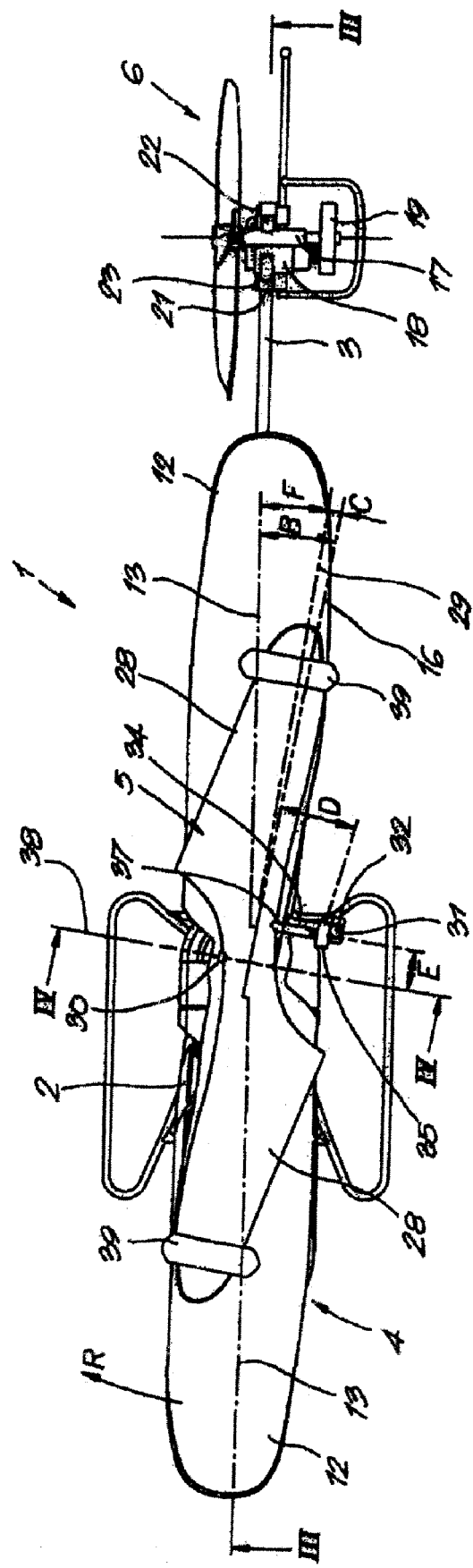
FIG. 2 represents a top view according to arrow F2 in FIG. 1.
Figure 3:
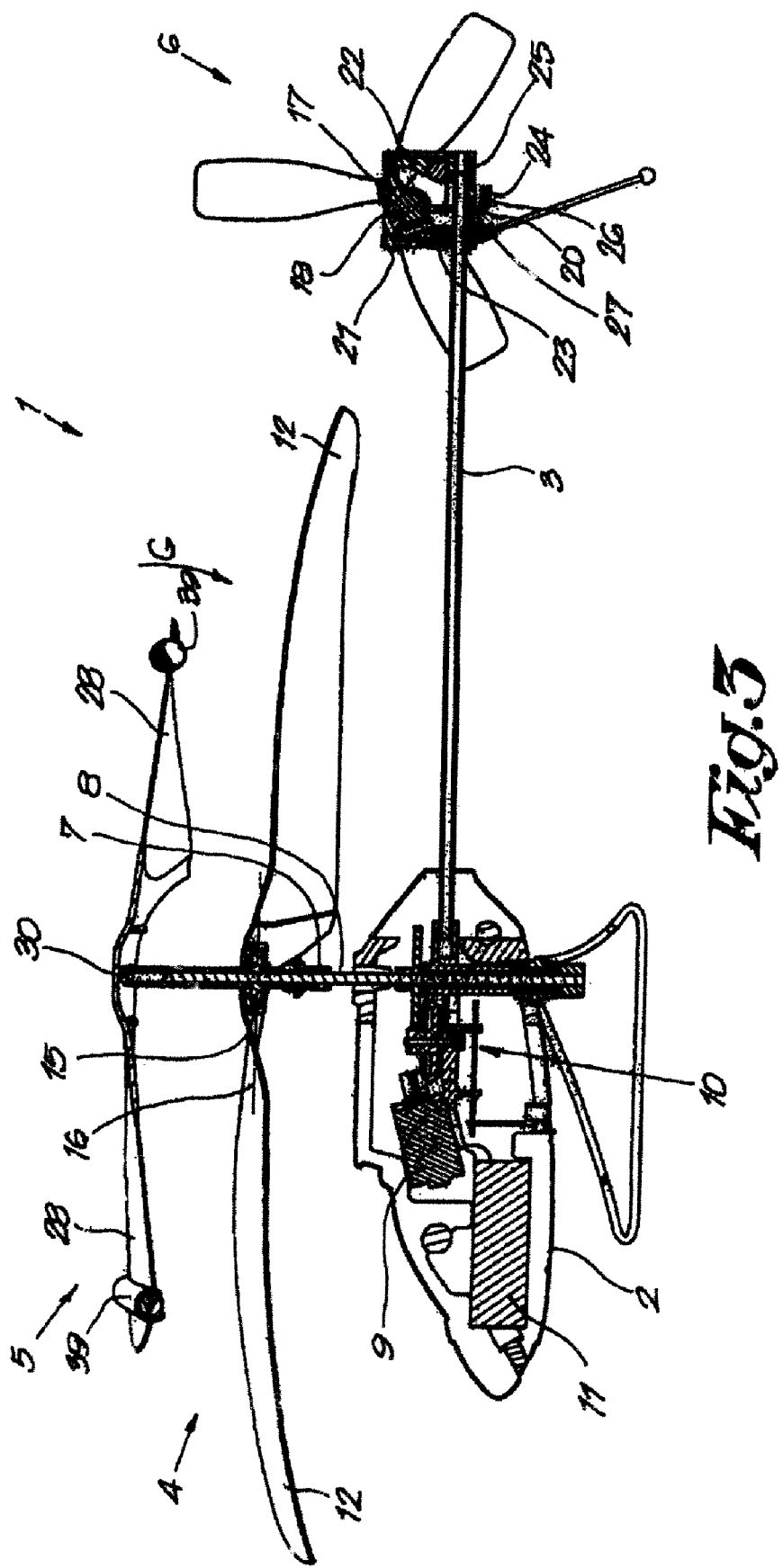
FIGS. 3 and 4 represent respective sections according to lines II-II and III-III in FIG. 2.
Figure 4:
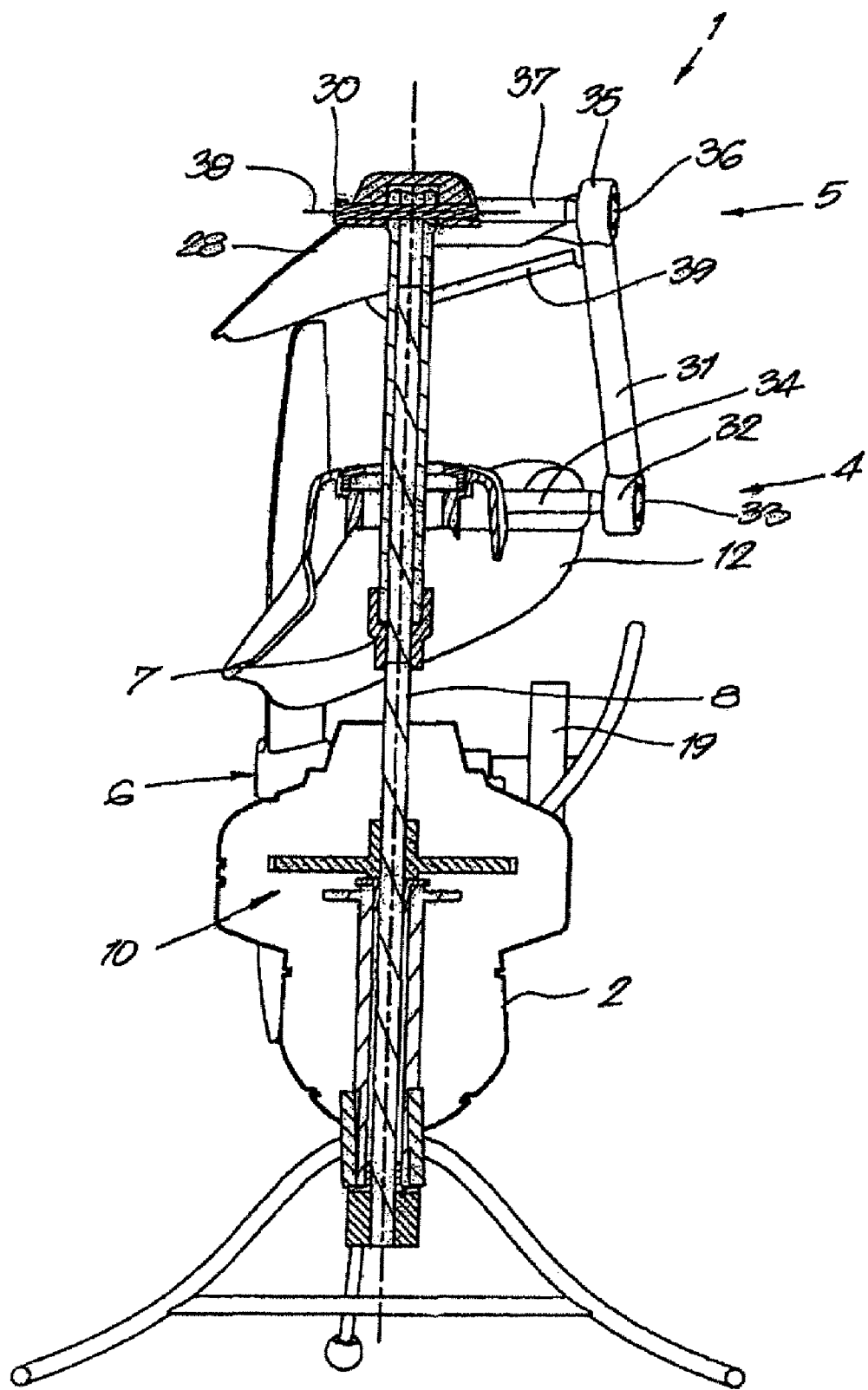
Figure 3:
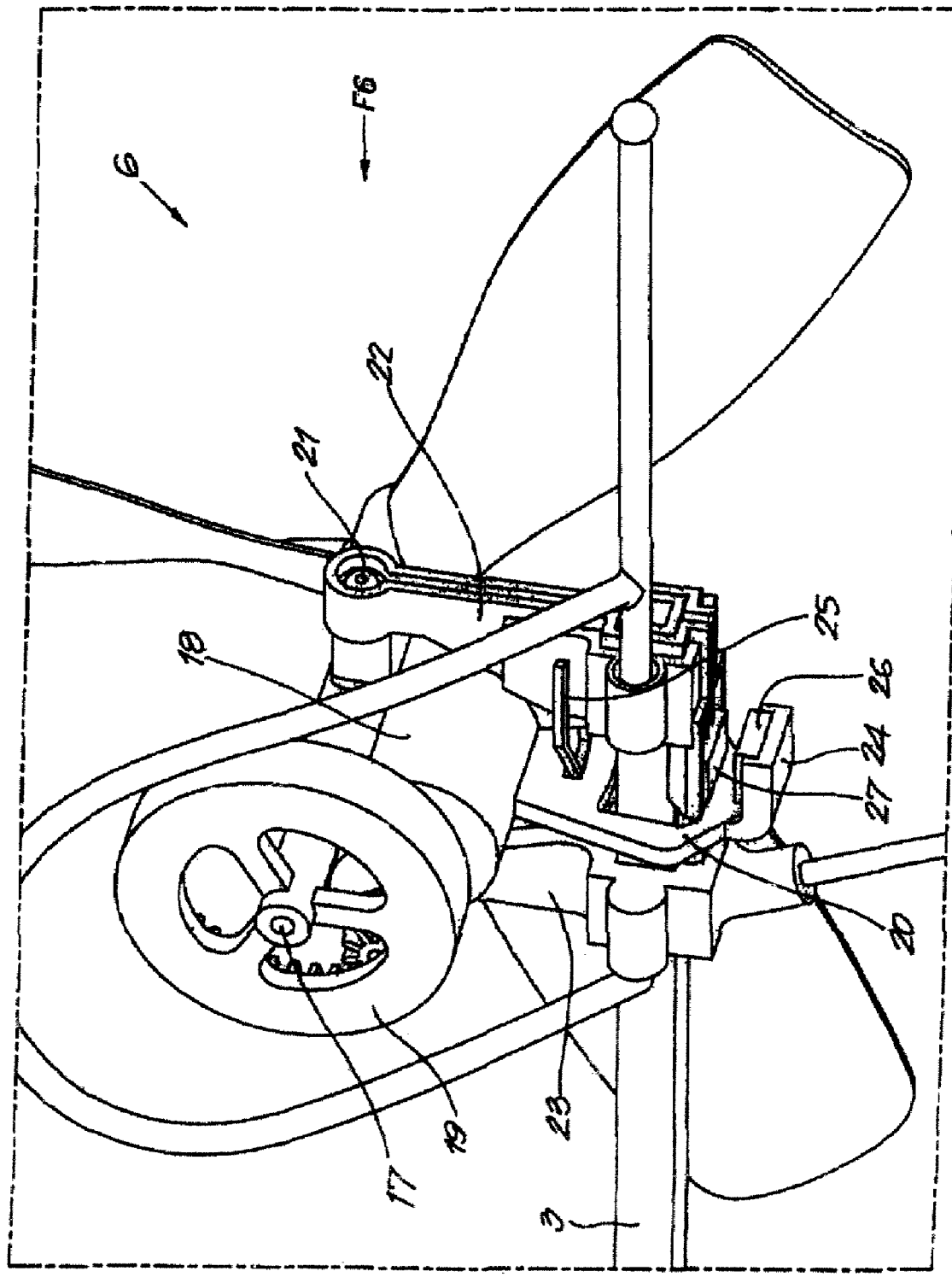

The axis 16 of this spindle 15 is directed transversal to the rotor shaft 8 and essentially extends in the direction of the longitudinal axis 13 of one of the rotor blades 12 and it preferably forms, as represented in FIG. 2, an acute angle B with this longitudinal axis 13.

The tail rotor 6 is driven via a second rotor shaft 17 by means of a second motor 18 and a transmission 19. Motor 16 can be an electric motor. The tail rotor 6 with its rotor shaft 17 and its drive 18-19 is suspended in a swing 20 which can rotate round a swing shaft 21 which is fixed to the tail 3 of the helicopter 1 by two supports 22 and 23.

The swing 20 is provided with an extension piece 24 towards the bottom, which is kept In a central position by means of a spring 25 when in a state of rest, whereby the second rotor shaft 17 in this position is horizontal and directed crosswise to the first rotor shaft 8.

On the lower end of the extension piece 24 of the swing 20 is provided a magnet 26, whereas opposite the position of the magnet 26 in the above-mentioned state of rest of the swing 20 is fixed a magnetic sensor 27 to the tail 3 which makes it possible to measure the relative angular displacement of the swing 20 and thus of the tail rotor 6 round the swing shaft 21.

It is clear that this angular displacement of the swing 20 can also be measured in other ways, for example by means of a potentiometer.

The measured signal can be used as an input signal for a control box, which is not represented in the figures, which controls the drives of the main rotor 4 and of the tail rotor 6 and which is provided with a stabilizer algorithm which will give a counter steering command when a sudden unwanted angular displacement of the tail rotor 6 is measured round the swing shaft 21, resulting from an unwanted rotation of the helicopter 1 round the rotor shaft 8, so as to restore the position of the helicopter 1.

The helicopter 1 is also provided with an auxiliary rotor 5 which is driven substantially synchronously with the main rotor 4 by the same rotor shaft 8 and the rotor head 7.

The auxiliary rotor 5 in this case has two vanes 28 which are essentially in line with their longitudinal axis 29, whereby the longitudinal axis 29, seen in the sense of rotation R of the main rotor 4, is essentially parallel to the longitudinal axis 13 of blades 12 of the main rotor 4 or encloses a relatively small acute angle C with the latter, so that both rotors 4 and 5 extend more or less parallel on top of one another with their blades 12 and vanes 28.

The diameter of the auxiliary rotor 5 is preferably smaller than the diameter of the main rotor 4 as the vanes 28 have a smaller span than the rotor blades 12, and the vanes 28 are substantially rigidly connected to each other. This rigid whole forming the auxiliary rotor 5 is provided in a swinging manner on an oscillating shaft 30 which is fixed to the rotor head 7 of the rotor shaft 8. This is directed transversally to the longitudinal axis of the vanes 28 and transversally to the rotor shaft 8.

The main rotor 4 and the auxiliary rotor 5 are connected to each other by a mechanical link which is such of the auxiliary rotor 5 the angle of incidence A of at least one of the rotor blades 12 of the main rotor 4. In the given example this link is formed of a rod 31.

This rod 31 is hinge-mounted to a blade 12 of the main rotor 4 with one fastening point 32 by means of a joint 33 and a lever arm 34 and with another second fastening point 35 situated at a distance from the latter, it is hinge-mounted to a vane 28 of the auxiliary rotor 5 by means of a second joint 36 and a second lever arm 37.

The fastening point 32 on the main rotor 4 is situated at a distance D from the axis 16 of the spindle 15 of the rotor blades 12 of the main rotor 4, whereas the other fastening point 35 on the auxiliary rotor 5 is situated at a distance E from the axis 38 of the oscillatory shaft 30 of the auxiliary rotor 5.

The distance D is preferably larger than the distance E, and about the double of this distance E, and both fastening points 32 and 35 of the rod 31 are situated, seen in the sense of rotation R on the same side of the rotor blades 12 of the main rotor 4 or of the vanes 28 of the auxiliary rotor 5, in other words they are both situated in front of or at the back of the rotor blades 12 and vanes 28, seen in the sense of rotation.

Also preferably, the longitudinal axis 29 of the vanes 28 of the auxiliary rotor 5, seen in the sense of rotation R, encloses an angle F with the longitudinal axis 13 of the rotor blades 12 of the main rotor 4, which enclosed angle F is in the order, of magnitude of about 10°, whereby the longitudinal axis 29 of the vanes 28 leads the longitudinal axis 13 of the rotor blades 12, seen in the sense of rotation R. Different angles in a range of, for example, 5° to 25° could also be in order.

The auxiliary rotor 5 is provided with two stabilizing weights 39 which are each fixed to a vane 28 at a distance from the rotor shaft 8.

Further, the helicopter 1 is provided with a receiver, so that it can be controlled from a distance by means of a remote control which is not represented.

As a function of the type of helicopter, it is possible to search for the most appropriate values and relations of the angles B, F and G by experiment; the relation between the distances D and E; the size of the weights 39 and the relation of the diameters between the main rotor 4 and the auxiliary rotor 5 so as to guarantee a maximum auto stability.

The operation of the improved helicopter 1 according to the disclosure is as follows:

In flight, the rotors 4, 5 and 6 are driven at a certain speed, as a result of which a relative air stream is created in relation to the rotors, as a result of which the main rotor 4 generates an upward force so as to make the helicopter 1 rise or descend or maintain it at a certain height, and the tail rotor 6 develops a laterally directed force which is used to steer the helicopter 1.

It is impossible for the main rotor 4 to adjust itself, and it will turn in the plane 14 in which it has been started, usually the horizontal plane. Under the influence of gyroscopic precession, turbulence and other factors, it will take up an arbitrary undesired position if it is not controlled.

The surface of rotation of the auxiliary rotor 5 may take up another inclination in relation to the surface of rotation 14 of the main rotor 8, whereby both rotors 5 and 4 may take up another inclination in relation to the rotor, shaft 8.

This difference in inclination may originate in any internal or external force or disturbance whatsoever.

In a situation whereby the helicopter 1 is hovering stable, on a spot in the air without any disturbing internal or external forces, the auxiliary rotor 5 keeps turning in a plane which is essentially perpendicular to the rotor shaft 8.

If, however, the body 2 is pushed out of balance due to any disturbance whatsoever, and the rotor shaft 8 turns away from its position of equilibrium, the auxiliary rotor 5 does not immediately follow this movement, since the auxiliary rotor 5 can freely move round the oscillatory shaft 30.

The main rotor 4 and the auxiliary rotor 5 are placed in relation to each other in such a manner that a swinging motion of the auxiliary rotor 5 is translated almost immediately in the pitch or angle of incidence A of the rotor blades 12 being adjusted.

For a two-bladed main rotor 4, this means that the rotor blades 12 and the vanes 28 of both rotors 4 and 5 must be essentially parallel or, seen in the sense of rotation R, enclose an acute angle with one another of for example 10° in the case of a large main rotor 4 and a smaller auxiliary rotor 5.

This angle can be calculated or determined by experiment for any helicopter 1 or per type of helicopter.

If the axis of rotation 8 takes up another inclination than the one which corresponds to the above-mentioned position of equilibrium in a situation whereby the helicopter 1 is hovering, the following happens.

A first effect is that the auxiliary rotor 5 will first try to preserve its absolute inclination, as a result of which the relative inclination of the surface of rotation of the auxiliary rotor 5 in relation to the rotor shaft 8 changes.

As a result, the rod 31 will adjust the angle of incidence A of the rotor blades 12, so that the upward force of the rotor blades 12 will increase on one side of the main rotor 4 and will decrease on the diametrically opposed side of this main rotor.

Since the relative position of the main rotor 4 and the auxiliary rotor 5 are selected such that a relatively immediate effect is obtained. This change in the upward force makes sure that the rotor shaft 8 and the body 21 are forced back into their original position of equilibrium.

A second effect is that, since the distance between the far ends of the vanes 28 and the plane of rotation 14 of the main rotor 4 is no longer equal and since also the vanes 28 cause an upward force, a larger pressure is created between the main rotor 4 and the auxiliary rotor 5 on one side of the main rotor 4 than on the diametrically opposed side.

A third effect plays a role when the helicopter begins to tilt over to the front, to the back or laterally due to a disturbance. Just as in the case of a pendulum, the helicopter will be inclined to go back to its original situation. This pendulum effect does not generate any destabilizing gyroscopic forces as with the known helicopters that are equipped with a stabilizer bar directed transversally to the rotor blades of the main rotor. It acts to reinforce the first and the second effect.

The effects have different origins but have analogous natures. They reinforce each other so as to automatically correct the position of equilibrium of the helicopter 1 without any intervention of a pilot.

The tail rotor 6 is located in a swinging manner and provides for an additional stabilization and makes it possible for the tail rotor 6 to assume the function of the gyroscope which is often used in existing helicopters, such as model helicopters.

In case of a disturbance, the body 2 may start to turn round the rotor shaft 8. As a result, the tail rotor 6 turns at an angle in one or other sense round the swinging shaft 21. This is due to the gyroscopic precession which acts on the rotating tail rotor 6 as a result of the rotation of the tail rotor 6 round the rotor shaft 8. The angular displacement is a function of the amplitude of the disturbance and thus of the rotation of the body 2 round the rotor shaft 8. This is measured by the sensor 27.

The signal of the sensor 27 is used by a control box of a computer to counteract the failure and to adjust the thrust of the tail rotor 6 so as to annul the angular displacement of the tail rotor 6 which is due to the disturbance.

This can be done by adjusting the speed of the tail rotor 6 and/or by adjusting the angles of incidence of the rotor blades of the tail rotor 6, depending on the type of helicopter 1.

Figure 7:
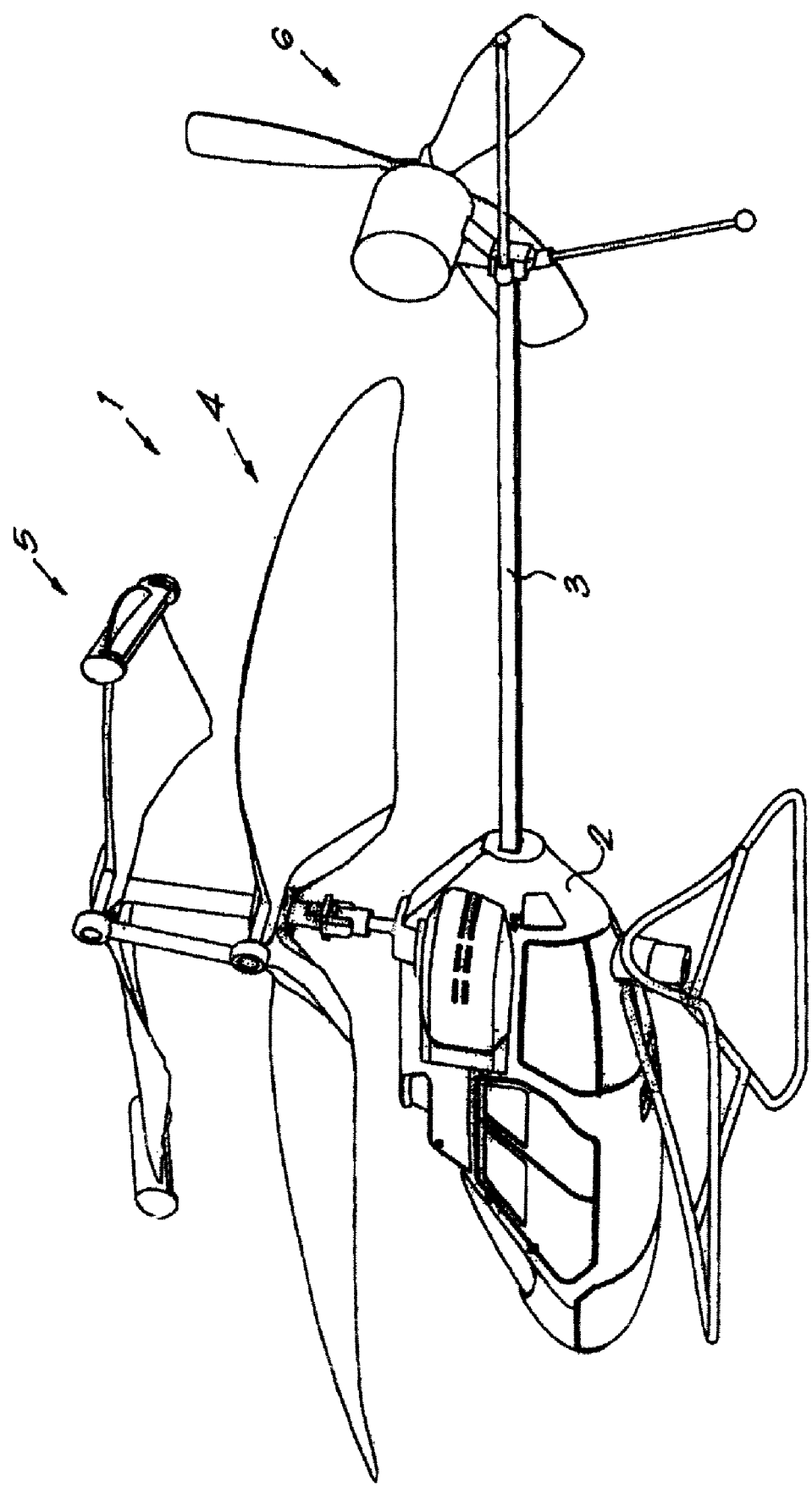
FIG. 7 represents a variant of FIG. 1.
Figure 8:
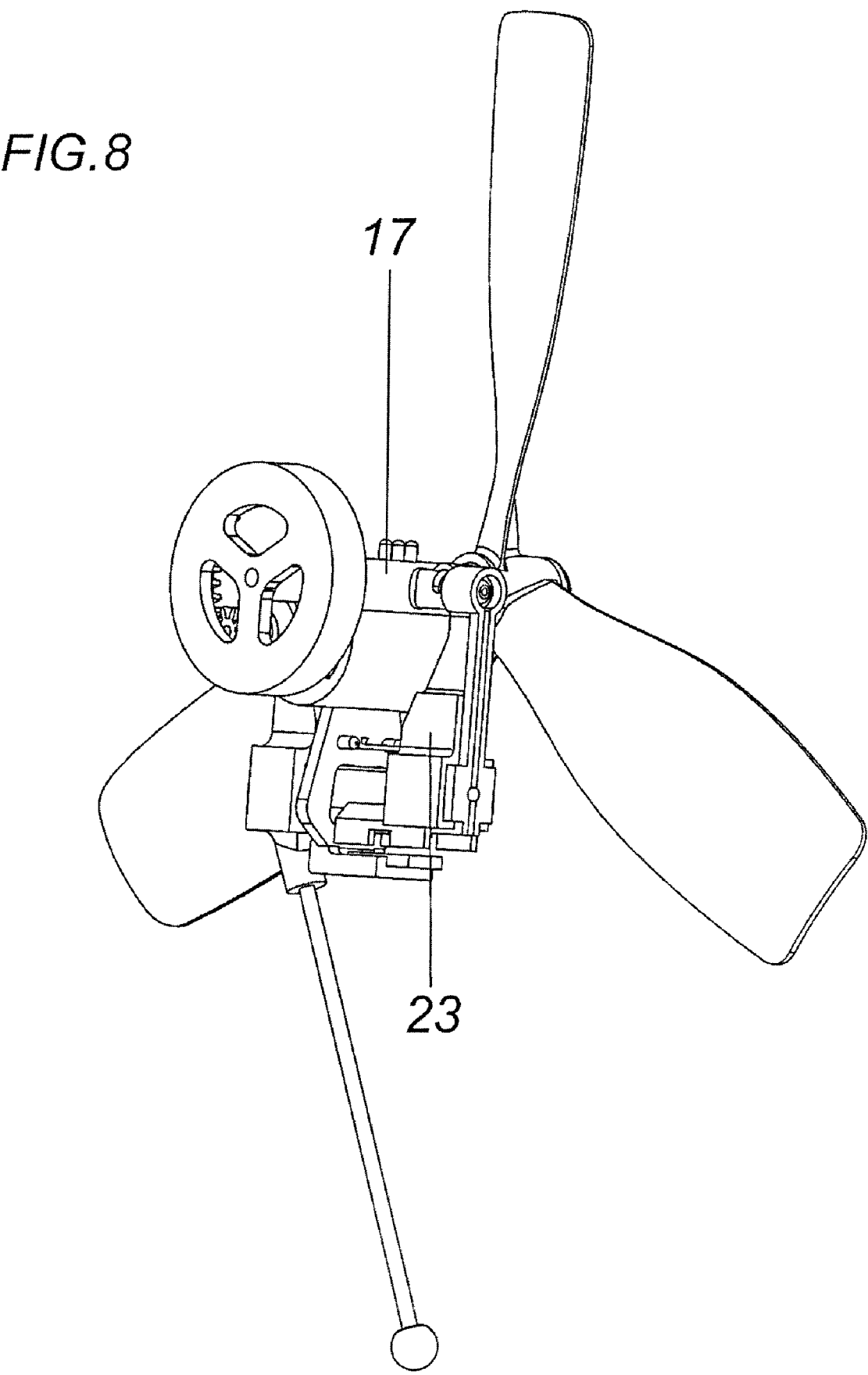
FIG. 8 represents a variant of FIG. 5.
Figure 9:
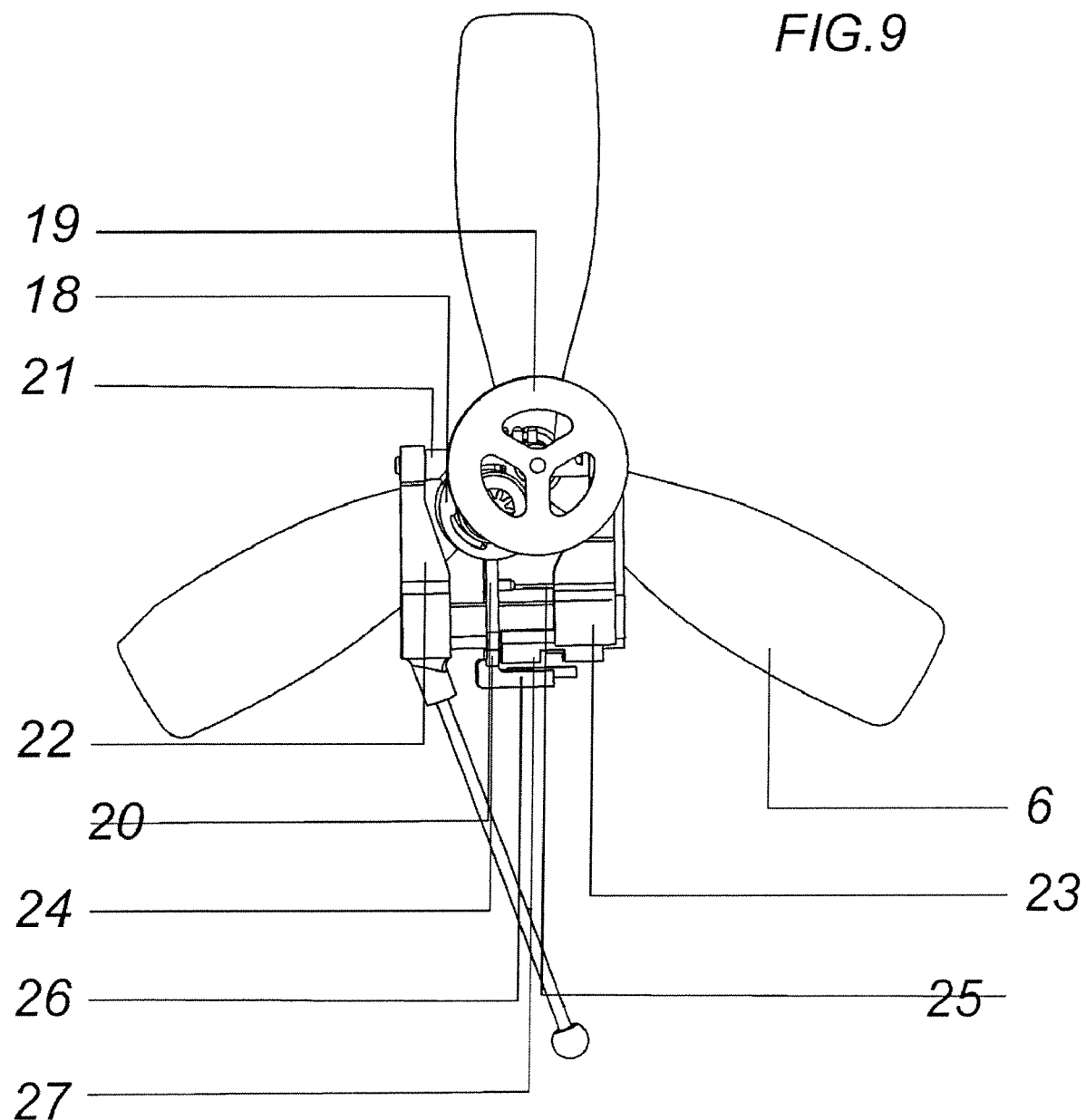
FIG. 9 represents a different view of the tail rotor of FIG. 8.
Figure 10:
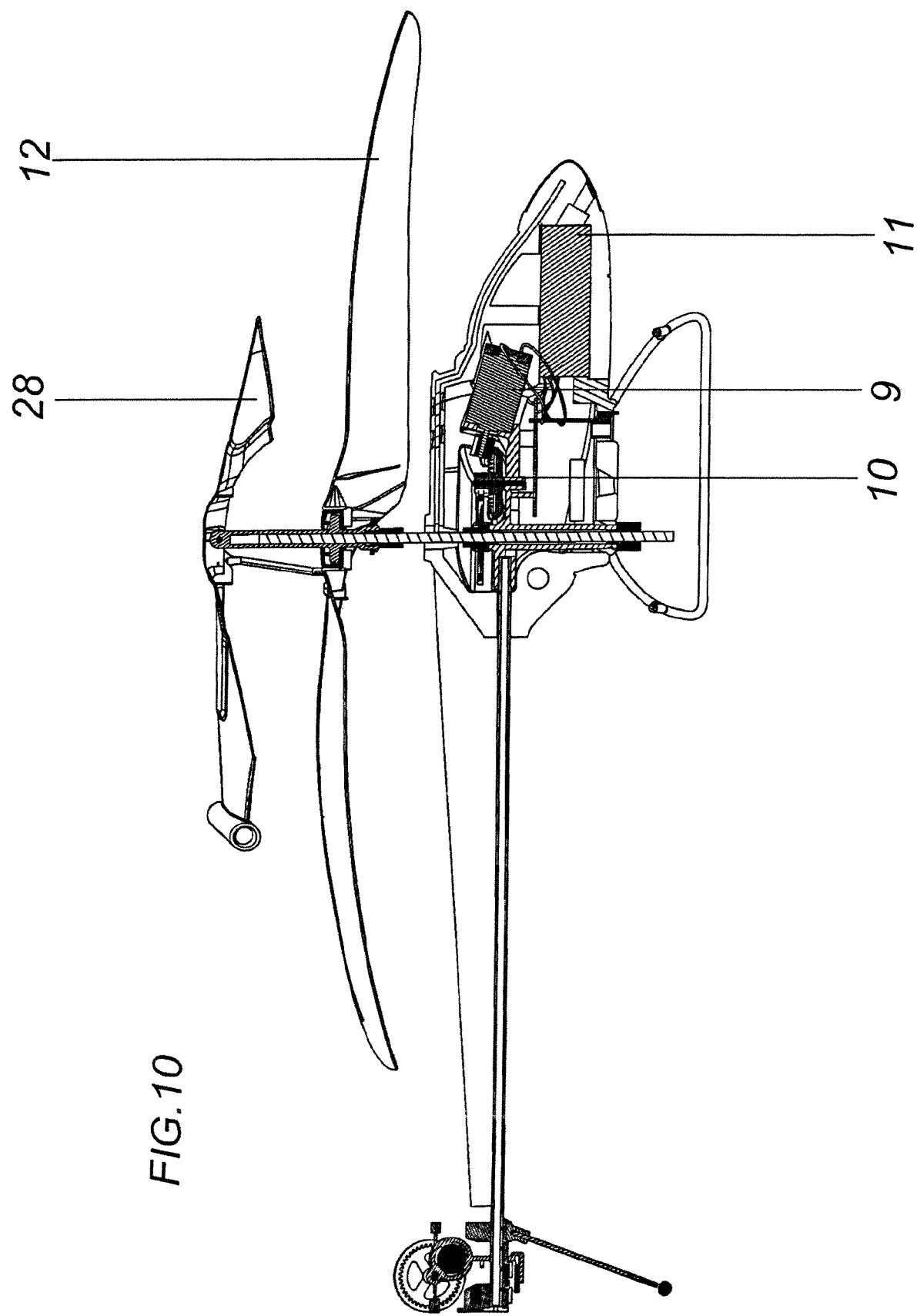
FIG. 10 represents a section of the helicopter.

If necessary, this aspect of the disclosure may be applied separately, just as the aspect of the auxiliary rotor 5 can be applied separately, as is illustrated for example by means of FIG. 7, which represents a helicopter 1 according to the, disclosure having a main rotor 4 combined with an auxiliary rotor 5, but whose tail rotor 6 is of the conventional type, i.e. whose shaft cannot turn in a swing but is bearing-mounted in relation to the tail 3.

In practice, the combination of both aspects makes it possible to produce a helicopter which is very stable in any direction and any flight situation and which is easy to control, even by persons having little or no experience.

It is clear that the main rotor 4 and the auxiliary rotor 5 must not necessarily be made as a rigid whole. The rotor blades 12 and the vanes 28 can also be provided on the rotor head 7 such that they are mounted and can rotate relatively separately. In that case, for example, two rods 31 may be applied to connect each time one blade 12 to one vane 28.

It is also clear that, if necessary, the joints and hinge joints may also be realized in other ways than the ones represented, for example by means of torsion-flexible elements.

In the case of a main rotor 4 having more than two blades 12, one should preferably be sure that at least one blade 12 is essentially parallel to one of the vanes 28 of the auxiliary rotor. The joint of the main rotor 4 is preferably made as a ball joint or as a spindle 15 which is directed essentially transversely to the axis of the oscillatory shaft 30 of the auxiliary rotor 5 and which essentially extends in the longitudinal direction of the one blade 12 concerned which is essentially parallel to the vanes 28.

In another format, the helicopter comprises a body with a tail; a main rotor with blades which is driven by a rotor shaft on which the blades are mounted. A tail rotor is driven by a second rotor shaft directed transversally to the rotor shaft of the main rotor. An auxiliary rotor is driven by the rotor shaft of the main rotor and is provided with vanes from the rotor shaft in the sense of rotation of the main rotor.

The auxiliary rotor is mounted in a swinging relationship on an oscillatory shaft and the swinging motion being relatively upwardly and downwardly about the auxiliary shaft. The auxiliary shaft is provided essentially transverse to the rotor shaft of the main rotor. The main rotor and the auxiliary rotor are connected to each other by a mechanical link, such that the swinging motion of the auxiliary rotor controls the angle of incidence of at least one of the rotor blades of the main rotor. There can be different degrees of width, varying from narrow to broader for each of the rotors, and weights can be strategically placed along the length of the auxiliary rotor to achieve the right motion and effect on the main rotor bearing in mind the appropriate angular relationship between the axis of the auxiliary and the axis of the main rotor to achieve the effect and control of the angle of incidence of the main rotor. In some cases, the auxiliary rotor can be mounted below the main rotor, namely between the top of the body and the main rotor and still achieve the right effect on the main rotor angle of incidence.

The angle of incidence of the rotor in the plane of rotation of the rotor and the rotor shaft may vary. An auxiliary rotor rotatable with the rotor shaft is for relative oscillating movement about the rotor shaft. Different relative positions are such that the auxiliary rotor causes the angle of incidence the main rotor to be different. A linkage between the main and auxiliary rotor causes changes in the position of the auxiliary rotor to translate to changes in the angle of incidence.

The rotor blades of the main rotor and the vanes of the auxiliary rotor respectively are connected to each other with a mechanical linkage that permits the relative movement between the blades of the rotor and the vanes of the auxiliary rotor. A joint of the main rotor to the rotor blades is formed of a spindle which is fixed to the rotor shaft of the main rotor.

The mechanical link includes a rod hinge mounted to a vane of the auxiliary rotor with one fastening point and is hinge-mounted with another fastening point to the blade of the main rotor.

The body includes wings directed transversely of a longitudinal axis of the helicopter body. The wings are 100 and 102 directed transversely and downwardly whereby the tips 104 and 106 of the wings permit for stabilizing the helicopter body when on the ground.

There is a downwardly directed stabilizer 108 at the tail of the helicopter. FIG. 15 also shows a radio control unit for operation with the helicopter. This unit can have appropriate computerized controls for signaling the operation of the motors operating the rotors and their relative positions.

As described and illustrated in detail in this disclosure there is a helicopter rotor that is spinning around to sustain the helicopter in flight, as illustrated in FIG. 19. In this configuration there is a stabilizer auxiliary rotor 128 with a main rotor 112. There is no other control system for changing the angle of incidence of the rotor 112 to affect other control of movement in an essentially horizontal sense.

The rotor 112 and stabilizer rotor 128 are interconnected in FIG. 19. The rotor 112 and also the stabilizer rotor 128 are independent to move around hinging lines as found in helicopter rotors. This can, for example, be a feather or a teether hinge or axis 200 and 202 respectively. The helicopter as represented is able to move up or down by changing rotor rpm, or change heading by altering tail rotor rpm. The helicopter as illustrated in FIG. 19 cannot as effectively be controlled to accelerate forward or backwards, nor sideways left or right, namely in the relatively horizontal dimensions.

In order to more effectively control a helicopter in flight, preferably essentially permanent commands are needed in those horizontal dimensions to direct the helicopter in or towards the desired direction. There is provided a control system to influence the lift force of the rotor 112 in a cyclical way, i.e., in such a way that each rotor blade half 112a and 112b varies lift along one rotation around the vertical rotor shaft 108. When the rotor halves 112a and 112b produce different lift 224 for blade 112a versus the other lift 226 for blade 112b, a torque C originates and moves the rotor 112 in the direction D of that torque. The effect of this torque is not necessarily in line with the span of the rotor and may occur later due to gyroscopic forces. The angle of incidence on the one blade 112a related to the plane of rotation is steeper or larger than the angle of incidence of the blade 112b or portion related to the plane of rotation which is relatively shallower. This effects a movement in Direction D. This can be influenced by gyroscopic forces. This is illustrated in FIG. 20. Each blade 112a and 112b connected to the rotor assembly sees this change cyclically along a 360-degree rotation of the rotor shaft.

The control system of the disclosure includes the following features:
  a rotor 112, preferably but not essentially complemented with a stabilizer rotor 128,
  a control ring 204, attached to the rotor 112, and
  an actuator device 206, connected with the helicopter body structure represented by a base element 208 illustrated in a representative manner in FIG. 21. Instead of a base there can be other structures to which the ring is attached.
These are illustrated in FIG. 21.

The control ring 204 is generally centered around the vertical rotor axis 108. The ring 204 moves with the rotor 112 when tilted around the feather axis 200. This is illustrated in some detail in FIGS. 22a and 22b, such that the tilt is shown in FIG. 22b.

The actuator device 206 represented includes a coil 210, a hinged magnet 212, a base 214 and a lever 216 as shown in the exploded view in FIG. 23. Depending on the voltage and current sent through the coil 210 from the power supply as controlled by the controller which is in turn controlled by a radio control unit, the lever 216 exercises a force on the control ring 204 causing changes in incidence of the feathered rotor blade 112.

The actuator device 206 could have many forms, and use different technologies. It could be an electric motor for example with a lever attached to the axis of the motor or other electromagnetic or magnetic systems can be used. Other systems can be used. There could be a piezoelastic device, ionic polymer actuators, other non-magnetic devices and other interactive and/or inter-responsive systems for causing a lever to move, or if there is no lever there could be a different configuration for having the rotor move about an axis such as the feather axis in a periodic manner.

Operation: No Command State

In the situation where the actuator 206 is not activated, there is no contact between the lever 216 and the ring 204, no matter the rotation position of the rotor 112. The rotor system behaves as if no control mechanism were present. In the case of a self-stabilizing rotor system, the helicopter will float more or less in a hovering position, depending mainly on the position of the center of gravity, as explained in the prior patent applications referred to above and also disclosed in this disclosure. FIGS. 25, 26 and 27a and 27b are illustrative.

Operation: Command State

When the actuator 206 is activated, then the lever 216 moves or rotates, and engages the control ring 204 and exercises a force on the ring 204. The size of that force depends on the size of the control signals sent by the actuator 206. The force causes a torque on the control ring assembly 204. The size of the torque transmitted to the assembly depends on the ratio between 218 and 220. The longer the relative length of 218 to 220, the more torque is transmitted. FIGS. 28a and 28b are illustrative.

This torque inclines the attached rotor 112 along the feather axis 200, which is perpendicular to the actuator force direction 222. In FIG. 28a this is a representative position along a 360° path of the rotor 112. One rotor half or one blade 112a takes a higher angle of incidence, while the opposing rotor half or blade 112b takes a lower angle of incidence. The lift force 224 generated by rotor half or blade 112a are bigger than the lift force 226 generated by rotor half or blade 112b.

The stabilizer or auxiliary rotor 128 follows the movement of the attached rotor 112 depending on its mechanical relationship with that rotor 112. In case of the helicopter of FIGS. 1 to 18, the stabilizer 128 hinges around the teether axis 202. FIGS. 29a and 29b are illustrative.

This asymmetry in lift force exercises a torque on the helicopter as further explained in relation to FIG. 20.

When the rotor 112 progresses in its rotation by 90 degrees, the feather axis 200 of the rotor 112 and control ring assembly 204 is now in line with the force of the actuator 206 and its lever 216. The rotor 112 cannot incline as a result of the exercised force, and the rotor 112 does not 'see' this force or torque. FIGS. 30a, with the rotor omitted for clarity, and FIG. 30b are illustrative. This is a mechanical explanation of how the control is relatively cyclical. The ring 204 is not tilted in this portion of the cycle and has zero effect.

This means that the impact from the actuator force goes from maximum to zero in a 90-degree progression of the rotor. It goes to maximum again for the next progression of 90 degrees, and again to zero for the next 90 degrees, etc. This can be essentially a sinusoidal type change of force acting on the blade or blades of the rotor.

This causes the effect of the force to vary cyclically. This is a term generally used in helicopters to indicate that the impact of the control input varies not only with the size and type of control input, but as well with the position of the blade progressing along a 360 circle around the rotor shaft. With the position of the actuator 206 with respect to the rotor axis 108 and the body fixed, the effect of the actuator force makes the helicopter go in essentially or substantially the same or similar direction. This is determined by the angle of the actuator position relative to the body and the rotor shaft 108 and the gyroscopic effects. the size of the force mostly impacts the speed and/or acceleration of the movement of the body. This is a control system to control the movement of the helicopter body.

Operation: Variations and Parameters

When the actuator position is in line with the axis of the helicopter body from nose to tail, it does not mean the helicopter moves forward with a control input. Gyroscopic forces tend to delay the effects of moving the position of spinning masses by up to 90 degrees. The exact delay depends on parameters like the masses of the spinning objects, such as for instance the rotor, and/or stabilizer, and the aerodynamic forces, the angle between the rotor feather axis and the rotor centerline, the type of rotor hinges ('rigid' or 'soft') etc. The preferred positioning of the actuator for the desired effect is effectively determined, as a function of the desired direction of movement.

FIGS. 31a, 31b and 31c show different possible positions of the actuator 206. Each position establishes a rotor system with a unique flight pattern.

FIG. 32 shows how two actuators 206a and 206b are used to exercise force independently on the control ring. As such, and in case these actuators 206a and 206b are disposed 90 degrees one versus the other and commanded by two independent signals, two-dimensional horizontal movement can be initiated. When four actuators are installed, one every 90 degrees relative to each other, a fuller directional control in the horizontal plane is possible.

When, for instance, three actuators are used, each 120 degrees from the other and commanded by 3 independent signals, and provided some interrelation of the 3 signals, a fuller directional control in the horizontal plane is possible.

Operation Specifics

The helicopters of the prior related patent applications create auto-stability. One of the elements of the system is a completely free to move rotor/stabilizer assembly. Any external obstruction to this causes the stabilizing effect to disappear. In a 'classic' cyclical control system, the control mechanism takes full control over the rotor system. The degree to which the control system overrides the stability system may not be 100%. Tuning and calibration however can keep stability. This is a lower effect, when given a movement command on the actuator.

With the actuator based control system, there are disclosed different features and capabilities.

When the actuator 206 is at rest, there is no contact with the rotor or mechanical disturbance to the free movement of the rotor 112 and stabilizer rotor 128. FIGS. 25, 26, 27a and 27b are illustrative.

When a signal is passed to the actuator 206, the force temporarily interferes with the rotor system, 'destabilizing' it in such a way that the helicopter moves in the desired direction. FIGS. 29a and 29b are illustrative.

When the actuator signal is put back to zero, then the rotor assembly is free again to take over control. FIGS. 33a and 33b are illustrative.

There is a control system for regulating the degree of requisite horizontal movement and a control system for regulating the stability of the helicopter in a relative non-horizontal moving sense. The degree to which the horizontal movement control system is dominant over the non-horizontal movement stability system of the helicopter determines the rate of change in position in the horizontal sense. The horizontal control system includes the interaction of the ring 204, actuator 206 and its control operation. The control system for stability is achieved in part by the interactive rotor 112 and stabilizing rotor 128.

The motor 300 and interactive gear system 302 and 304 drives the rotor shaft 108 at the requisite speed. control electronics 306 can be mounted on the substitute 308 as necessary.

In the case represented, when the rotor 112 and stabilizer 128 find themselves in an 'unnatural state'—they realign themselves automatically for all the reasons claimed by prior helicopter and come back to state as shown in FIGS. 34a and 34b. The stabilizing effect of the helicopters of FIGS. 1 to 18 takes over again. This means that there is accomplished the combination of both desired components: stability when no input is given, and control when input signal is given to the actuator 206 and the rotor assembly ring 204.

As illustrated in FIGS. 35 to 50 there are different views of helicopters using the disclosure to effect control in a horizontal sense. The control ring is shown in different senses of engagement with the actuator. The horizontal control system as illustrated use the principles described and illustrated with reference to the FIGS. 20 to FIGS. 34, and additionally the stability system as illustrated in other figures of this disclosure.

The present disclosure is not limited to the embodiments described as an example and represented in the accompanying figures. Many different variations in size and scope and features are possible.

The disclosure has been described and illustrated with a self-stabilizing rotor system. Other non-self stabilizing flying devices could also use the control system of the disclosure.

For instance, instead of electrical motors being provided others forms of motorized power are possible. A different number of blades may be provided to the rotors.

A helicopter according to the disclosure can be made in all sorts of shapes and dimensions while still remaining within the scope of the disclosure. In this sense although the helicopter in some senses has been described as toy or model helicopter, the features described and illustrated can have use in part or whole in a full-scale helicopter. In some cases the helicopter may be a structure without a tail rotor. Different helicopter-type systems can use the control of the disclosure. In other cases the rotor control can be used with different flying objects.

In other forms instead of the mechanical interaction to effect the control a suitable magnetic or electro magnetic servo can be used for instance with a helicopter using the main rotor and also a stabilizer auxiliary rotor.

Although the disclosure has detailed a system for essentially substantial or approximate horizontal movement in one or two directions, the disclosure includes systems for permitting control of the movement in other substantially horizontal directions. As such, the helicopter control can affect control of horizontal movement forward and/or backwards and/or sideways to the left and/or sideways to the right or different combinations of those movements.

For this purpose there may be more than the one control system for inter-reacting with the rotor assembly. There could be several control systems operating on the rotor in parallel and/or series manner to effect the desired horizontal movement.

The horizontal movements effected by the control systems are in addition to the up and/or down movements which are possible with the helicopter system with the control being non-operation or on-function on the rotor assembly.

Instead of an assembly depending from the rotor there could be other structures for the actuator to interact with the rotor system. Further, instead of a ring for interaction with the actuator there could be other physical structures for interaction with the actuator. In different cases there can be more than two blades for the rotor, and one or two or more of the blades of the rotor can be controlled to different or the same degree.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A helicopter comprising a body; a main rotor with blades which is driven by a rotor shaft and which is hinge mounted on this rotor shaft, such that the angle between the plane of rotation of the main rotor and the rotor shaft may vary; a control for moving the angle of incidence of at least one blade of the rotor relative to the angle of incidence of another blade of the rotor cyclically along at least part of a 360 degree rotation path around the rotor shaft, causing a variation in lift force of the blade along at least part of the rotation path and thereby cause the body to be urged in a relatively horizontal direction from a relative position of rest; and wherein the control includes an actuator for selectively contacting an assembly depending from the rotor, the contact of the actuator and assembly effecting a change in the angle of incidence of at least the one blade of the rotor, the actuator being selectively movable into and out of contact with the assembly, such that, in a first operative condition of the rotating rotor, there is contact between the actuator and assembly along part of the 360 degree rotation path around the rotor shaft, and in a second operative condition of the rotating rotor, there is no contact between the actuator and assembly along the 360 degree rotation path around the rotor shaft.

2. A helicopter of claim 1 wherein the actuator being selectively non-interfering and non-contacting with the assembly depending from the rotor, and the assembly selectively being in a position of rest relative to the actuator, when there is no command for the actuator to interact with the assembly.

3. A helicopter of claim 1 wherein the interaction occurs when the assembly is in alignment with the actuator whereby the actuator contacts a ring of the assembly depending from the rotor.

4. A helicopter of claim 2 including multiple actuators, the multiple actuators being spaced circumferentially around the rotor shaft thereby to interact with the assembly at different circumferential positions relative to the rotor shaft, the interaction occurring when selected actuators are aligned with selected location of the assembly.

5. A helicopter of claim 2 wherein the actuator includes an arm movable between a position of repose and a position of contact with the assembly and wherein the degree of movement of and the force exercised by the arm effects the degree of interaction with the assembly and the degree of change of angle of inclination of the at least one blade.

6. A helicopter of claim 2 wherein the actuator includes an arm movable between a position of repose and a position of contact with the assembly and wherein the length of the arm relative to the length of the assembly from the location of anchoring the rotor to the shaft effects the degree of interaction with the assembly and the degree of change of angle of inclination of the at least one blade.

7. A helicopter of claim 2 wherein the actuator includes an arm movable between a position of repose and a position of contact with the assembly, the assembly including a ring transversally located about and movable with the rotor shaft, and the actuator or multiple actuators are located at a fixed location on the body.

8. A helicopter of claim 1 wherein the control is applied thereby to cause the blade to turn on the feather axis of the rotor blade, the control being effectively applied to the blade when an actuator is aligned relative to the blade thereby to effect the turning about the feather axis.

9. A helicopter of claim 1 wherein the control is applied thereby to cause the blade to turn on the feather axis of the rotor, the control being effectively applied selectively to the blade through a system to operate the control thereby to effect the turning about the feather axis.

10. A helicopter of claim 1 wherein the control is applied thereby to cause the blade to turn on the feather axis of the rotor blade, the control being effectively applied selectively to the blade through a system to operate the control thereby to effect the angle of incidence of the blade periodically or at selected times and with selective interactive force or movement thereby to selectively change the blade angle of incidence in requisite response to the control.

11. A helicopter of claim 1 wherein the control is applied thereby to cause the blade to turn on the feather axis of the rotor blade, the control being effectively applied selectively to the blade through a system to operate the control thereby to effect the angle of incidence of the blade periodically or at selected times or locations along a 360 degree path around the rotor shaft and with selective interactive force or movement thereby to selectively change the blade angle of incidence in requisite response to the control, and periodically or at selected times to permit the blade angle to be responsive to forces unrelated to the control, such that a stability system continues to operate together with a horizontal applied control when the horizontal control is applied.

12. A helicopter comprising a body with a tail; a main rotor with blades which is driven by a rotor shaft and which is hinge mounted on this rotor shaft, such that the angle between the plane of rotation of the main rotor and the rotor shaft may vary; a tail rotor which is driven by a second rotor shaft directed transversally to the rotor shaft of the main rotor, an auxiliary rotor driven by the rotor shaft of the main rotor in the sense of rotation of the main rotor is an acute angle relative to a longitudinal axis of at least one of the rotor blades of the main rotor, the auxiliary rotor being mounted in a swinging relationship on an oscillatory shaft which is provided essentially transversally to the rotor shaft of the main rotor, and the main rotor and the auxiliary rotor are connected to each other by a mechanical link, such that the swinging motion of the auxiliary rotor controls the angle of incidence of at least one of the rotor blades of the main rotor, and a control for moving the angle of incidence of at least one blade of the rotor cyclically along at least part of a 360 degree rotation path around a rotor shaft, causing a variation in lift force of the blade along the rotations path and thereby cause the body to be urged in a relatively horizontal direction from a relative position of horizontal rest, the relative position of horizontal rest being a relatively hovering position above a ground level; and wherein the control includes an actuator for selectively contacting an assembly depending from the rotor, the contact of the actuator and assembly effecting a change in the angle of incidence of at least the one blade of the rotor, the actuator being selectively movable into and out of contact with the assembly, such that, in a first operative condition of the rotating rotor, there is contact between the actuator and assembly along part of the 360 degree rotation path around the rotor shaft, and in a second operative condition of the rotating rotor, there is no contact between the actuator and assembly along the 360 degree rotation path around the rotor shaft.

13. A helicopter according to claim 12, wherein the main rotor includes two blades situated essentially in line with each other.

14. A helicopter according to claim 12, wherein a joint of the main rotor is formed of a spindle which is fixed transversally to the rotor shaft of the main rotor and which is directed essentially transversally to the axis of the oscillatory shaft of the auxiliary rotor.

15. A helicopter according to claim 14, wherein the spindle of the main rotor extends essentially in the longitudinal direction of the rotor blade of the main rotor.

16. A helicopter according to claim 12 wherein the mechanical link includes a rod hinge mounted to the auxiliary rotor with one fastening point and is hinge-mounted with another fastening point to the rotor blade of the main rotor.

17. A helicopter according to claim 12 wherein the longitudinal axis of the auxiliary rotor in the sense of rotation is located within an angle of about 10 degrees with the longitudinal axis of one of the rotor blades of the main rotor.

18. A helicopter according to claim 12 wherein the longitudinal axis of one of the rotor blades of the main rotor in the sense of rotation, is located at an acute angle with the axis of the spindle.

19. A helicopter according to claim 12 wherein the diameter of the auxiliary rotor is smaller than the diameter of the main rotor.

20. A helicopter according to claim 12 wherein the tail rotor is supported by a swing with its rotor shaft which can rotate round a swinging shaft which essentially extends according to the longitudinal direction of the body of the helicopter.

21. A helicopter comprising a body with a tail; a main rotor with rotor blades which is driven by a rotor shaft on which the blades are mounted; a tail rotor which is driven by a second rotor shaft directed transversally to the rotor shaft of the main rotor, an auxiliary rotor driven by the rotor shaft of the main rotor in the sense of rotation of the main rotor, the auxiliary rotor being mounted in a swinging relationship on an oscillatory shaft and the swinging motion being relatively upwardly and downwardly about the auxiliary shaft, and which auxiliary shaft is provided essentially transverse to the rotor shaft of the main rotor, the main rotor and the auxiliary rotor being connected to each other by a mechanical link, such that the swinging motion of the auxiliary rotor controls the angle of incidence of at least one of the rotor blades of the main rotor and a control for moving the angle of incidence of at least one blade of the rotor cyclically along at least part of a 360 degree rotation path around the rotor shaft, causing a variation in a lift force of the blade along at least part of the rotations path and thereby cause the body to be urged in a relatively horizontal direction from a relative position of rest; and wherein the control includes an actuator for selectively contacting an assembly depending from the rotor, the contact of the actuator and assembly effecting a change in the angle of incidence of at least the one blade of the rotor, the actuator being selectively movable into and out of contact with the assembly, such that, in a first operative condition of the rotating rotor, there is contact between the actuator and assembly along part of the 360 degree rotation path around the rotor shaft, and in a second operative condition of the rotating rotor, there is no contact between the actuator and assembly along the 360 degree rotation path around the rotor shaft.

22. A helicopter according to claim 21 wherein the main rotor includes two rotor blades situated essentially in line with each other.

23. A helicopter according to claim 21 wherein a joint of the main rotor to the rotor blades is formed of a spindle which is fixed to the rotor shaft of the main rotor.

24. A helicopter according to claim 21 wherein the longitudinal axis of the auxiliary rotor in the sense of rotation is located within an angle of about 10 degrees with the longitudinal axis of one of the rotor blades of the main rotor.

25. A helicopter according to claim 21 wherein the longitudinal axis of one of the rotor blades of the main rotor in the sense of rotation, is located at an acute angle with the axis of a spindle mounting these blades to the rotor shaft.

26. A helicopter according to claim 21 including a downwardly directed stabilizer at the tail of the helicopter.

27. A helicopter comprising a body with a tail; a rotor with rotor blades which is driven by a rotor shaft and which is mounted on this rotor shaft, such that the angle of incidence of the rotor in the plane of rotation of the rotor and the rotor shaft may vary; and an auxiliary rotor rotatable with the rotor shaft and being for relative oscillating movement about the rotor shaft and being such that different relative position so that the auxiliary rotor causes the angle of incidence the main rotor to be different and a control for moving the angle of incidence of at least one blade of the rotor cyclically along at least part of a 360 degree rotation path around the rotor shaft, causing a variation in a lift force of the blade along at least part of the rotations path; and wherein the control includes an actuator for selectively contacting an assembly depending from the rotor, the contact of the actuator and assembly effecting a change in the angle of incidence of at least the one blade of the rotor, the actuator being selectively movable into and out of contact with the assembly, such that, in a first operative condition of the rotating rotor, there is contact between the actuator and assembly along part of the 360 degree rotation path around the rotor shaft, and in a second operative condition of the rotating rotor, there is no contact between the actuator and assembly along the 360 degree rotation path around the rotor shaft.

28. A helicopter according to claim 27 wherein a linkage between the main and auxiliary rotor causes changes in the position of the auxiliary rotor to translate to changes in the angle of incidence.

29. A helicopter comprising a body with a tail; a main rotor with rotor blades which is driven by a rotor shaft and which is mounted on this rotor shaft, such that the angle between the plane of rotation of the main rotor and the rotor shaft may vary; a tail rotor which is driven by a second rotor shaft, an auxiliary rotor driven by the rotor shaft of the main rotor, and the main rotor and the auxiliary rotor being connected to each other by a mechanical link, such that the motion of the auxiliary rotor controls the angle of incidence of at least one of the rotor blades of the main rotor, and a stabilizer at the tail, the stabilizer being directed downwardly and a control for moving the angle of incidence of at least one blade of the rotor cyclically along at least part of a 360 degree rotation path around the rotor shaft, causing a variation in a lift force of the blade along at least part of the rotations path and thereby cause the body to be urged in a relatively horizontal direction from a relative position of rest; and wherein the control includes an actuator for selectively contacting an assembly depending from the rotor, the contact of the actuator and assembly effecting a change in the angle of incidence of at least the one blade of the rotor, the actuator being selectively movable into and out of contact with the assembly, such that, in a first operative condition of the rotating rotor, there is contact between the actuator and assembly along part of the 360 degree rotation path around the rotor shaft, and in a second operative condition of the rotating rotor, there is no contact between the actuator and assembly along the 360 degree rotation path around the rotor shaft.

30. A helicopter according to claim 1 including a control for regulating the degree of requisite horizontal movement and a control for regulating the stability of the helicopter in a relative non-horizontal moving sense and wherein a degree to which the horizontal movement control is dominant over the non-horizontal movement stability of the helicopter determines the rate of change in position in the horizontal sense.

31. A helicopter as claimed in claim 1 wherein the stability tends to work against an inclination of the rotor in a plane or rotor rotation.

32. A helicopter as claimed in claim 1 wherein the helicopter moves in a horizontal plane according at least in part to the inclination in that plane.

33. A remote control toy helicopter comprising a body having a front end and a rear end; a motor and a battery for the motor, the motor being controllable by a controller remote from the helicopter body; a main rotor with propeller blades which is driven by a rotor shaft on which the blades are mounted; a second rotor which is driven by a second rotor shaft, an auxiliary rotor driven by the rotor shaft of the main rotor for rotation in the sense of rotation of the main rotor, and wherein each propeller blade has a profile wherein along the direction of its generally longitudinal axis of each blade includes a first upwardly longitudinal convex curve from a position towards the rotor shaft to a position towards an end area of the blade, wherein the auxiliary rotor is mounted in a swinging relationship on an oscillatory shaft and the swinging motion being relatively upwardly and downwardly about the oscillatory shaft, and which oscillatory shaft is provided essentially transverse to the rotor shaft of the main rotor, such that the swinging motion of the auxiliary rotor controls the angle of incidence of at least one of the propeller blades of the main rotor, wherein each rotor blade includes a second transverse convex curve in a profile on its top face from a position towards a leading edge towards a position towards a trailing edge, the second transverse convex curve preferably being present over a substantial generally longitudinal length of the blade; and a control for moving the angle of incidence of at least one blade of the rotor cyclically along at least part of a 360 degree rotation path around the rotor shaft, causing a variation in a lift force of the blade along at least part of the rotations path and thereby cause the body to be urged in a relatively horizontal direction from a relative position of rest; and wherein the control includes an actuator for selectively contacting an assembly depending from the rotor, the contact of the actuator and assembly effecting a change in the angle of incidence of at least the one blade of the rotor, the actuator being selectively movable into and out of contact with the assembly, such that, in a first operative condition of the rotating rotor, there is contact between the actuator and assembly along part of the 360 degree rotation path around the rotor shaft, and in a second operative condition of the rotating rotor, there is no contact between the actuator and assembly along the 360 degree rotation path around the rotor shaft.

34. A remote control toy helicopter as claimed in claim 33 wherein the actuator is selectively non-interfering and non-contacting with assembly depending from the rotor, and the assembly selectively being in a position of rest relative to the actuator, when there is no command for the actuator to interact with the assembly.

35. A remote control toy helicopter as claimed in claim 33 wherein the control includes an assembly fixed to a longitudinal axis of the main rotor, the assembly having a ring for engagement by an actuator, the ring encircling the rotor shaft, wherein movement of the center of the ring relative to the rotor shaft corresponds to movement of the main rotor relative to the rotor shaft, and wherein the ring is not attached to the rotor shaft.

* * * * *